US008713577B2

(12) United States Patent
Kudo et al.

(10) Patent No.: US 8,713,577 B2
(45) Date of Patent: Apr. 29, 2014

(54) STORAGE APPARATUS AND STORAGE APPARATUS MANAGEMENT METHOD PERFORMING DATA I/O PROCESSING USING A PLURALITY OF MICROPROCESSORS

(75) Inventors: Shintaro Kudo, Yokohama (JP); Norio Shimozono, Machida (JP); Akira Deguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 418 days.

(21) Appl. No.: 13/140,622

(22) PCT Filed: Jun. 3, 2011

(86) PCT No.: PCT/JP2011/003163
§ 371 (c)(1),
(2), (4) Date: Jun. 17, 2011

(87) PCT Pub. No.: WO2012/164632
PCT Pub. Date: Dec. 6, 2012

(65) Prior Publication Data
US 2012/0311603 A1    Dec. 6, 2012

(51) Int. Cl.
*G06F 9/46* (2006.01)
(52) U.S. Cl.
USPC ........................................................ 718/105
(58) Field of Classification Search
None
See application file for complete search history.

(56) References Cited

U.S. PATENT DOCUMENTS

| | | | | |
|---|---|---|---|---|
| 6,631,449 B1 * | 10/2003 | Borrill | | 711/141 |
| 7,831,744 B2 * | 11/2010 | Hiramatsu et al. | | 710/21 |
| 7,856,461 B2 * | 12/2010 | Venkatesan et al. | | 707/953 |
| 7,912,996 B2 * | 3/2011 | Serizawa et al. | | 710/21 |
| 8,006,056 B2 * | 8/2011 | Voigt et al. | | 711/165 |
| 8,151,013 B2 * | 4/2012 | Serizawa et al. | | 710/21 |
| 8,195,627 B2 * | 6/2012 | Wong et al. | | 707/694 |
| 8,214,587 B2 * | 7/2012 | Noda et al. | | 711/113 |
| 8,275,937 B2 * | 9/2012 | Serizawa et al. | | 711/114 |
| 8,380,893 B2 * | 2/2013 | Serizawa et al. | | 710/21 |
| 2008/0263190 A1 | 10/2008 | Serizawa et al. | | |
| 2012/0311602 A1 * | 12/2012 | Deguchi et al. | | 718/105 |

FOREIGN PATENT DOCUMENTS

| | | |
|---|---|---|
| EP | 2 015 168 A2 | 1/2009 |
| JP | 2008-269424 A | 11/2008 |
| WO | 2010041481 A1 | 4/2010 |
| WO | 2010137070 A1 | 12/2010 |

* cited by examiner

*Primary Examiner* — Van Nguyen
(74) *Attorney, Agent, or Firm* — Volpe and Koenig, P.C.

(57) ABSTRACT

The storage apparatus includes a plurality of microprocessors; a plurality of storage areas formed in a drive group configured from a plurality of physical drives; and a management unit which manages microprocessors which handle data I/Os to/from one or more storage areas among the plurality of storage areas. The management unit detects variations in the processing loads of the plurality of microprocessors, generates load balancing target information which includes information on the storage areas to which the ownership is migrated, information on the migration-source microprocessor serving as the migration source of the ownership, and information on the migration-destination microprocessor serving as the migration destination of the ownership, and migrates the ownership to the storage areas with timing such that there is no drop in the processing load of the migration-destination microprocessor contained in the load balancing target information.

15 Claims, 67 Drawing Sheets

FIG. 3

| VOLUME IDENTIFICATION NUMBER | DISTRIBUTION DESTINATION MPPK NUMBER |
|---|---|
| 0 | 0 |
| 1 | 0 |
| 2 | 0 |
| 3 | 1 |
| 4 | 2 |
| 5 | 1 |
| 6 | 0 |
| 7 | 3 |
| ⋮ | ⋮ |

| VOLUME IDENTIFICATION NUMBER | MP UTILIZATION |
|---|---|
| 0000 | 10% |
| 0001 | 5% |
| 0002 | 3% |
| 0003 | 2% |

29111　29112　2911

F I G . 5

| VOLUME IDENTIFICATION NUMBER | OWNER MPPK NUMBER |
|---|---|
| 1 | 1 |
| 2 | 2 |
| 3 | 3 |
| 4 | 4 |

| MPPK IDENTIFICATION NUMBER | MP UTILIZATION | DIRTY DATA RATE |
|---|---|---|
| 0 | 80% | 10% |
| 1 | 45% | 40% |
| 2 | 30% | 50% |
| 3 | 20% | 0% |

| TIME | MP UTILIZATION (MPPK0) | MP UTILIZATION (MPPK1) | MP UTILIZATION (MPPK2) | ... |
|---|---|---|---|---|
| 0:00 | 80% | 20% | 0% | ... |
| 0:01 | 75% | 23% | 0% | ... |
| 0:02 | 75% | 25% | 0% | ... |
| ... | ... | ... | ... | ... |

| PLAN NUM-BER | GENERA-TION TIME | MIGRATION-SOURCE MPPK | MIGRATION-DESTINATION MPPK | MIGRATION VOLUME |
|---|---|---|---|---|
| 1 | 1:00 | 0 | 1 | 0000,0001,0002 |
| 2 | 3:00 | 0 | 1 | 1000,1100,1103 |
| 3 | 3:00 | 2 | 3 | 1004 |
| 4 | 5:00 | 1 | 0 | 2005 |

| EXECUTION TIME | PLAN NUMBER |
|---|---|
| 23:00 | 1 |
| 23:00 | 2 |
|  | 3 |
|  | 4 |

| OPERATION TIME | TARGET VOLUME | OPERATION CONTENT |
|---|---|---|
| 0:10 | 0000,0001 | PAIR FORMATION (START COPY) |
| 0:50 | 0000,0001 | COPY END (DATA MATCHING) |
| 0:50 | 0000,0001 | PAIR DIVISION |
| 12:10 | 0000,0001 | PAIR RESYNCHRONIZATION (START OF COPY) |
| 12:10 | 0000,0001 | COPY END (DATA MATCHING) |
| ⋮ | ⋮ | ⋮ |
| 29171 | 29172 | 29173 |

2917

F I G. 21

| TIME ZONE | LOAD TOTAL | ADDITIONAL COUNT COUNTER |
|---|---|---|
| 0:00 - 1:00 | 800 | 15 |
| 1:00 - 2:00 | 1000 | 30 |
| 2:00 - 3:00 | 200 | 30 |
| ⋮ | | |
| 23:00 - 0:00 | | |

| DEVICE NAME | HOST NUMBER | VOLUME NUMBER |
|---|---|---|
| 1 | 1 | 0 |
| 2 | 1 | 1 |
| 3 | 2 | 0 |
| 4 | 2 | 1 |

| BATCH PROCESSING NAME | EXECUTION TIME | USED DEVICE |
|---|---|---|
| B1 | 0:00 | 1,2,3 |
| B2 | 0:30 | 1,2 |
| B3 | 1:00 | 1,2 |
| B4 | 1:30 | 1 |

| OWNERSHIP DISPOSITION BACKUP NAME | STORAGE TIME | OWNER MPPK (VOLUME0000) | OWNER MPPK (VOLUME0001) | ... |
|---|---|---|---|---|
| BACKUP1 | 1:00 | 0 | 0 | ... |
| BACKUP2 | 2:00 | 2 | 1 | ... |
| BACKUP3 | 4:00 | 2 | 1 | ... |
| ... | ... | ... | ... | ... |
| 29191 | 29192 | 29193 | 29193 | |

| TYPE | IDENTIFICATION NUMBER | OWNER MPPK NUMBER |
|---|---|---|
| VOLUME | 0 | 0 |
|  | 1 | 0 |
|  | 2 | 0 |
|  | 3 | 1 |
|  | 4 | 2 |
|  | 5 | 1 |
|  | 6 | 0 |
|  | 7 | 3 |
|  | ⋮ | ⋮ |
| REMOTE-COPY GROUP | 1 | 1 |
|  | 2 | 1 |
|  | 3 | 1 |
|  | 4 | 3 |
|  | 5 | 2 |
|  | ⋮ | ⋮ |
| ⋮ | ⋮ | ⋮ |

2211

2211a  2211b  2211c

F I G . 39

| TYPE | IDENTIFICATION NUMBER | MP UTILIZATION |
|---|---|---|
| MPPK | 0 | 80% |
| | 1 | 45% |
| | 2 | 30% |
| | 3 | 20% |
| | ⋮ | ⋮ |
| VOLUME | 0 | 2% |
| | 1 | 8% |
| | 2 | 2% |
| | 3 | 1% |
| | 4 | 0% |
| | 5 | 3% |
| | 6 | 2% |
| | 7 | 5% |
| | ⋮ | ⋮ |

2212a  2212b  2212c

2212

F I G . 40

| TYPE | IDENTIFICATION NUMBER | MIGRATION FLAG |
|---|---|---|
| MPPK | 0 | ON |
|  | 1 | ON |
|  | 2 | OFF |
|  | 3 | ON |
|  | ⋮ | ⋮ |
| VOLUME | 0 | ON |
|  | 1 | ON |
|  | 2 | ON |
|  | 3 | ON |
|  | 4 | OFF |
|  | ⋮ | ⋮ |
| REMOTE-COPY GROUP | 0 | OFF |
|  | 1 | OFF |
|  | 2 | OFF |
|  | 3 | ON |
|  | ⋮ | ⋮ |
| 2213a | 2213b | 2213c |

MIGRATION OBJECT CONFIGURATION MODIFICATION SCREEN (MPPK UNITS) — 300

- ☑ MPPK0 — 310
- ☐ MPPK1
- ☐ MPPK2
- ☐ MPPK3

☑ NON-MIGRATION OBJECT — 320
☐ MIGRATION OBJECT — 330

[APPLY CONFIGURATION] — 340

MIGRATION OBJECT CONFIGURATION SCREEN (VOLUME UNITS) — 350

☑ NON-MIGRATION OBJECT — 320
☐ MIGRATION OBJECT — 330

Grid (columns 0–f, rows 0–f) — 360, with a ✓ mark at column 5, row 3.

[APPLY CONFIGURATION] — 340

FIG. 45

| TYPE | IDENTIFICATION NUMBER | RESPONSE TIME |
|---|---|---|
| VOLUME | 0 | 1 MILLISECOND |
| | 1 | 2 MILLISECONDS |
| | 2 | 3 MILLISECONDS |
| | 3 | 10 MILLISECONDS |
| | ⋮ | ⋮ |
| MPPK | 0 | 1 MILLISECOND |
| | 1 | 2 MILLISECONDS |
| | 2 | 20 MILLISECONDS |
| | 3 | 4 MILLISECONDS |
| | ⋮ | ⋮ |

| MPPK NUMBER | CAPACITY | CACHE USAGE RATE | CLEAN RATIO | DIRTY RATIO |
|---|---|---|---|---|
| 0 | 256GB | 100% | 30% | 70% |
| 1 | 256GB | 60% | 50% | 10% |
| 2 | 256GB | 20% | 15% | 5% |
| 3 | 256GB | 100% | 100% | 0% |

| VOLUME NUMBER | CACHE USAGE RATE | CLEAN RATIO | DIRTY RATIO |
|---|---|---|---|
| 0 | 5% | 5% | 0% |
| 1 | 10% | 4% | 6% |
| 2 | 2% | 1% | 1% |
| 3 | 10% | 10% | 0% |
| 4 | 10% | 10% | 0% |
| 5 | 5% | 0% | 5% |
| 6 | 2% | 2% | 0% |
| 7 | 0% | 0% | 0% |
| ⋮ | ⋮ | ⋮ | ⋮ |

2216

2216a  2216b  2216c  2216d

F I G. 50

| TYPE | IDENTIFICATION NUMBER | LOCAL MEMORY | DATA TRANSFER BUFFER | I/O MULTIPLICITY | COPY JOB MULTIPLICITY |
|---|---|---|---|---|---|
| MPPK | 0 | 100% | 80% | 50% | 50% |
| | 1 | 20% | 60% | 60% | 50% |
| | 2 | 10% | 50% | 50% | 0% |
| | 3 | 60% | 20% | 10% | 100% |
| | ... | ... | ... | ... | ... |
| VOLUME | 0 | 10% | 2% | 20% | 5% |
| | 1 | 2% | 6% | 5% | 0% |
| | 2 | 2% | 8% | 7% | 0% |
| | 3 | 8% | 5% | 1% | 5% |
| | ... | ... | ... | ... | ... |

2217a / 2217b / 2217c / 2217d / 2217e / 2217f

2217

F I G . 52

| MPPK NUMBER | RESOURCE TYPE | RESERVATION FAILURE COUNT |
|---|---|---|
| 0 | CACHE | 200 |
| | LOCAL MEMORY | 50 |
| | DATA TRANSFER BUFFER | 100 |
| | I/O MULTIPLICITY | 80 |
| | JOB MULTIPLICITY | 0 |
| 1 | CACHE | 200 |
| | LOCAL MEMORY | 50 |
| | DATA TRANSFER BUFFER | 100 |
| | I/O MULTIPLICITY | 80 |
| | JOB MULTIPLICITY | 0 |
| ⋮ | ⋮ | ⋮ |

| VOLUME NUMBER | I/O COUNT |
|---|---|
| 0 | 100 |
| 1 | 200 |
| 2 | 300 |
| 3 | 50 |
| ⋮ | ⋮ |

| MPPK NUMBER | PARTITION NUMBER |
|---|---|
| 0 | 0 |
| 1 | 0 |
| 2 | 1 |
| 3 | 1 |
| ⋮ | ⋮ |

2241a   2241b

2241

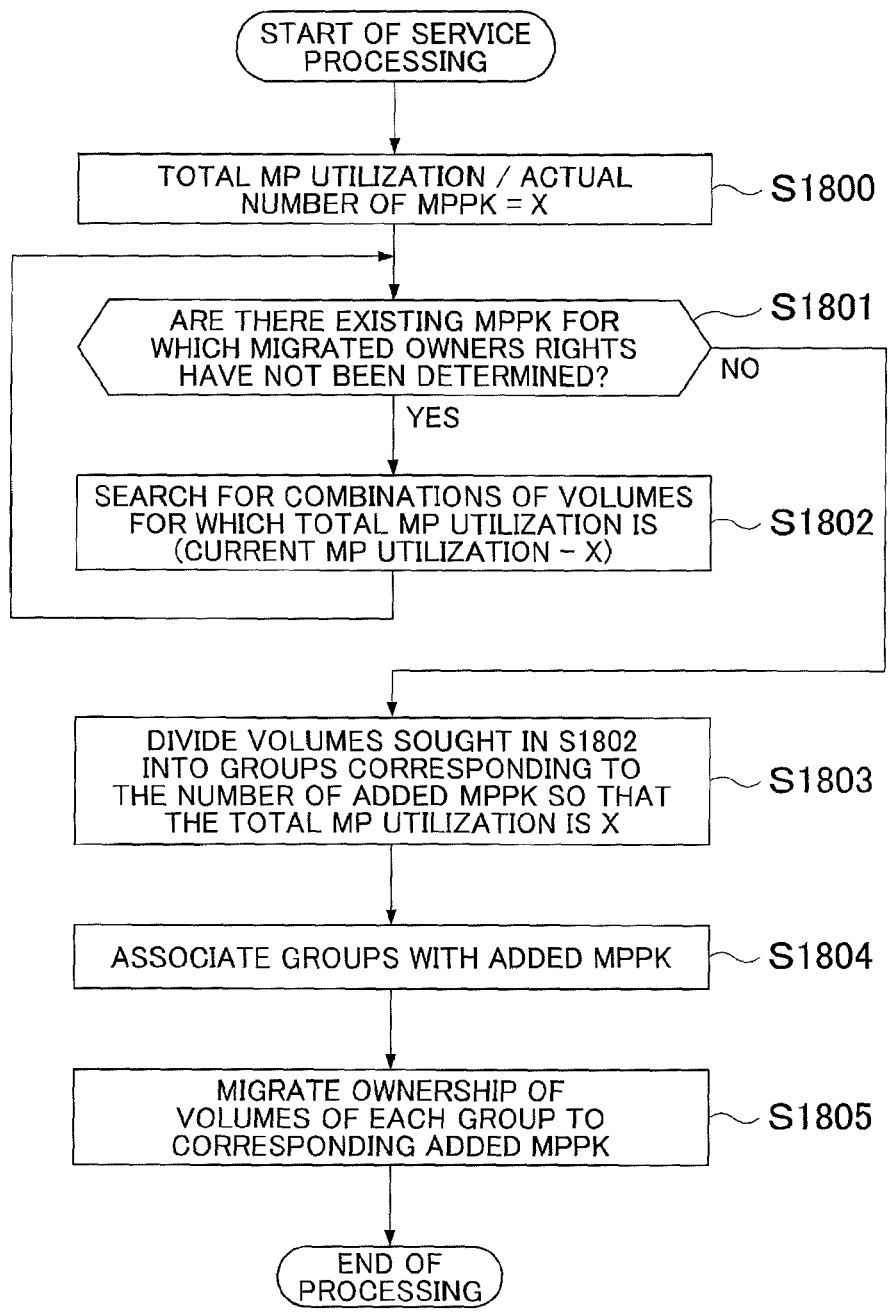

STORAGE APPARATUS AND STORAGE APPARATUS MANAGEMENT METHOD PERFORMING DATA I/O PROCESSING USING A PLURALITY OF MICROPROCESSORS

TECHNICAL FIELD

The present invention relates to a storage apparatus and a storage apparatus management method and is suitably applied to a storage apparatus and a storage apparatus management method which perform data I/O processing using a plurality of microprocessors.

BACKGROUND ART

In recent years, in order to handle various large-volume data in various government, corporate and university institutions and other types of institutions, data has been managed using comparatively large-scale storage apparatuses. A large-scale storage apparatus of this kind is configured having a plurality of storage devices (hard disk drives and so on, for example) arranged in an array. For example, one RAID (Redundant Arrays of Independent Disks) group is configured from one or more hard disk drives, and one or more logical volumes are defined in a physical storage area provided by one RAID group. Furthermore, the logical volumes are provided to the host apparatus. The host apparatus is able to perform data writing and reading by transmitting predetermined commands to logical volumes.

In the foregoing storage apparatus, higher performance is required in order to process various large-volume data. Hence, in order to increase the performance of the storage apparatus, PTL1 discloses a technology according to which microprocessor packages (hereinafter called MPPK) which handle data processing to write and read data to/from logical volumes are determined beforehand and control information required for data processing is stored in the local memory in the MPPK. Here, an MPPK which handles the processing of a certain logical volume is called an owner MPPK and this MPPK is described hereinbelow as if it had ownership to the logical volume.

Furthermore, PTL1 discloses the fact that, if the data processing load varies from MPPK to MPPK, the MPPK processing load is distributed by changing the ownership of a certain logical volume to another MPPK.

CITATION LIST

Patent Literature

PTL 1: Japanese Published Unexamined Patent Application No. 2008-269424

SUMMARY OF INVENTION

Technical Problem

However, according to the foregoing PTL1, if the MPPK utilization varies, the response time to the host apparatus can be shortened by migrating the MPPK ownership to distribute the load; however, the performance of the whole storage apparatus is desirably further improved by also considering the delay in the response time to the host apparatus due to ownership modification processing as well as the processing load in migrating management information which accompanies ownership switching processing, and the like.

The present invention was devised in view of the foregoing points and proposes a storage apparatus and storage apparatus management method with which the processing performance of the whole storage apparatus can be improved by migrating MPPK ownership with suitable timing.

Solution to Problem

In order to achieve the foregoing object, the present invention provides a storage apparatus which is connected via a network to a host apparatus which requests data I/Os, the storage apparatus comprising a plurality of microprocessors; a plurality of storage areas formed in a drive group configured from a plurality of physical drives; and a management unit which manages, as the microprocessors which possess ownership to the storage areas, the microprocessors which handle data I/Os to/from one or more storage areas among the plurality of storage areas, wherein the management unit detects variations in the processing loads of the plurality of microprocessors, generates, on the basis of variations in the processing load, load balancing target information which includes information on the storage areas to which the ownership are migrated, information on the migration-source microprocessor serving as the migration source of the ownership, and information on the migration-destination microprocessor serving as the migration destination of the ownership, and migrates the ownership to the storage areas with timing such that there is no drop in the processing load of the migration-destination microprocessor contained in the load balancing target information.

According to this configuration, the management unit detects variations in the processing loads of the plurality of microprocessors provided to the storage apparatus and generates, on the basis of variations in the processing, load balancing target information which includes information on the storage areas to which the ownership are migrated, information on the migration-source microprocessor which is the ownership migration source, and information on the migration-destination microprocessor which is the ownership migration destination. Furthermore, the ownership to the storage areas are migrated with timing such that there is no drop in the processing load of the migration-destination microprocessor which is contained in the load balancing target information. Accordingly, not only is it possible to instantly execute load balancing at the point where MPPK utilization variations are detected, but it is also possible to execute MPPK load balancing processing with the timing at which the normal task load is low by acquiring information required for load balancing.

Advantageous Effects of Invention

The present invention enables the processing performance of the whole storage apparatus to be improved by migrating MPPK ownership with suitable timing.

BRIEF DESCRIPTION OF DRAWINGS

FIG. 3 is a diagram showing content of a distribution destination MPPK table according to this embodiment.

FIG. 4 is a diagram showing content of a volume information table according to this embodiment.

FIG. 5 is a diagram showing content of an ownership management table according to this embodiment.

FIG. 6 is a diagram showing content of an MPPK information table according to this embodiment.

FIG. 7 is a diagram showing content of an MPPK load monitoring table according to this embodiment.

FIG. 8 is a diagram showing content of a load balancing plan table according to this embodiment.

FIG. 9 is a diagram showing content of a load balancing execution time table according to this embodiment.

FIG. 20 is a diagram showing content of a copy function log table according to this embodiment.

FIG. 21 is a diagram showing content of an MPPK load monitoring subtable according to this embodiment.

FIG. 27 is a diagram showing content of a host device table according to this embodiment.

FIG. 28 is a diagram showing content of a batch processing information table according to this embodiment.

FIG. 32 is a diagram showing content of an ownership disposition backup table according to this embodiment.

FIG. 38 is a diagram showing content of an owners MPPK table according to this embodiment.

FIG. 39 is a diagram showing content of an MP utilization table according to this embodiment.

FIG. 40 is a diagram showing content of a migration object table according to this embodiment.

FIG. 41 is a conceptual view of a migration object configuration modification screen according to this embodiment.

FIG. 45 is a diagram showing content of a response time table according to this embodiment.

FIG. 48 is a diagram showing content of an MPPK cache management table according to this embodiment.

FIG. 49 is a diagram showing content of a volume cache management table according to this embodiment.

FIG. 50 is a diagram showing content of a resource management table according to this embodiment.

FIG. 52 is a diagram showing content of a resource depletion table according to this embodiment.

FIG. 63 is a diagram showing content of an I/O count table according to this embodiment.

FIG. 64 is a diagram showing content of a partition table according to an eighth embodiment of the present invention.

FIG. 67 is a flowchart showing processing content of service processing according to another embodiment.

DESCRIPTION OF EMBODIMENTS

Figure 1:
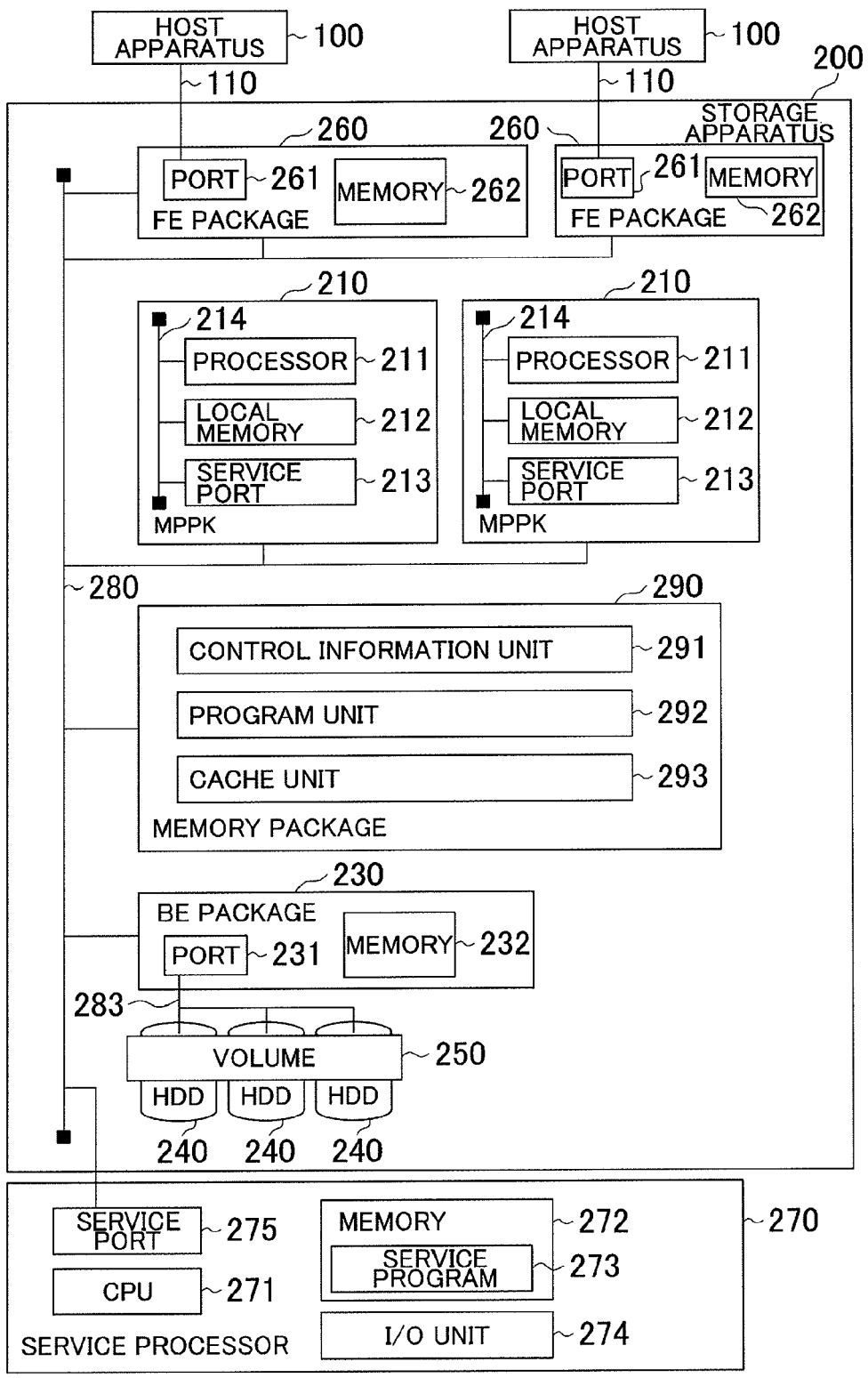
FIG. 1 is a block diagram showing the overall configuration of a computer system according to a first embodiment of the present invention.

An embodiment of the present invention will be described in detail hereinbelow with reference to the drawings.

(1) First Embodiment (1-1) Overview of the Embodiment

An overview of the embodiment will first be provided. In recent years, in order to handle various large-volume data in various government, corporate and university institutions and other types of institutions, data has been managed using comparatively large-scale storage apparatuses. A large-scale storage apparatus of this kind is configured having a plurality of storage devices (hard disk drives and so on, for example) arranged in an array. For example, one RAID (Redundant Arrays of Independent Disks) group is configured from one or more hard disk drives, and one or more logical volumes are defined in a physical storage area provided by one RAID group. Furthermore, the logical volumes are provided to the host apparatus. The host apparatus is able to perform data writing and reading to/from the logical volumes by transmitting predetermined commands thereto.

In the foregoing storage apparatus, higher performance is required in order to process various large-volume data. Hence, in order to increase the performance of the storage apparatus, PTL1 discloses a technology according to which microprocessor packages (hereinafter called MPPK) which handle data processing to write and read data to/from logical volumes are determined beforehand and control information required for data processing is stored in the local memory in the MPPK. Here, an MPPK which handles the processing of a certain logical volume is called an owner MPPK and this MPPK is described hereinbelow as if it had ownership to the logical volume.

Conventionally, if the load of the data processing varies slightly from MPPK to MPPK, the MPPK processing load is distributed by changing the ownership of a certain logical volume to another MPPK. However, if the MPPK utilization varies, the response time to the host apparatus can be shortened by migrating the MPPK ownership to distribute the load; however, no consideration has been paid to the delay in the response time to the host apparatus due to ownership modification processing as well as the processing load in migrating management information which accompanies ownership switching processing, and the like. For example, by modifying the MPPK which handles logical volume processing, the processing for handing over logical volume management information and management information for logical volume data which exists in the cache memory from the migration-source MPPK to the migration-destination MPPK is generated and I/O processing such as writing and reading data to and from the logical volumes during MPPK migration processing is extended. In particular, when processing is executed in order to distribute the MPPK load when the I/O load on the host apparatus is high, the I/O performance relative to the host apparatus will likely be reduced due to the processing load which accompanies the ownership migration processing for load balancing as well as the delay in the I/O processing during ownership migration processing.

Furthermore, even if there is a drop in the processing performance when a variation in the MPPK utilization is produced, this may not actually be a problem. For example, if backup processing which is performed outside the original task time is executed, this does not amount to a problem even when the utilization on the MPPK handling the backup processing rises, thereby generating a load between the MPPK and a reduced I/O performance. Rather, ownership migration processing is frequently generated, which will likely lead to a reduction in the throughput and an excessive backup time.

Therefore, according to this embodiment, not only is the load balancing instantly executed at the point where a variation in the MPPK utilization is detected, but also information required for load balancing is acquired and MPPK load balancing processing is executed with timing at which the normal task load is low. Furthermore, if an MPPK utilization variation is detected, it is determined whether this is a load variation that need not be eliminated. As a result, the processing performance of the whole storage apparatus can be improved by migrating MPPK ownership with suitable timing.

(1-2) Computer System Hardware Configuration

The hardware configuration of a computer system 1 will be described next. As shown in FIG. 1, the computer system 1 is configured from a host apparatus 100, a storage apparatus 200, and a service processor 270.

The host apparatus 100 is a computer device which comprises information processing resources such as a CPU (Central Processing Unit) and a memory and is configured, for example, from a personal computer, a workstation, or a mainframe. The CPU functions as an arithmetic processing device and controls the operation of the host apparatus 100 according to programs and arithmetic parameters and the like which are stored in the memory. Furthermore, the host apparatus 100 comprises information input devices such as a keyboard, a switch, a pointing device and a microphone, and information output devices such as a monitor display and a speaker.

Furthermore, the host apparatus 100 is connected to the storage apparatus 200 via a network 110. The network 110 is configured, for example, from a SAN (Storage Area Network) or the like and inter-device communications are carried out according to the Fibre Channel Protocol, for example. Further, the network 110 may be a LAN (Local Area Network), the Internet, a public line, or a dedicated line, or the like, for example. If the network is a LAN, inter-device communications are executed according to the TCP/IP (Transmission Control Protocol/Internet Protocol) protocol, for example.

Furthermore, the host apparatus 100 is a device for performing predetermined task processing by executing software of a database management system or the like. Part or all of the data used in the task processing which is executed by the host apparatus 100 is stored in the storage apparatus 200. In order to refer to and update the data stored in the storage apparatus 200, the host apparatus 100 transmits a read request or write request to the storage apparatus 200 via the network 110. The read request transmitted from the host apparatus 100 contains, for example, a LUN (Logical Unit Number) and an LBA (Logical Block Address) with which read target data is managed. Further, the write request transmitted from the host apparatus 100 contains, for example, an LUN and an LBA for writing write target data, and the write target data.

The service processor 270 is a computer device comprising a CPU 271, a memory 272, an I/O unit 274, and a service port 275 and is configured, for example, from a personal computer, a workstation, or a mainframe, or the like. Further, the service processor 270 is connected to MPPK 210 of the storage apparatus 200 via a network 280 of the storage apparatus 200.

In addition, the CPU 271 functions as an arithmetic processing device and controls the operation of the service processor 270 according to programs and arithmetic parameters and the like stored in the memory 272. More specifically, the CPU 271 implements servicing of the MPPK 210 by reading the service program 273 stored in the memory 272 and executing the service program 273.

The service port 275 is connected to the service ports 213 of the MPPK 210, acquires operation information from the MPPK 210, and transmits commands and the like for executing service operations on the MPPK 210. The operation information and the like acquired from the MPPK 210 is stored in the memory 272. Note that information that is acquired from the MPPK 210 may also be stored in the memory 272.

The 110 unit 274 is configured from information input devices such as a keyboard, switch, pointing device, and microphone and from information output devices such as a monitor display and speaker, and receives input operations of the operator and displays operation information of the storage apparatus 200 on a display device. Note that the service processor 270 comprises a power source (not shown).

Furthermore, the storage apparatus 200 is configured from a frontend package (appears in the drawings as FE package) 260, an MPPK (denoted MPPK in the drawings) 210, a memory package 290, a backend package (denoted BE package in the drawings) 230 and a hard disk drive (denoted HDD (Hard Disk Drive) in the drawings) 240. In addition, these internal devices are mutually connected via the network 280. Note that the storage apparatus 200 may also be provided with a plurality of the frontend package 260, the MPPK 210, the memory package 290, the backend package 230, and the hard disk drive 240, respectively.

The frontend package 260 comprises a port 261 and a memory 262. The port 261 is connected to a port (not shown) of the host apparatus 100 and receives write requests and read requests from the host apparatus 100 via the port of the host apparatus 100. Note that the port of the host apparatus 100 and the port 261 may be directly connected or may be connected indirectly using a switch or the like. In addition, the memory 262 temporarily stores information of the MPPK 210 (owner MPPK) which processes read requests or write requests which are received from the host apparatus 100 as well as data which is transferred from the host apparatus 100 and data transferred to the host apparatus 100. Note that the frontend package 260 may also comprise one or more of the port 261 and the memory 262.

The MPPK 210 comprises a processor 211, a local memory 212 and a service port 213. The internal devices thereof are also mutually connected via the network 214. Note that one MPPK 210 may also comprise a plurality of the processor 211, the local memory 212 and the service port 213.

By reading and executing the programs stored in the program unit 292 in the memory package 290, the processor 211 executes write processing and read processing from the host apparatus 100. In addition to storing temporary data of programs used by the processor 211, the local memory 212 stores various data such as control information, task data, and programs which are stored in the hard disk drive 240 and memory package 290. Note that the distance of the local memory 212 from the processor 211 is shorter than that of the memory package 290 or hard disk drive 240 and hence there is high-speed access to the local memory 212 from the processor 211.

The service port 213 is connected to the service port 275 of the service processor 270 via the network 280 and comprises a function for transmitting operation information of the MPPK 210 to the service processor 270 and for receiving service operations from the service processor 270.

The memory package 290 comprises a control information unit 291, a program unit 292, and a cache unit 293 and the like. The program unit 292 stores programs for implementing processing which is executed by the storage apparatus 200. Furthermore, the control information unit 291 stores control information which is used by the programs stored in the program unit 292. The programs stored in the memory package 290 and control information used by the programs are read from the memory package 290 by the processor 211 of the MPPK 210 and processing is executed.

The cache unit 293 temporarily stores data which is stored in the hard disk drive 240. The memory package 290 is a higher-speed storage medium than the hard disk drive 240. Hence, by storing data and the like having a high usage frequency in the cache unit 293, among the data stored in the hard disk drive 240, processing of a read request or write request from the host apparatus 100 can be executed more rapidly than if all the data is always stored in the hard disk drive 240. Note that the memory package 290 may be duplicated in order to avoid data loss or similar when a fault arises.

The backend package 230 comprises a port 231 and a memory 323. The port 231 is connected to the hard disk drive 240 via a network 283 and writes write data from the host apparatus 100 to the hard disk drive 240 and reads data from the hard disk drive 240 according to a read request from the host apparatus 100. The memory 232 temporarily stores the data which is transferred to the hard disk drive 240 and the data which is read from the hard disk drive 240. Note that the backend package 230 may comprise one or more of the port 231 and the memory 232.

The hard disk drive 240 is a storage medium for storing various data which is used by software that is run by the host apparatus 100. The hard disk drive 240 may be configured from a plurality of hard disk drives (HDD) formed of high-cost hard disk drives such as SCSI (Small Computer System Interface) disks or low-cost hard disk drives such as SATA (Serial AT Attachment) disks. Furthermore, storage media other than hard disk drives may be flash memory, SSDs (Solid State Drives) or DVDs, for example.

In addition, one or more hard disk drives 240 may be gathered in units known as parity groups to form highly reliable groups known as RAID (Redundant Arrays of Independent Disks). Furthermore, a parity group which is configured from one or more hard disk drives 240 may be divided into one or more logical areas and these areas may each be handled as logical storage devices. These logical storage devices are the foregoing logical volumes and will be described hereinbelow simply as the volumes 250. The plurality of volumes 250 are assigned volume numbers enabling the storage apparatus 200 to identify the plurality of volumes 250.

(1-3) Configuration of Storage Apparatus Functions

In the storage apparatus 200 according to this embodiment, an owner MPPK 210 which handles processing for each volume 250 is determined beforehand. By thus deciding upon an owner MPPK 210 for each volume 250, it is possible to restrict the MPPK 210 which are able to access the control information required for the processing of the volumes 250 to one MPPK 210. Hence, the control information required for this processing can be stored in the local memory 212 of the MPPK 210, thus making it possible to expedite the processing of the volumes 250. As mentioned hereinabove, the MPPK 210 which handles the I/O processing of the volumes 250 is described as having ownership to the volumes 250 and the MPPK which has ownership will be described hereinbelow as the owner MPPK of the volume 250.

If the owner MPPK is determined, upon receiving I/O from the host apparatus 100, the frontend package 260 must distribute the I/O requests to the owner MPPK on the basis of information of the I/O destination volume 250. The memory 262 of the frontend package 260 stores the distribution destination MPPK table 263 as information for implementing this distribution processing.

Furthermore, the storage apparatus 200 comprises various storage functions. Examples include a copy function which copies data of a volume in the storage apparatus, a remote copy function which performs a data backup between different apparatuses, and a volume virtualization function which assigns a physical storage area in response to an increase in the user data storage amount, and the like.

A plurality of volumes 250 may be associated whenever this storage function is implemented. For example, the copy-source volume 250 and the copy-destination volume 250 are mutually associated by the copy function of the storage apparatus 200. In storage function processing, the processing is performed while control information which is associated with each of the associated plurality of volumes 250 is referred to and updated. Hence, when the same MPPK 210 have ownership to the associated volume 250, the function can be improved by implementing efficient processing to obviate the need for communication between the MPPK 210, and so on.

Figure 2:
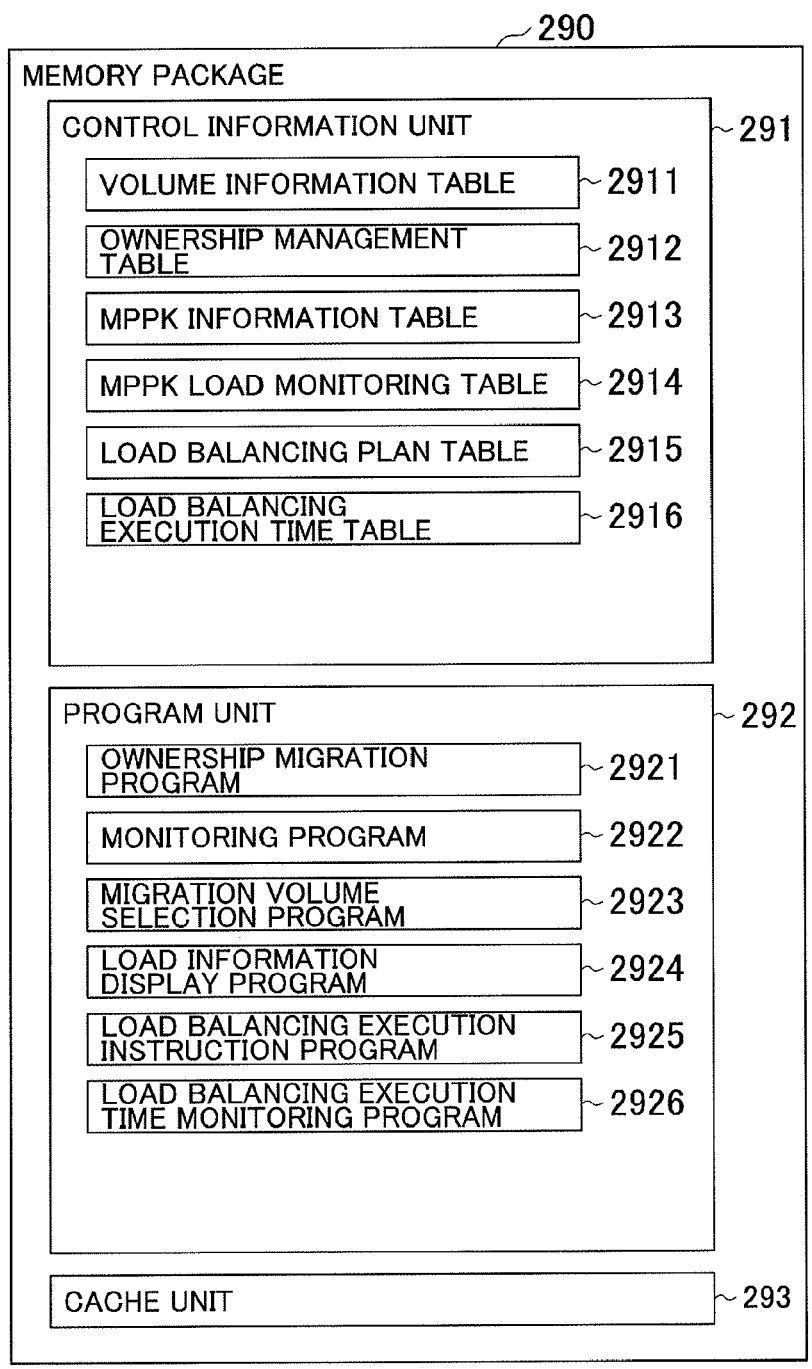
FIG. 2 is a block diagram showing control information of a storage apparatus according to this embodiment.

The configuration of the memory package 290 will be described next. The memory package 290 stores various control information of a storage apparatus 200 which configures ownership for the volumes 250. More specifically, the control information unit 291 of the memory package 290 stores, as is shown in FIG. 2, a volume information table 2911, an ownership management table 2912, an MPPK information table 2913, an MPPK load monitoring table 2914, a load balancing plan table 2915 and a load balancing execution time table 2916. Furthermore, the program unit 292 stores an ownership migration program 2921, a monitoring program 2922, a migration volume selection program 2923, a load information display program 2924, a load balancing execution instruction program 2925, and a load balancing execution time monitoring program 2926.

Note that various processing such as owner rights migration is executed by the various programs mentioned earlier. Although the processing subject of the various processing in the following description is the programs or each of the parts which the programs comprise, it goes without saying that, in reality, it is the storage apparatus 200 which executes this processing on the basis of these programs and the like. Furthermore, the foregoing programs also function as management units for managing the MPPK 210 which possesses volume owner rights.

Before describing the various control information of the memory package 290, the distribution destination MPPK table 263 stored in the memory 262 of the foregoing frontend package 260 will be described. As mentioned earlier, upon receiving an I/O from the host apparatus 100, the frontend package 260 distributes the 110 requests to the owner MPPK 210 of the volume 250 on the basis of the information of the I/O destination volume 250. The memory 262 of the frontend package 260 stores a distribution destination MPPK table 263 as information for distributing the I/O requests to the owner MPPK 210.

As shown in FIG. 3, the distribution destination MPPK table 263 is configured from a volume identification number field 2631 and distribution destination MPPK number field 2632. In this embodiment, the distribution destination MPPK table 263 stores information on a quantity corresponding to the path names which can be designated for the port 261. Note that the distribution destination MPPK table 263 may also be stored in the control information unit 291 in the memory package 290.

The volume identification number field 2631 stores numbers serving to uniquely identify the volumes 250 in the storage apparatus 200. For example, if the SCSI standard is used in communications with the host apparatus 100, LUN are stored. Furthermore, for example, the host apparatus 100 designates a port 261 for referring to the volume 250, and a volume number, and transmits an I/O request. Hence, depending on the WWN and port number contained in the I/O request, the port 261 identifies whether the I/O request is an I/O request addressed to port 261.

Furthermore, the distribution-destination MPPK number field 2632 stores identification numbers of the MPPK 210 handling the processing of the volumes 250 identified by the volume numbers. The MPPK number is a number serving to uniquely identify the MPPK in the storage apparatus 200. If a plurality of volume numbers are configured for one volume 250, the same values are stored in the distribution-destination MPPK number field 2632 of each entry.

The control information which is stored in the control information unit 291 in the memory package 290 will be described next. The volume information table 2911 will first be described. The volume information table 2911 is a table for managing the MP utilization of the volumes 250 and, as shown in FIG. 4, is configured from a volume identification number field 29111 and an MP utilization field 29112. The volume identification number field 29111 stores numbers serving to uniquely identify the volumes 250 in the storage apparatus 200. Furthermore, the MP utilization field 29112 stores information on the load of the MP utilization and so on required for the I/O processing for volumes identified by the numbers stored in the volume number field 2911.

The ownership management table 2912 will be described next. The ownership management table 2912 is a table for managing the ownership configured for the volumes 250 and, as shown in FIG. 5, is configured from a volume identification number field 29121 and an owner MPPK number field 29122. The volume identification number field 29121 stores numbers serving to uniquely identify the volumes 250 in the storage apparatus 200. Furthermore, the owner MPPK number field 29122 stores the MPPK numbers of the MPPK 210 with ownership of the volumes identified by the numbers stored in the volume identification number field 29121.

The MPPK information table 2913 will be described next. The MPPK information table 2913 is a table for managing the MP utilization of the MPPK 210 and, as shown in FIG. 6, is configured from an MPPK identification number field 29131, an MP utilization field 29132, and a dirty data rate field 29133. The MPPK identification number field 29131 stores numbers serving to identify the MPPK 210 in the storage apparatus 200. The MP utilization field 29132 stores load information such as the MP utilization and the like of the MPPK identified by the numbers stored in the MPPK identification number field 29131. The dirty data rate field 29133 stores the percentage of nonmirrored data on the disk (HDD 240) among data stored in the cache unit 293 and data of the volume 250 to which the MPPK 210 has ownership. The values stored in the MP utilization 29132 and the dirty data rate field 29133 are updated at regular intervals by a statistical program (not shown) and the updated values are stored.

The MPPK load monitoring table 2914 will be described next. The MPPK load monitoring table 2914 is a table for managing the MPPK load information which is monitored at regular intervals and, as shown in FIG. 7, is configured from a time field 29141 and an MP utilization (MPPK 0 to 2) field 29142. The time field 29141 stores the times when the MPPK utilization is monitored. In addition, the MP utilization field 29142 stores the MP utilization for each MPPK and in each MP utilization field 29142.

The load balancing plan table 2915 will be described next. The load balancing plan table 2915 is a table for managing an ownership migration plan for load balancing and, as shown in FIG. 8, is configured from a plan number field 29151, a generation time field 29152, a migration-source MPPK field 29153, a migration-destination MPPK field 29154 and a migration volume field 29155. The plan number field 29151 stores numbers for identifying the load balancing plan. The generation time field 29152 stores times when variations in the load to be eliminated by the load balancing plan are generated. The migration-source MPPK field 29153 stores MPPK numbers of the MPPK 210 serving as the ownership migration source. The migration-destination MPPK field 29154 stores MPPK numbers of MPPK 210 serving as the ownership migration destination. The migration volume field 29155 stores lists of volume numbers indicating volume groups being migrated.

The load balancing execution time table 2916 will be described next. The load balancing execution time table 2916 is a table for managing times for executing load balancing and, as shown in FIG. 9, is configured from an execution time field 29161 and a plan number field 29162. The execution time field 29161 stores the execution times of distribution load plans designated according to user inputs and is a blank field in cases where no execution time is designated by the user. The plan number field 29162 stores numbers identifying load balancing plans which are executed.

(1-4) Details of the Storage Apparatus Operation

Details of the operation of the storage apparatus 200 will be described next. First, the ownership migration processing by the ownership migration program 2921 will be described. The ownership migration program 2921 is a program which switches the owner MPPK of the volumes. The switching of the owner MPPK from one MPPK 210 to another MPPK 210 will be described hereinbelow in terms of migrating volume ownership, and the one MPPK 210 which is the ownership migration source is described using the term migration-source MPPK, while the other MPPK 210 which is the ownership migration destination is described using the term migration-destination MPPK.

Figure 10:
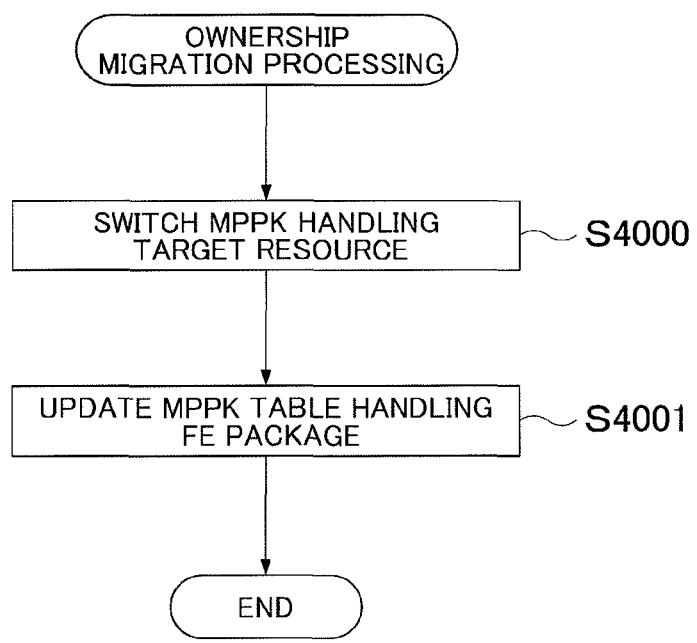
FIG. 10 is a flowchart showing processing content for ownership migration processing according to this embodiment.

As shown in FIG. 10, the ownership migration program 2921 first executes switching of the owner MPPK of the target resource (volume 250) (S4000). More specifically, the ownership migration program 2921 acquires the volume number of the volume 250 for which the ownership of the MPPK 250 are modified and the MPPK number of the migration-destination MPPK 250 and stores the migration-destination MPPK number in the owner MPPK field 29122 which corresponds to the volume number of the migration object volume 250 in the ownership management table 2912.

Furthermore, the ownership migration program 2921 updates the distribution-destination MPPK table 263 of the frontend (FE) package 260 (S4001). More specifically, the ownership migration program 2921 stores the MPPK number of the migration-destination MPPK in the distribution-destination MPPK number field 2632 which corresponds to the volume number of the volume 250 being migrated in the distribution-destination MPPK table 263 and stored in the memory 262 of the frontend package 260.

Monitoring processing by the monitoring program 2922 will be described next. The monitoring program 2922 is a program which detects variations in the load such as the MPPK utilization between the MPPK and which creates load balancing plans for eliminating load variations. Here, the load balancing plans are information which includes an indication of which volume 250 has its ownership migrated to which MPPK 250 in order to eliminate the load.

Figure 11:
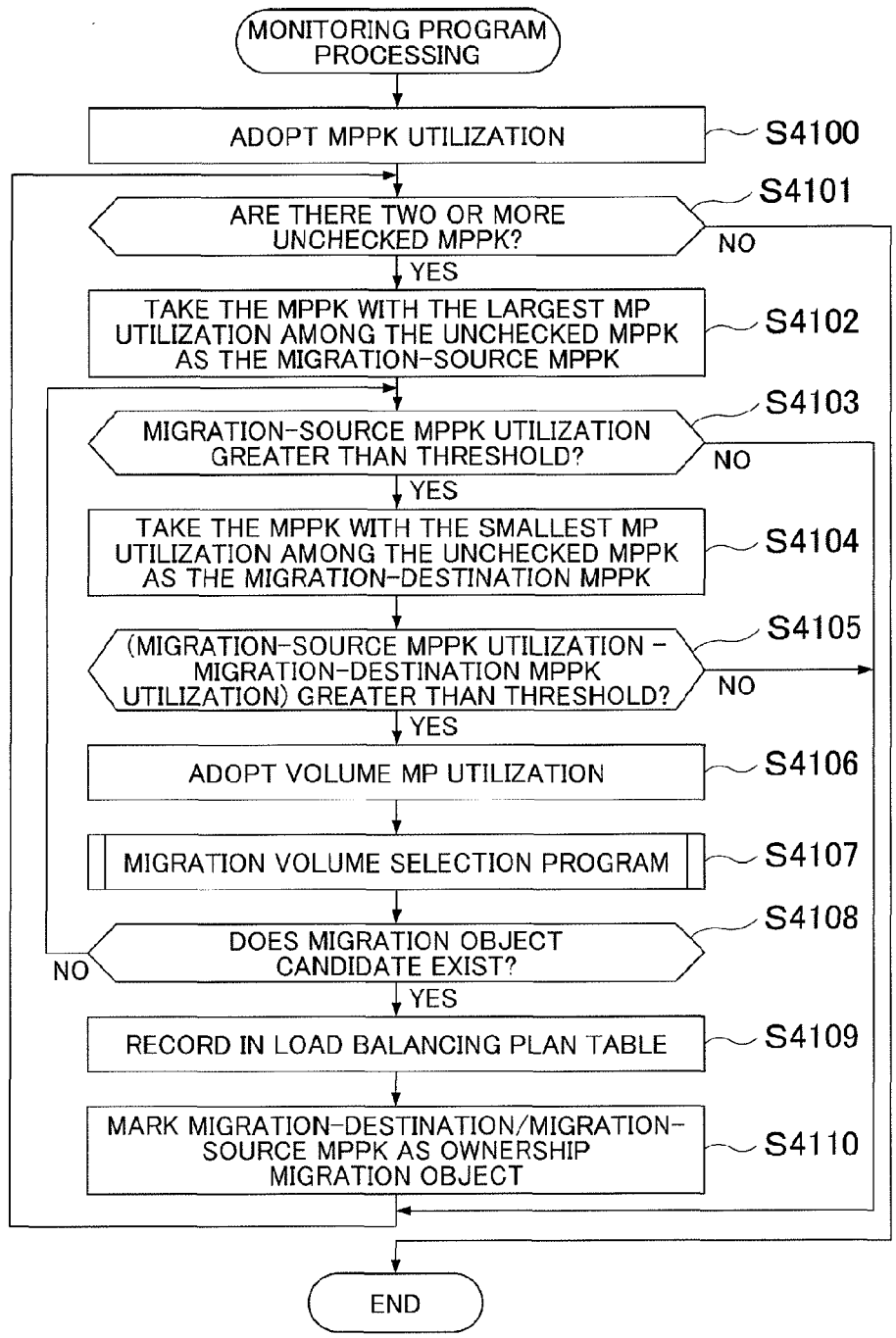
FIG. 11 is a flowchart showing processing content for monitoring processing according to this embodiment.

As shown in FIG. 11, the monitoring program 2922 first acquires a load such as the MPPK utilization of each MPPK 250 at a previous given time (S4100). The MPPK utilization will sometimes also be described hereinbelow as the MPPK load. The execution cycle of the monitoring program 2922 is preferably configured as a cycle of a certain length. This is because there are temporary concentrations of access to the volumes 250 due to starting up the operating system of the host apparatus 100 and the running of applications, for example, and the load balancing processing is prevented from being executed in responding sensitively to a short-term high load state resulting from the execution of statistical processing in the storage apparatus 200. Furthermore, a state where performance is not stable due to ownership migration may be detected right at the point where ownership migration is being executed or directly thereafter and execution of the monitoring program 2922 may be delayed for a certain length of time. It is thus possible to prevent the creation of unnecessary or erroneous load balancing plans depending on the load of the load balancing processing itself.

The monitoring program 2922 then determines whether or not there are two or more unchecked MPPK 250 (S4101) and terminates the processing in cases where there are not two or more MPPK. However, if it is determined in step S4101 that there are two or more unchecked MPPK, the monitoring program 2922 selects the MPPK 250 with the largest utilization and takes the MPPK as the migration-source MPPK (S4102).

Furthermore, the monitoring program 2922 determines whether or not the utilization of the migration-source MPPK selected in step S4102 is equal to or more than a predetermined threshold (S4103). Typically, the extension of the processing wait time due to the increased utilization is such that as the utilization is increased, the effect on the processing wait time due to fluctuations in the utilization at times when the utilization is small is very slight. It is therefore thought that, given a low utilization, the load balancing effect is small and the wait time caused by the processing of the ownership migration itself increases. Therefore, by taking, as a condition for load balancing, a certain increase in the utilization of the migration-source MPPK, an increase in the wait time, caused by the processing of the ownership migration itself, can be prevented.

If it is determined in step S4103 that the utilization of the migration-source MPPK is not equal to or more than a predetermined threshold, the monitoring program 2922 returns to step S1401 and repeats the processing of step S1401 and subsequent steps. If, on the other hand, it is determined in step S4103 that the utilization of the migration-source MPPK is equal to or more than a predetermined threshold, the monitoring program 2922 takes the MPPK with the smallest utilization among the unchecked MPPK as migration-destination MPPK (S4104). Note that the method of selecting the migration-source MPPK and the migration-destination MPPK in steps S4102 and S4104 is not limited to the foregoing method, rather, a method appearing in a different embodiment may also be selected.

The monitoring program 2922 determines whether or not there is a difference between the utilization of the migration-source MPPK selected in step S4102 and the utilization of the migration-destination MPPK selected in step S4104 is equal to or more than a predetermined threshold (S4105). More specifically, the monitoring program 2922 determines whether or not the difference between the MP utilization of the migration-source MPPK and the MP utilization of the migration-destination MPPK is equal to or more than a threshold. If it is determined in step S4105 that the difference in MP utilization is less than the threshold, the monitoring program 2922 returns to step S4104 without performing the load balancing and repeats the processing of step S4104 and subsequent steps. Accordingly, by not performing load balancing if the MP utilization difference is less than the threshold, it is possible to avoid a reduction in the processing performance rather than load balancing processing being executed in vain in response to slight fluctuations in the utilization for each MPPK.

However, if it is determined in step S4105 that the MP utilization difference is equal to or more than the threshold, the monitoring program 2922 refers to the volume information table 2911 and acquires load information for each volume 250 (S4106). Furthermore, based on the load information on the volumes acquired in step S4106, the monitoring program 2922 starts up the migration volume selection program 2923 in order to select the volumes 250 which are to be actually migrated (S4107). The processing of the migration volume selection program 2923 will be described in detail subsequently.

Further, the monitoring program 2922 determines whether one or more of the volumes 250 being migrated have been selected by the migration volume selection program 2923 executed in steps S4107 (S4108). If none of the volumes 250 being migrated has been selected in step S4108, the monitoring program 2922 returns to step S4103 and repeats the processing of step S4103 and subsequent steps.

If, however, it is determined in step S4108 that one or more of the volumes 250 to be migrated have been selected, the monitoring program 2922 records the load balancing plan in the load balancing table 2915 (S4109). More specifically, the monitoring program 2922 stores the MPPK number of the migration-source MPPK in the migration-source MPPK field 29153, stores the MPPK number of the migration-destination MPPK in the migration-destination MPPK field 29154, stores a list of the volume numbers indicating a volume group of the migration objects selected in step S4107 in the migration volume field 29155 and the current times (load variation generation times) in the generation time fields 29152 respectively.

Furthermore, the monitoring program 2922 marks the migration-source MPPK and migration-destination MPPK as the ownership migration object (S4110) and returns to step S4101. In addition, if a load balancing plan between MPPK of the same content or the same combination is detected in a short time, the load balancing may be recorded collectively. Accordingly, if load variations which follow the same trend continue to be successively generated, the creation of the same load balancing plan can be avoided for the same MPPK combination in the operation of the subsequent cycle by the monitoring program 2922.

The migration volume selection program 2923 which is started up in step S4107 above will be described next. Four examples of the migration volume selection processing by the migration volume selection program 2923 are given hereinbelow.

Figure 12:
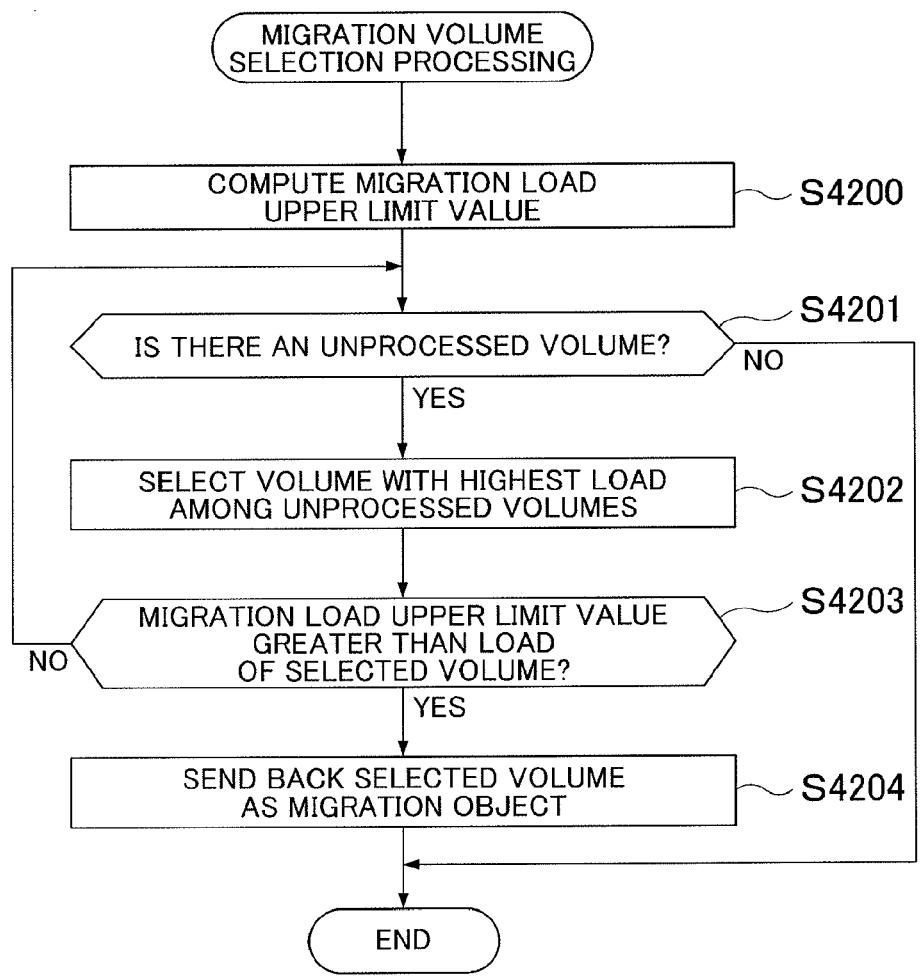
FIG. 12 is a flowchart showing processing content of migration volume selection processing according to this embodiment.

A first example of the migration volume selection processing will be described first. As shown in FIG. 12, the migration volume selection program 2923 first computes the migration load upper limit value (S4200). The volumes to be migrated are selected such that the total value of the load of the volumes 250 being migrated from the migration-source MPPK to the migration-destination MPPK is less than the migration upper limit value. More specifically, the migration volume selection program 2923 calculates half the difference in utilization between the migration-source MPPK and migration-destination MPPK as the migration upper limit value. As a result, there is no inversion in the utilization following migration and the load balancing can be performed in a state where stability is maintained.

The migration volume selection program 2923 then determines whether the volumes are unprocessed volumes (S4201). If it is determined in S4201 that there are no unprocessed volumes, the migration volume selection program 2923 terminates the processing. However, if it is determined in step S4201 that there is an unprocessed volume, the migration volume selection program 2923 selects the volume with the highest load among the unprocessed volumes (S4202).

It is then determined whether the load of the volumes selected in step S4202 is less than the migration load upper limit value calculated in step S4200 (S4203). If it is determined in step S4203 that the load is not less than the migration load upper limit value, the migration volume selection program 2923 returns to step S4201 and repeats processing of step S4201 and subsequent steps. However, if it is determined in step S4203 that the load is less than the migration load upper limit value, the migration volume selection program 2923 returns the volumes selected in step S4202 to the monitoring program 2922 as the migration object volume.

In a first example of the foregoing migration volume selection processing, by selecting only one volume for migration, the effect on the I/O when ownership are migrated is minimized more than when a plurality of volumes are migrated at once. For example, in a state where MP utilization is close to 100%, that is, in a state where an MP is subject to a performance bottleneck, the load is distributed and the performance bottleneck is eliminated, and the MP utilization is thought to increase once again because the host apparatus 100 is capable of issuing a greater number of I/Os. Hence, among the volumes for which the migration-source MPPK has volume ownership, there may be cases where, for both migrated volumes and non-migrated volumes, the load is greater than before the migration. As a result, the load is inverted between the migration-source MPPK and the migration-destination MPPK and the generation of reverse migration from the migration-destination MPPK to the migration-source MPPK is once again also considered. Therefore, in a state where the MP is subject to a performance bottleneck, load balancing while maintaining stability can be implemented by suppressing excessive migration by migrating the volumes 250 one at a time.

Figure 13:
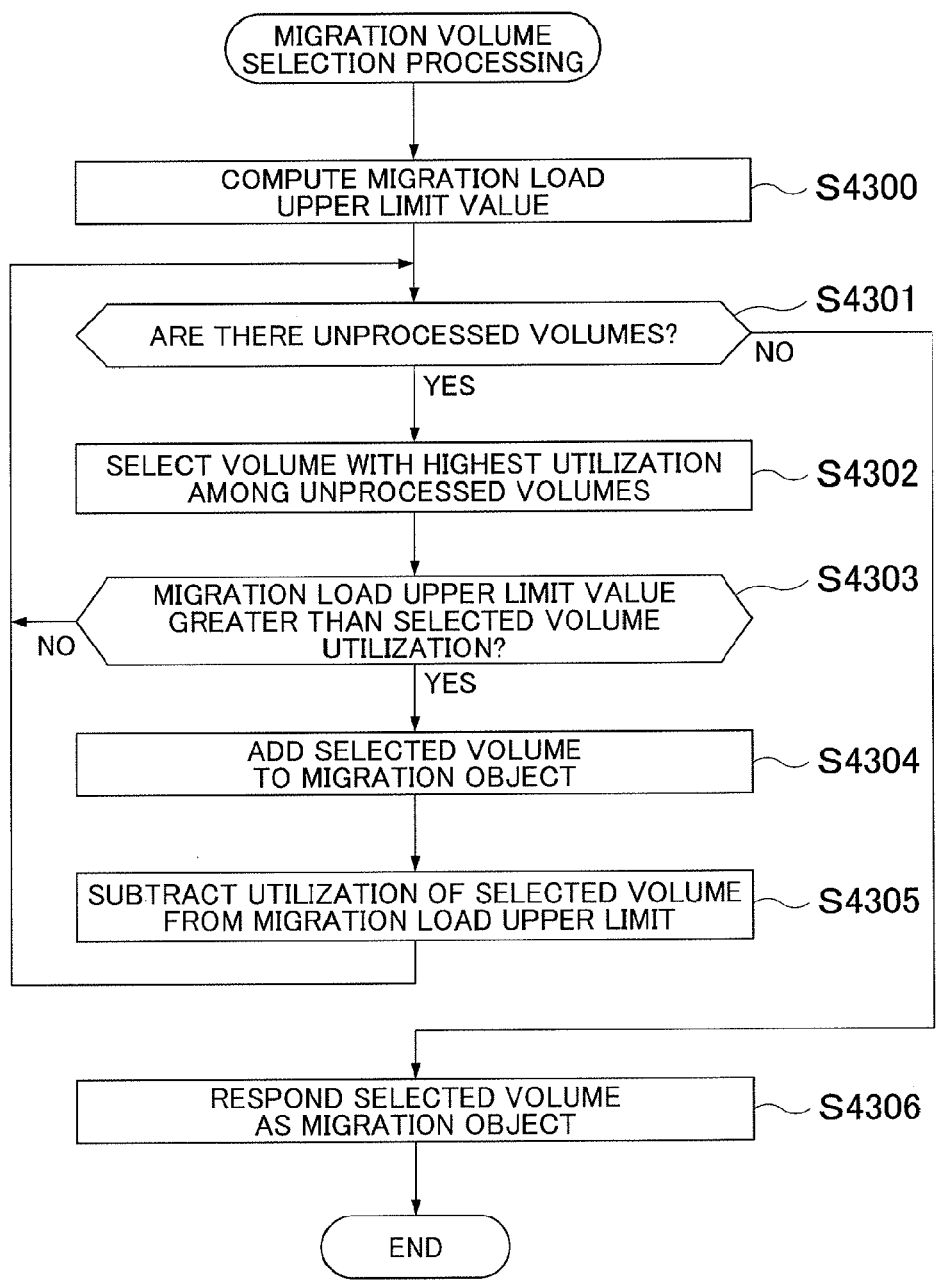
FIG. 13 is a flowchart showing processing content of migration volume selection processing according to this embodiment.

A second example of the migration volume selection processing will be described next. As shown in FIG. 13, the processing from steps S4300 to S4303 is the same processing as steps S4200 to S4203 in FIG. 12 and therefore a detailed description is not included.

In step S4304, the migration volume selection program 2923 records the volumes 250 selected in step S4302 as migration objects (S4304). Furthermore, the migration volume selection program 2923 subtracts the utilization of the volumes selected in step S4302 from the migration load upper limit value calculated in step S4300 (S4305) and returns to step S4301.

As a result of the foregoing processing, a plurality of volumes can be selected in order starting with the volume 250 with the largest load and to the extent that the migration load upper limit value calculated in step S4300 is not exceeded. Hence, a load balancing effect can be obtained in a shorter time than by selecting a plurality of migration volumes at once and migrating the volumes. Furthermore, in the foregoing processing, when a plurality of volumes 250 are selected, these volumes are selected in order starting with the volume with the largest load. As a result, a smaller number of volumes can be selected and hence the number of times ownership migration processing is performed is reduced and the load balancing can be completed in a short time.

A third example of migration volume selection processing will be described next.

Figure 14:
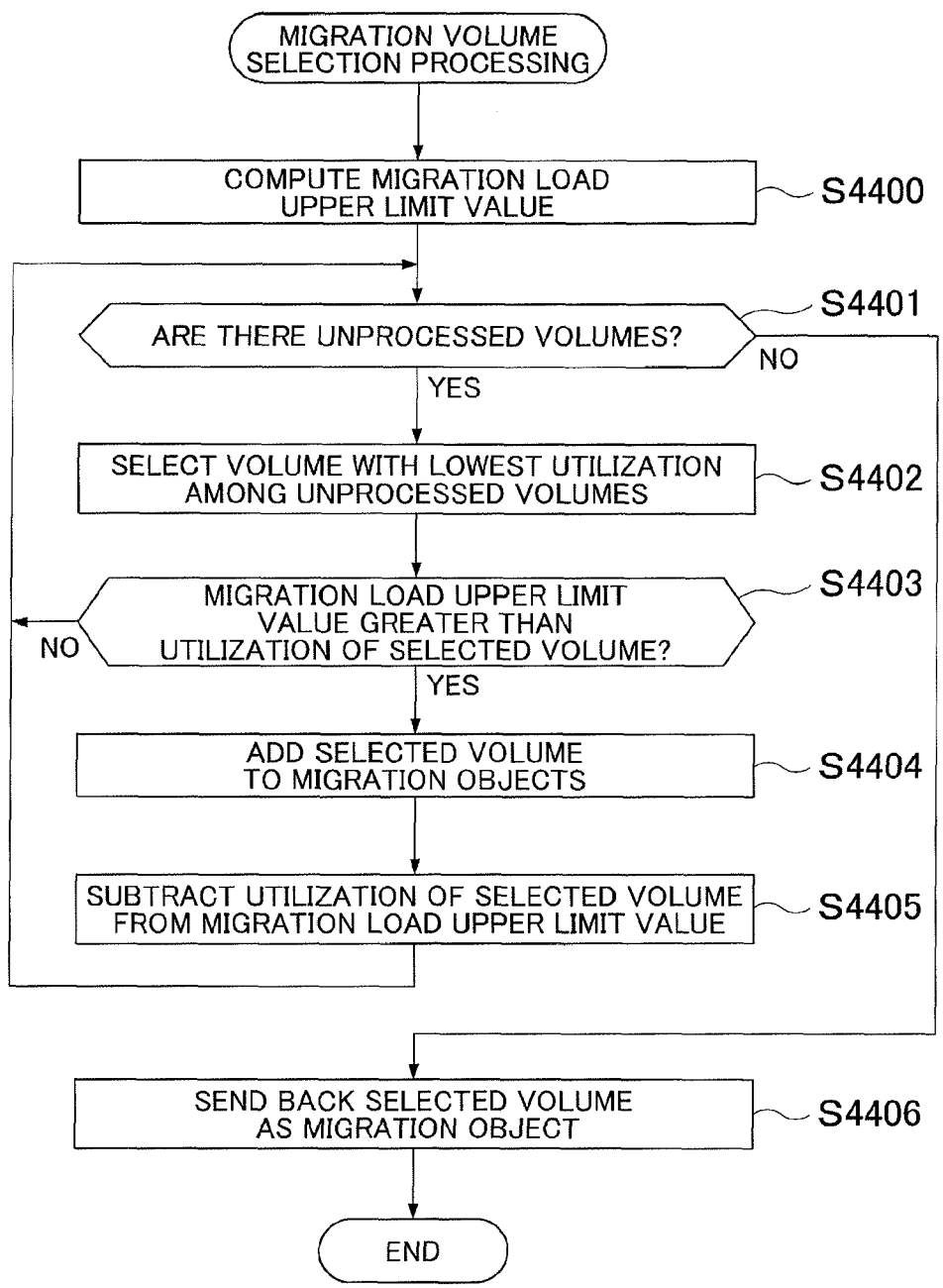
FIG. 14 is a flowchart showing processing content of migration volume selection processing according to this embodiment.

The migration volume selection processing shown in FIG. 14 differs only from the migration volume selection processing shown in FIG. 13 with respect to step S4402. In the migration volume selection processing shown in FIG. 13, the migration volume selection program 2923 selects the volume with the largest load among the unprocessed volumes; however, in the migration volume selection processing shown in FIG. 14, the volume with the lowest load among the unprocessed volumes is selected in step S4402. As a result, in the third migration volume selection processing example, a plurality of volumes are selected in order starting with the volume with the smallest load to the extent that the migration load upper limit value is not exceeded.

Accordingly, in the migration volume selection processing shown in FIG. 14, because the volume with the smallest load possible is selected, the load on each volume is small and the effect on the I/O to and from the host apparatus 100 when ownership are migrated can be suppressed.

A fourth example of the migration volume selection processing will be described next. In the migration volume selection processing shown in FIG. 15, the processing of step S4500 is the same as step S4200 of the migration volume selection processing shown in FIG. 12, and hence a detailed description is not included. Furthermore, the migration volume selection program 2923 lists all combinations including one or more of all volumes to which the migration-source MPPK possesses ownership and executes the processing of the steps S4502 to S4504 on each of these combinations.

First, the migration volume selection program 2923 calculates the total value of the loads of the volumes for the combinations of volumes 250 and determines whether the total value is less than the migration load upper limit value (S4502). If it is determined in step S4502 that the total value of the volume loads is not less than the migration load upper limit value, the migration volume selection program 2923 returns to step S4501 and executes the processing of step S4502 and subsequent steps on the next volume combination.

However, if it is determined in step S4502 that the total value of the volume loads is less than the migration load upper limit value, the migration volume selection program 2923 checks whether the difference between the total value of the volume loads and the migration load upper limit value for all the combinations checked thus far (S4503).

If it is determined in step S4503 that the difference between the total value of the volume loads and the migration load upper limit value is minimal for all the checked combinations, the migration volume selection program 2923 provisionally takes these combinations as migration object volumes. However, if it is determined in step S4503 that the difference between the total value of the volume loads and the migration load upper level value is not minimal for all combinations checked thus far, the migration volume selection program 2923 returns to step S4501 and executes the processing of step S4502 and subsequent steps for the subsequent combinations.

Furthermore, the processing of steps S4502 to S4504 is executed for all volume combinations and combinations with which the load is close to the highest migration load upper limit value are selected as the migration object volumes and information on these migration object volumes is returned to the monitoring program 2922. With the foregoing migration volume selection processing, the load balancing accuracy can be raised still further since a combination volume group which is closest to the migration load upper limit value can be selected.

Figure 15:
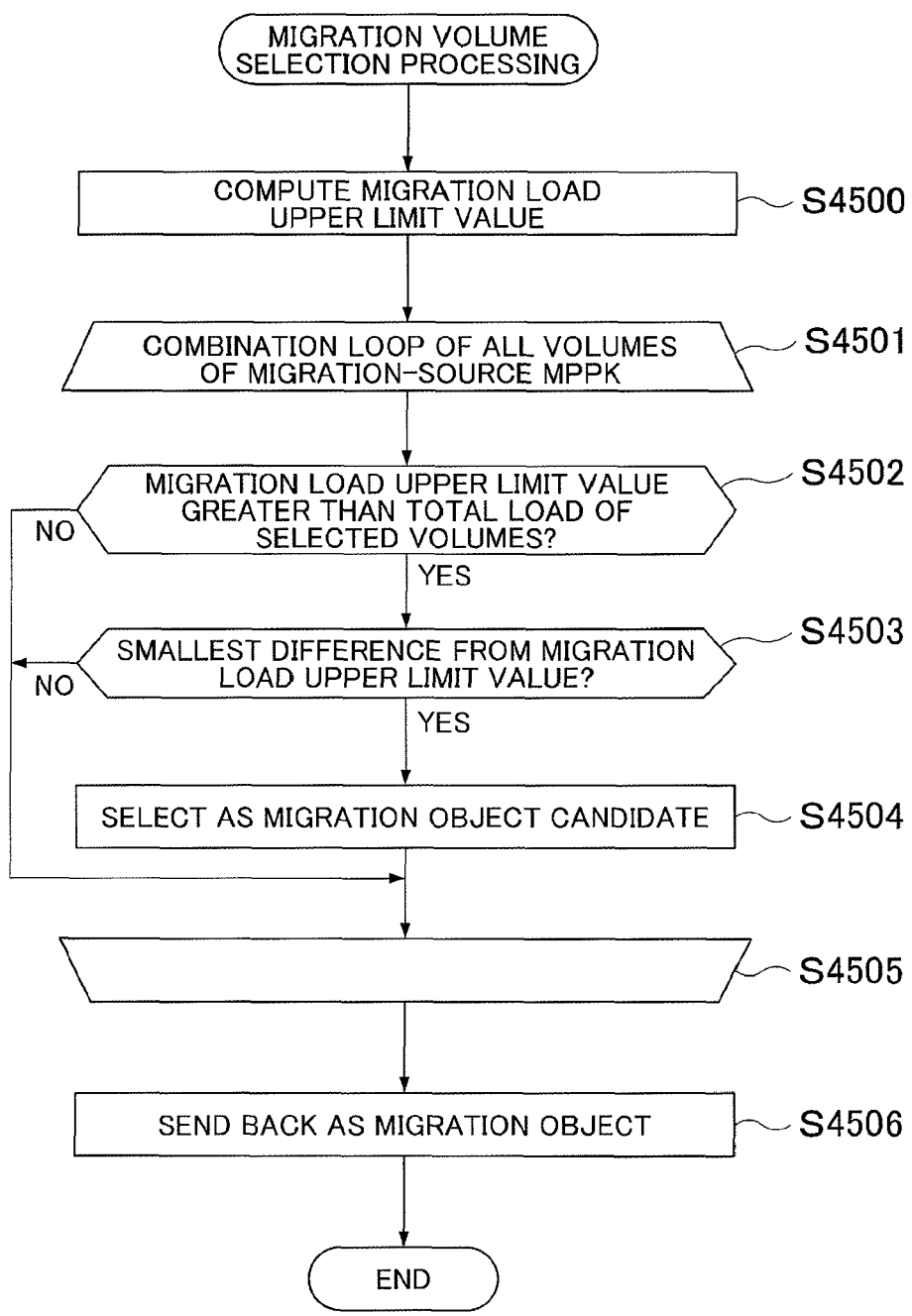
FIG. 15 is a flowchart showing processing content of a migration volume selection processing according to this embodiment.

Note that the algorithm for searching for all the combinations of volumes to which the migration-source MPPK possesses ownership is not limited to the flowchart shown in FIG. 15, rather, search processing may also be expedited by applying a divide-and-conquer method algorithm or a dynamic programming algorithm or the like.

The load information display screen 3000 for notifying the user, system administrator or service technician of the generation of variations in the load between MPPK will be described next. If a load information display request is transmitted to the storage apparatus 200 from the service processor 270 in response to an input from the user or the like, the processor 211 of the storage apparatus 200 executes the load information display program 2924 and causes the service processor 270 to display the load information display screen 3000.

Figure 16:
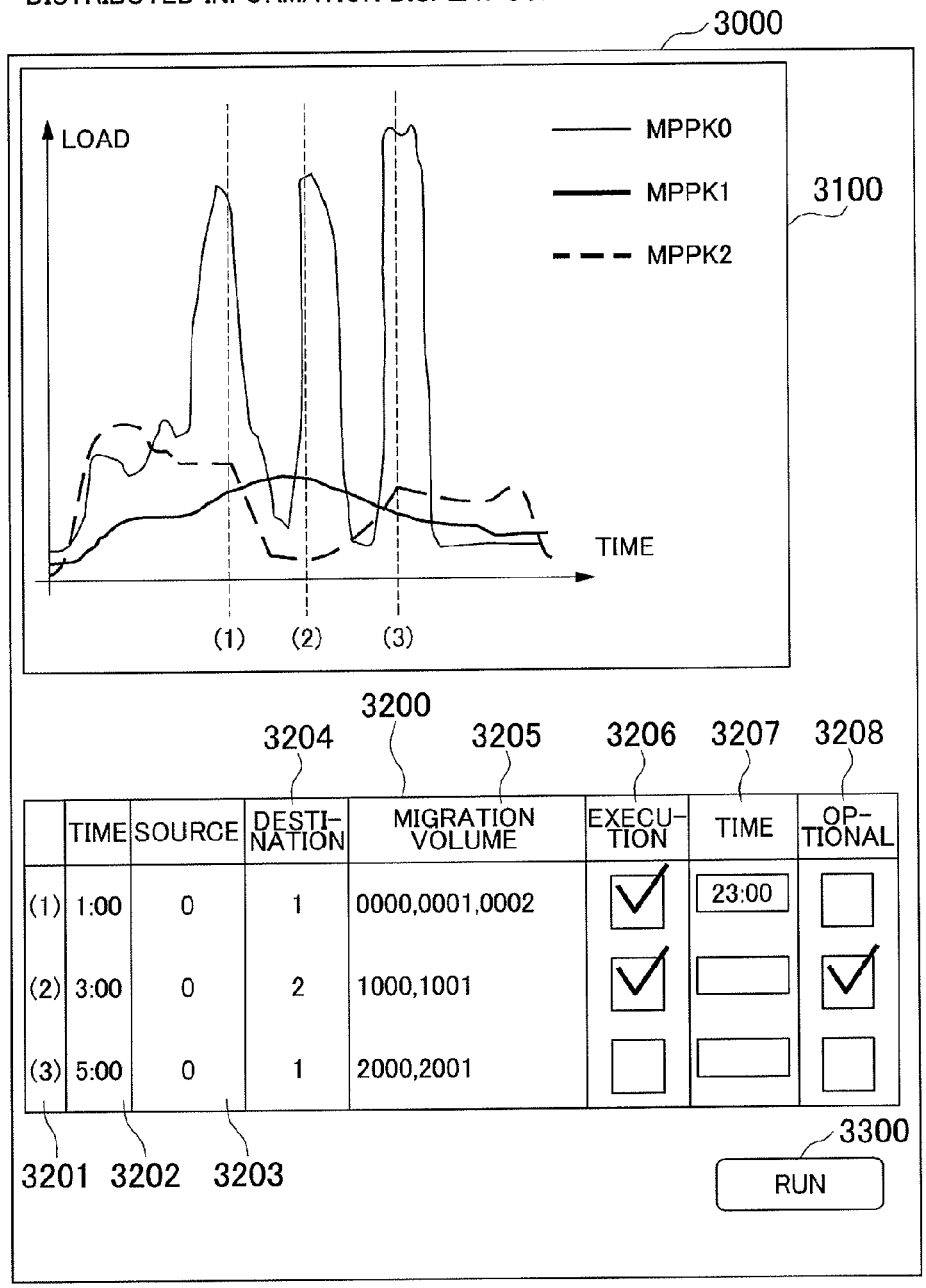
FIG. 16 is a conceptual view showing a load information display screen according to this embodiment.

The load information display screen 3000 is configured, as shown in FIG. 16, from a flag display unit 3100, the execution instruction display unit 3200 and an execution instruction unit 3300.

The graph display unit 3100 displays the utilization of each MPPK plotted against time on a graph. The execution instruction display unit 3200 displays information on the load balancing plan and is configured from a load balancing plan number display area 3201, a time display area 3202, a migration-source MPPK display area 3203, a migration-destination MPPK display area 3204, a migration volume display area 3205, an execution instruction check box display area 3206, an execution time input display area 3207, and an optional instruction check box display area 3208. Furthermore, the execution instruction unit 3300 displays an execution instruction button.

The details of the operation of the load information display program 2924 will now be described using the load information display screen 3000. First, the load information display program 2924 reads each of the entries of the MPPK load monitoring table 2914 and displays the plots of the MP utilization for each MPPK against time on the graph display unit 3100.

The load information display program 2924 then adds the entries corresponding to each entry in the load balancing plan table 2915 to the execution instruction display unit 3200. More specifically, the values which are stored in the plan number field 29151 of the load balancing plan table 2915 are displayed in the load balancing plan number display area 3201, the values stored in the generation time field 29152 are displayed on the time display area 3202, the values stored in the migration-source MPPK field 29153 are displayed in the migration-source MPPK display area 3203, the values stored in the migration-destination MPPK field 29154 are displayed in the migration-destination MPPK display area 3204, and the list of volume numbers stored in the migration volume field 29155 is displayed in the migration volume display area 3205. Furthermore, an execution instruction checkbox which enables the user to issue an execution instruction to each of the load balancing plans is displayed on the execution instruction checkbox display area 3206, a space for inputting an execution time is displayed on the execution time input display area 3207, and an optional designation checkbox for indicating whether the execution time is to be determined by the system is displayed in the optional designation checkbox display area 3208.

In addition, the numbers displayed on the migration volume display area 3205 are not volume numbers, rather, the numbers may be device identification information and device identifiers for the host apparatus 100. The device identification information is, for example, numbers of the ports connected to the host apparatus 100 as well as port numbers and the device identifiers are information such as LUN of the SCSI, for example.

By referring to the load information display screen 3000, the user is able to identify when and in which MPPK load variations are generated. For example, the users are able to specify the processing and applications which are performed on the host apparatus based on the time when the load variation was generated and starting with the device with the highest load (which is the migration object for load balancing). As a result, it is possible to determine whether the load variation generated in the storage apparatus 200 is a load variation which, from the perspective of the user, must be eliminated, thus making it possible to avoid unnecessary load balancing.

Furthermore, by inputting the time when the load balancing is to be executed in the execution time input display area 3207, the user is able to indicate times when there are no problems even when load balancing is operating such as time zones when there is a low task-induced load.

In addition, the optional designation checkbox display area 3208 is designated if there are no problems irrespective of when load balancing is executed. Accordingly, the user is able to alleviate the burden of designating times relating to all the load balancing. In addition, the display of the optional designation checkbox display area 3208 may be excluded to clear the execution time input display area 3207 as an alternative to checking the optional designation checkbox display area 3208.

Figure 17:
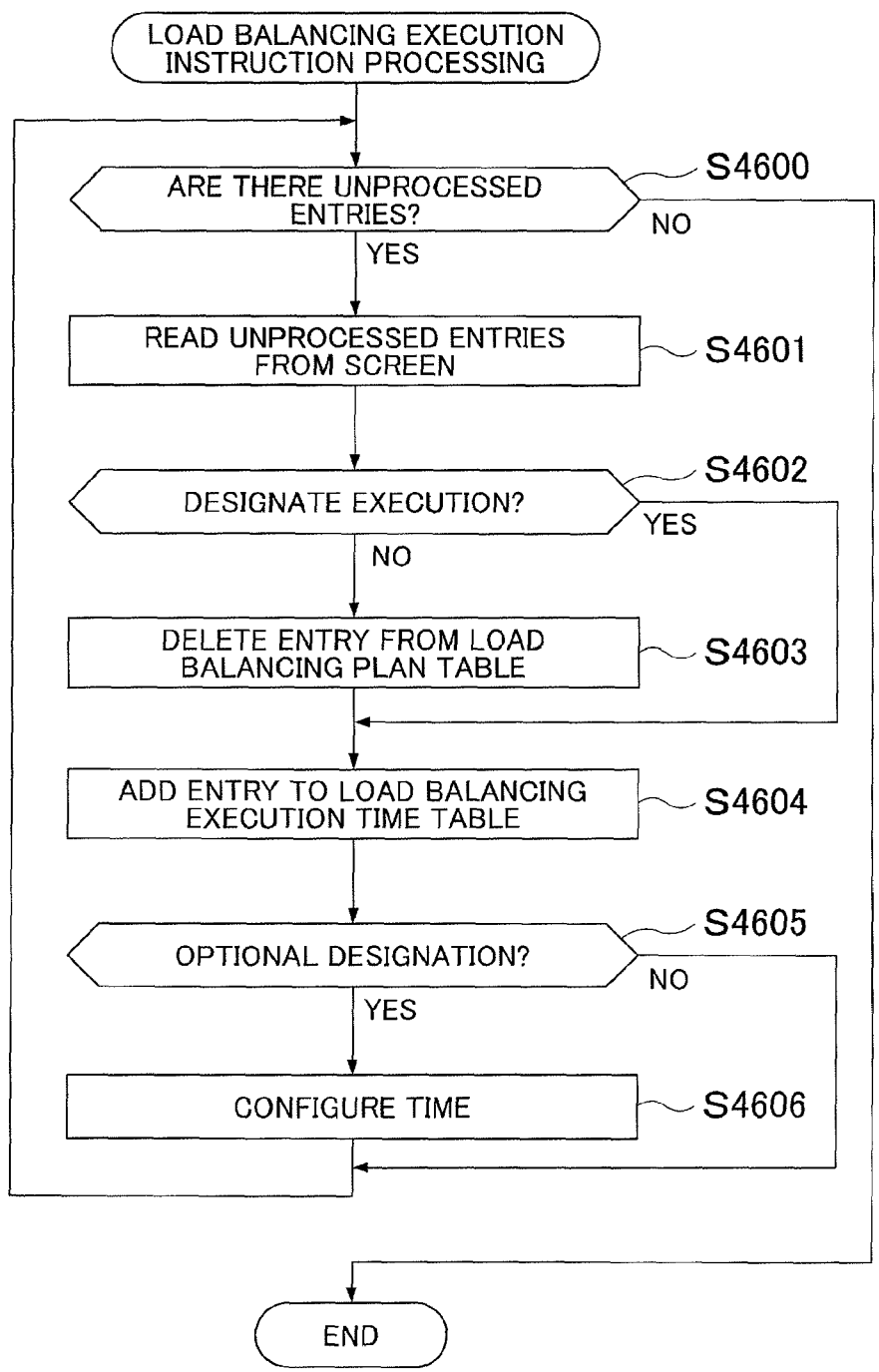
FIG. 17 is a flowchart showing processing content of a load balancing execution instruction processing according to this embodiment.

Details on the load balancing execution instruction processing by the load balancing execution instruction program 2925 will be provided next. As a result of the execution instruction button on the foregoing load information display screen 3000 being pressed due to a user input, the load balancing execution instruction processing is executed. As shown in FIG. 17, the load balancing execution instruction program 2925 first checks whether there are unprocessed entries in the execution instruction display unit 3200 of the Toad information display screen 3000 (S4600) and terminates the processing if there are no unprocessed entries. If, however, it is determined in step S4600 that there is an unprocessed entry, the load balancing execution instruction program 2925 reads unprocessed entries of the execution instruction display unit 3200 (S4601).

Furthermore, the load balancing execution instruction program 2925 determines whether execution is designated for the entries read in step S4601 (S4602). More specifically, the load balancing execution instruction program 2925 determines whether the checkbox of the execution designation checkbox display area 2305 is ON.

Further, if it is determined in step S4602 that the checkbox is OFF, the load balancing execution instruction program 2925 deletes the entries from the load balancing plan table 2915 (S4603). If, however, it is determined in step S4602 that the checkbox is ON, the load balancing execution instruction program 2925 adds entries to the load balancing execution time table 2916 (S4604). More specifically, the load balancing execution instruction program 2925 stores values in the plan number field 29162 of the load balancing execution time table 2916 and in the plan number field 29151 of the load balancing plan table 2915.

Furthermore, the load balancing execution instruction program 2925 determines whether or not the checkbox of the optional designation checkbox display area 3208 for the target entries is ON (S4605). If it is determined in step S4605 that the checkbox of the optional designation checkbox display area 3208 is ON, the load balancing execution instruction program 2925 stores the execution times input to the execution time input display area 3207 in the execution time field 29161 of the load balancing execution time table 2916. However, if it is determined in step S4605 that the checkbox of the optional designation checkbox display area 3208 is OFF, the load balancing execution instruction program 2925 skips the processing of step S4606, blanks the execution time field 2916, and repeats the processing of step S4600 and subsequent steps.

The load balancing execution time monitoring processing which monitors the timing with which the load balancing processing is executed will be described next. The load balancing execution time monitoring processing is executed by the load balancing execution time monitoring program 2926 at regular intervals (every minute, for example) based on instructions from the processors 211.

Figure 18:
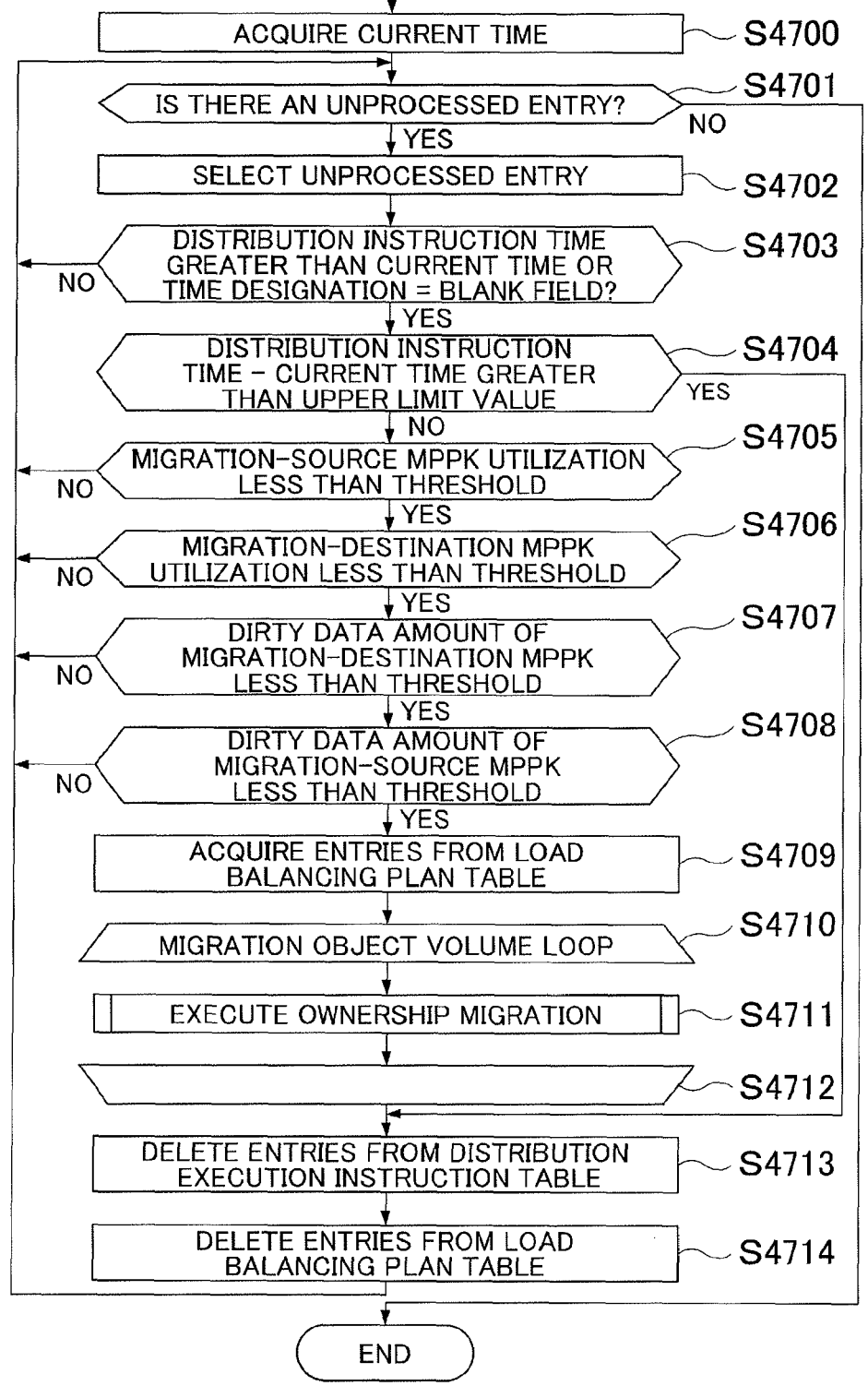
FIG. 18 is a flowchart showing processing content of load balancing execution time monitoring processing according to this embodiment.

As shown in FIG. 18, the load balancing execution time monitoring program 2926 first acquires the current time (S4700). The load balancing execution time monitoring program 2926 then determines whether there are unprocessed entries (S4701) and terminates the processing if there are no unprocessed entries. If, however, it is determined in step S4701 that there is an unprocessed entry, the load balancing execution time monitoring program 2926 advances to step S4703.

In step S4703, the load balancing execution time monitoring program 2926 refers to the times stored in the execution time field 29161 of the load balancing execution time table 2916 (hereinafter described as the distribution instruction time) and determines whether the time is greater than the current time or whether the time designation is optional (execution time field 29161 is a blank field) (S4703). If it is determined in step S4703 that the distribution instruction time is not greater than the current time and the time designation is not optional, the load balancing execution time monitoring program 2926 returns to step S4701 and executes the processing of step S4701 or subsequent steps. If, however, it is determined in step S4703 that the distribution instruction time is greater than the current time, the load balancing execution time monitoring program 2926 determines whether the difference between the distribution instruction time and the current time exceeds a preset upper limit value (S4704).

If it is determined in step S4704 that the difference between the distribution instruction time and the current time exceeds the preset upper limit threshold, the load balancing execution time monitoring program 2926 does not execute the load balancing processing and advances to step S4713. If, however, it is determined in step S4704 that the difference between the distribution instruction time and the current time does not exceed the preset upper limit threshold, the load balancing execution time monitoring program 2926 determines, each time load balancing processing is executed, whether the state of the migration-source MPPK and the migration-destination MPPK is a state in which the performance is readily affected to a large degree.

More specifically, the load balancing execution time monitoring program 2926 refers to the MP utilization field 29132 in the MPPK information table 2913 and determines whether the utilization of the migration-source MPPK and the migration-destination MPPK exceeds a predetermined threshold (S4705, S4706). If the utilization of the migration-source MPPK or migration-destination MPPK exceeds the predetermined threshold, the load balancing execution time monitoring program 2926 returns to step S4701 and executes the processing of step S4701 and subsequent steps. If, however, the utilization of the migration-source MPPK and migration-destination MPPK does not exceed the preset threshold, the load balancing execution time monitoring program 2926 advances to step S4707.

By checking the MP utilization in steps S4705 and S4706, it is possible to prevent the distribution processing from being executed in a state where the utilization of the migration-source MPPK or the migration-destination MPPK is high and prevent the I/O processing performance from being greatly affected by the processing of the ownership migration itself.

Furthermore, in step S4707, the load balancing execution time monitoring program 2926 refers to the dirty data rate field 29133 of the MPPK information table 2913 and checks whether the percentage of data for which writing to disk (HDD 240) is not complete, among the data stored in the cache memory in the migration-source MPPK and the migration-destination MPPK does not exceed the predetermined threshold (S4707 and S4708). If the percentage of data for which writing to disk (HDD 240) is incomplete among the data stored in the cache memory in the migration-source MPPK or migration-destination MPPK exceeds the predetermined threshold, the load balancing execution time monitoring program 2926 returns to step S4701 and executes the processing of step S4701 and subsequent steps. If, however, the percentage of the data for which writing to the disk (HDD 240) is incomplete among the data stored in the cache memory in the migration-source MPPK and the migration-destination MPPK does not exceed the predetermined threshold, the load balancing execution time monitoring program 2926 advances to step S4709.

By checking the dirty data amount in steps S4707 and S4708, it is possible to prevent the mirroring processing of the nonmirrored data from generating an excessive load in the migration-source MPPK or migration-destination MPPK following the load balancing and to prevent a drop in performance which temporarily renders I/O execution impossible.

Furthermore, similarly to the checking of the MP utilization and dirty data rate in steps S4705 to S4708, a check may also be performed to determine whether there is scope for adequately suppressing the effect on the I/O processing even when load balancing processing is also performed for resources available to the migration-source MPPK or migration-destination MPPK. Such checking of the resources available to the MPPK will be described in detail hereinbelow.

As mentioned earlier, when the time designated by the user is exceeded, as a result of determining whether or not to perform execution in light of the operating state of various hardware in the storage apparatus 200, there is overlap between temporary high load states and load balancing execution timing are significant and it is possible to prevent user tasks from being affected.

Furthermore, in step S4704, instead of suspending execution of the load balancing processing, the load balancing execution time monitoring program 2926 may advance to step S4709 and compulsorily execute load balancing processing. Accordingly, the load balancing designated by the user can be reliably executed while suppressing the effect on the user tasks.

In addition, in this embodiment, it is assumed that the timing with which the user executes the load balancing processing is designated by the hour, but the time zone (start time and end time) may also be designated for each load balancing plan. In this case, the difference between the start time and the end time is employed as an upper limit value which is used in the determination in step S4704.

Furthermore, the load balancing execution time monitoring program 2926 acquires the load balancing plan number corresponding to the entry from the plan number field 29162 of the load balancing execution time table 2916 and refers to the entry of the load balancing plan table 2915 corresponding to the number (S4709). In addition, the load balancing execution time monitoring program 2926 repeatedly executes ownership migration in a quantity that corresponds to the volume number stored in the migration volume field 29155 of the entry referred to in step S4709 and migrates the ownership of the volume identified by the volume number (S4711).

In addition, the load balancing execution time monitoring program 2926 finally deletes the entry which is the execution target of the load balancing processing from the load balancing execution instruction table 2916 (S4713) and also deletes the entry which is the execution target of the load balancing processing from the load balancing plan table 2915 (S4714).

Note that, in addition to the check performed in steps S4705 to S4708, consideration is also paid to the load of the migration-object volume referenced and acquired in step S4709 and, if the load is high, the migration of ownership may also be excluded. Processing in which ownership is migrated by also considering the load of the migration object volume will be described in detail subsequently.

In the foregoing embodiment, the user was notified of load variations between MPPK and load balancing execution instructions from the user were implemented via the service processor screen, but the present invention is not limited to this example, rather, other notifying means such as electronic mail and SCSI-based special commands may also be used.

In addition, if a plurality of volumes 250 are associated by the foregoing storage function, ownership to the associated plurality of volumes may also always be retained by the same MPPK 210. More specifically, the total MP utilization of the plurality of associated volumes may also be stored in the MP utilization field 29112 of one volume among the associated volumes 250 in the volume information table 2911. Furthermore, when volume ownership is migrated by the ownership migration program 2921, all the ownership of the plurality of associated volumes may also be migrated.

(1-5) Effect of the Embodiment

As mentioned earlier, in the computer system 1 according to this embodiment, MP utilization variations (processing load variations) of the plurality of MPPK 210 provided in the storage apparatus 200 can be detected and load balancing plans (load balancing target information) can be generated which include information on the volumes to which the ownership is migrated and information on the migration-source MPPK and migration-destination MPPK on the basis of variations in the MP utilization, and volume ownership can be migrated with timing such that the processing load of the migration-destination MPPK contained in the load balancing plan is low. Accordingly, instead of executing load balancing instantly at the time the MPPK utilization variation is detected, information required for load balancing can be acquired and MPPK load balancing processing can be executed with timing such that the normal task load is low. Therefore, with this embodiment, load balancing processing can be executed while minimizing the effect on user tasks.

(2) Second Embodiment (2-1) Overview of the Embodiment

Although load balancing processing execution times and load balancing plans are designated in response to user inputs in the first embodiment, in the case of this embodiment, the storage apparatus 200 selects the load balancing processing execution times and load balancing plans and automatically executes load balancing processing.

(2-2) Configuration of Computer System

The hardware configuration of the computer system 2 according to this embodiment is the same as the hardware configuration of the computer system 1 according to the first embodiment and hence a detailed description is not included. Furthermore, in the case of the software configuration of the computer system 2, since information which is stored in the memory package 290 of the storage apparatus 200 differs from that of the first embodiment, the configuration, which is different from the first embodiment, will in particular be described in detail hereinbelow.

Figure 19:
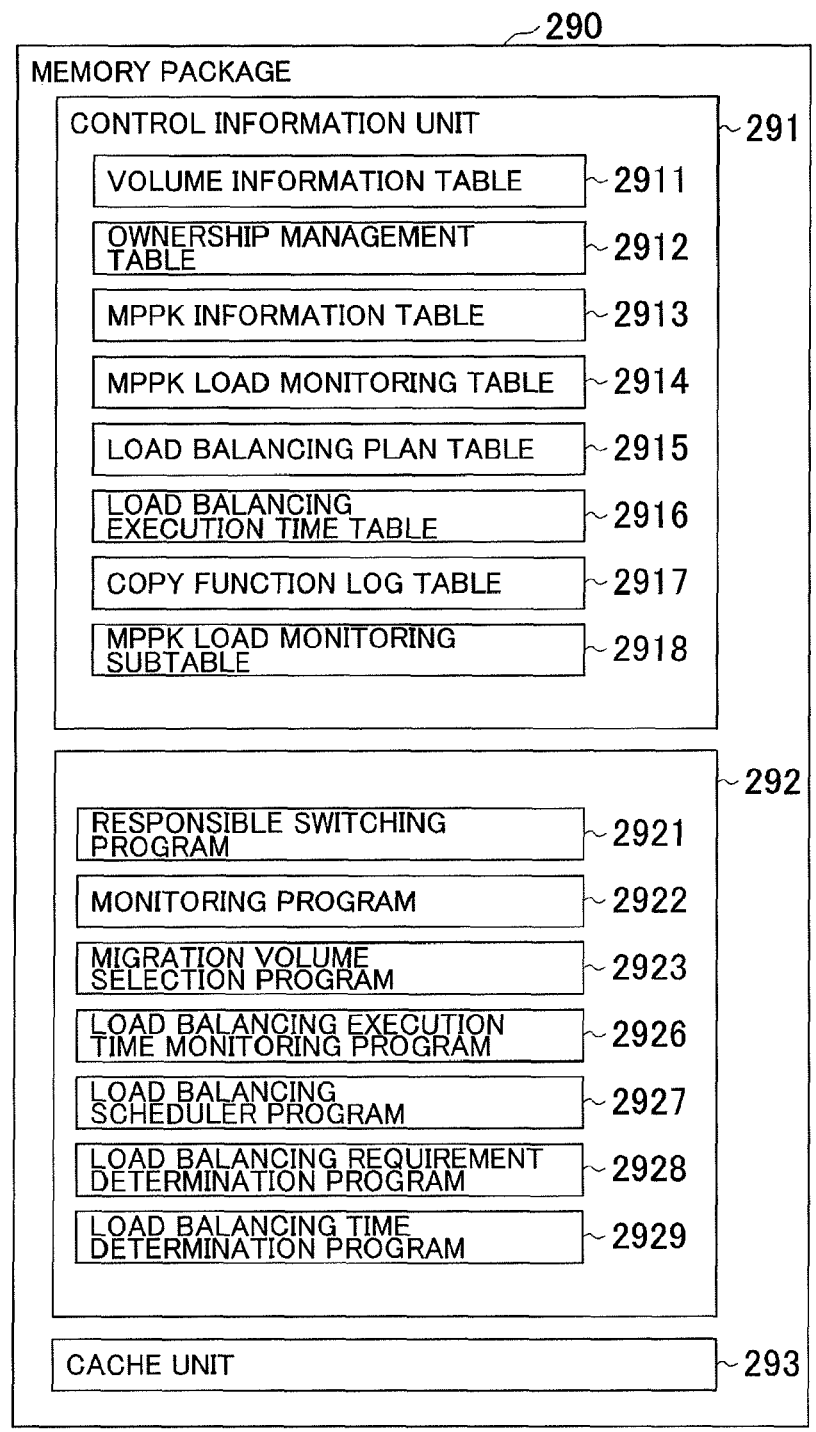
FIG. 19 is a block diagram showing control information of a storage apparatus according to a second embodiment of the present invention.

According to this embodiment, as shown in FIG. 19, the control information unit 291 of the memory package 290 stores a copy function log table 2917 and an MPPK load monitoring subtable 2918 in addition to the volume information table 2911, the ownership management table 2912, the MPPK information table 2913, the MPPK load monitoring table 2914, the load balancing plan table 2915 and the load balancing execution time table 2916. In addition, the program unit 292 stores a load balancing scheduler program 2927, a load balancing requirement determination program 2928, and a load balancing time determination program 2929 in addition to the ownership migration program 2921, the monitoring program 2922, the migration volume selection program 2923, the load information display program 2924, the load balancing execution instruction program 2925, and the load balancing execution time monitoring program 2926.

The copy function log table 2917 will be described first. The copy function log table 2917 is a table for recording operations of the copy function. Here, a copy function is a function for copying data of volumes in the storage apparatus 200. The set of the copy source volume 250 and the copy destination volume 250 is described hereinbelow as the copy pair.

The operations of the copy function include copy pair formation, copy pair division, and copy pair re-synchronization, and the user issues various operation instructions via the service processor 270. Upon receiving a copy-pair formation instruction from the user via the service processor 270, the storage apparatus 200 executes copy processing for copying all data from the copy-source volume to the copy-destination volume and matches all the volume data. Upon subsequently receiving a copy pair division instruction from the user via the service processor 270, the storage apparatus 200 suspends synchronization of the data of the copy source- and copy-destination volumes and enables referrals and updates independently for both volumes. Furthermore, since the storage apparatus 200 re-matches the data of the copy source- and copy-destination volumes upon receiving the copy-pair resynchronization instruction from the user via the service processor 270, the storage apparatus 200 executes a copy of all or part of the data of the copy-source volume.

The copy function log table 2917 records times, operation-target volumes and operation content according to the aforementioned copy-function operation instructions from the user and to the start and end of the copy processing which operates in response to these instructions. More specifically, as shown in FIG. 20, the copy function log table 2917 is configured from an operation time field 29171, a target volume field 29172, and an operation content field 29137. The operation time field 29171 stores the times at which the operation was performed. The target volume field 29172 stores the set of volumes constituting the operation-target copy pair in the format of a combination of volume numbers. The operation content field 29137 stores character strings indicating operating instructions or the like, for example, which is information indicating the types of operation instructions.

The MPPK load monitoring subtable 2918 will be described next. The MPPK load monitoring subtable 2918 is a table which the load balancing time determination program 2929, described subsequently, uses in the process of calculating the load balancing times and is configured, as shown in FIG. 21, from a time zone field 29181, a load total field 29182, and an additional count counter field 29183. The time zone field 29181 combines and stores the start and end times of each of the time zones. The load total field 29182 stores values obtained by acquiring MPPK load information contained in the time zone stored in the time zone field 29181 from the MP utilization field 29142 of the MPPK load monitoring table 2914 and adding these values. Furthermore, the additional count counter field 29183 stores counts obtained by adding the MP utilization to the time zone.

The load balancing scheduler program 2927, load balancing requirement determination program 2928, and the load balancing time determination program 2929 which are added to the program unit 292 according to this embodiment will be described next.

The load balancing scheduler processing by the load balancing scheduler program 2927 will be described first. The processing is executed based on an instruction of the processor 211 at regular intervals (one a day, or similar, for example).

Figure 22:
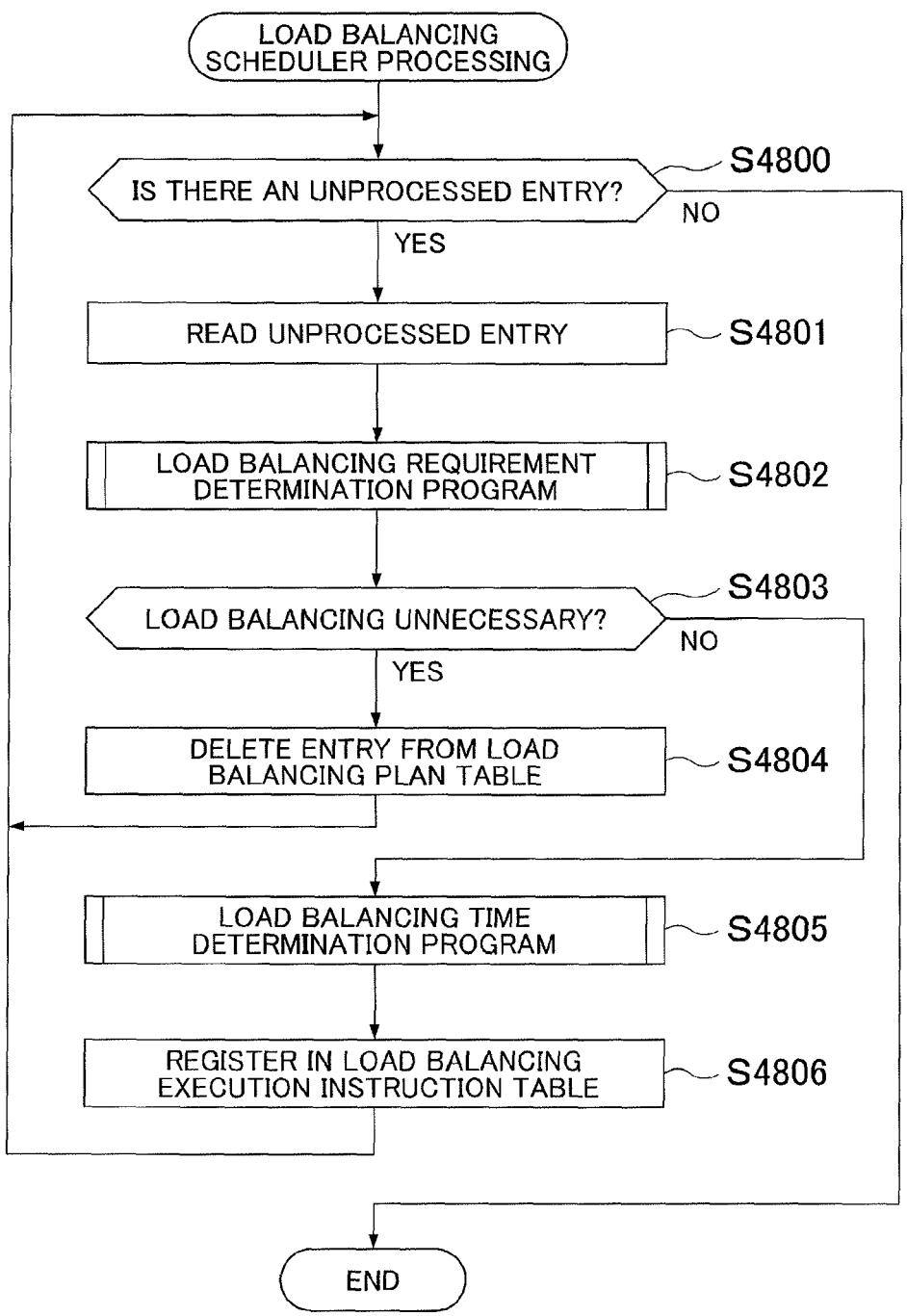
FIG. 22 is a flowchart showing processing content of a load balancing scheduler processing according to this embodiment.

As shown in FIG. 22, the load balancing scheduler program 2927 reads the load balancing plan table 2915 and determines whether there are unprocessed entries (S4800) and, if there are no unprocessed entries, terminates the processing. If, however, there are unprocessed entries in step S4800, the load balancing scheduler program 2927 reads unprocessed entries (S4801), starts up the load balancing requirement determination program 2928 and determines whether or not load balancing processing should be executed (S4802). The load balancing requirement determination program 2928 will be described in detail subsequently.

Furthermore, if it is determined in step S4802 by the load balancing requirement determination program 2928 that load balancing processing is unnecessary, the load balancing scheduler program 2927 deletes the relevant entries in the load balancing plan table 2215 (S4804), and then returns to step S4800 and repeats the processing of step S4800 and subsequent steps. If, however, it is determined by the load balancing requirement determination program 2928 in step S4802 that load balancing processing is necessary, the load balancing scheduler program 2927 starts up the load balancing time determination program 2929 in order to determine the load balancing execution time (S4805). The load balancing time determination program 2929 will be described in detail subsequently.

In addition, the load balancing scheduler program 2927 adds entries to the load balancing execution time table 2916 and stores the execution times determined in step S4805 in the execution time field 29161 and stores the load balancing plan number in the plan number field 29162 (S4806) and returns to step S4800.

The load balancing requirement determination program 2928 which is started up in the foregoing step S4802 will be described next. The load balancing requirement determination program 2928 is a program with which the storage apparatus 200 automatically determines whether or not load balancing is required.

Figure 23:
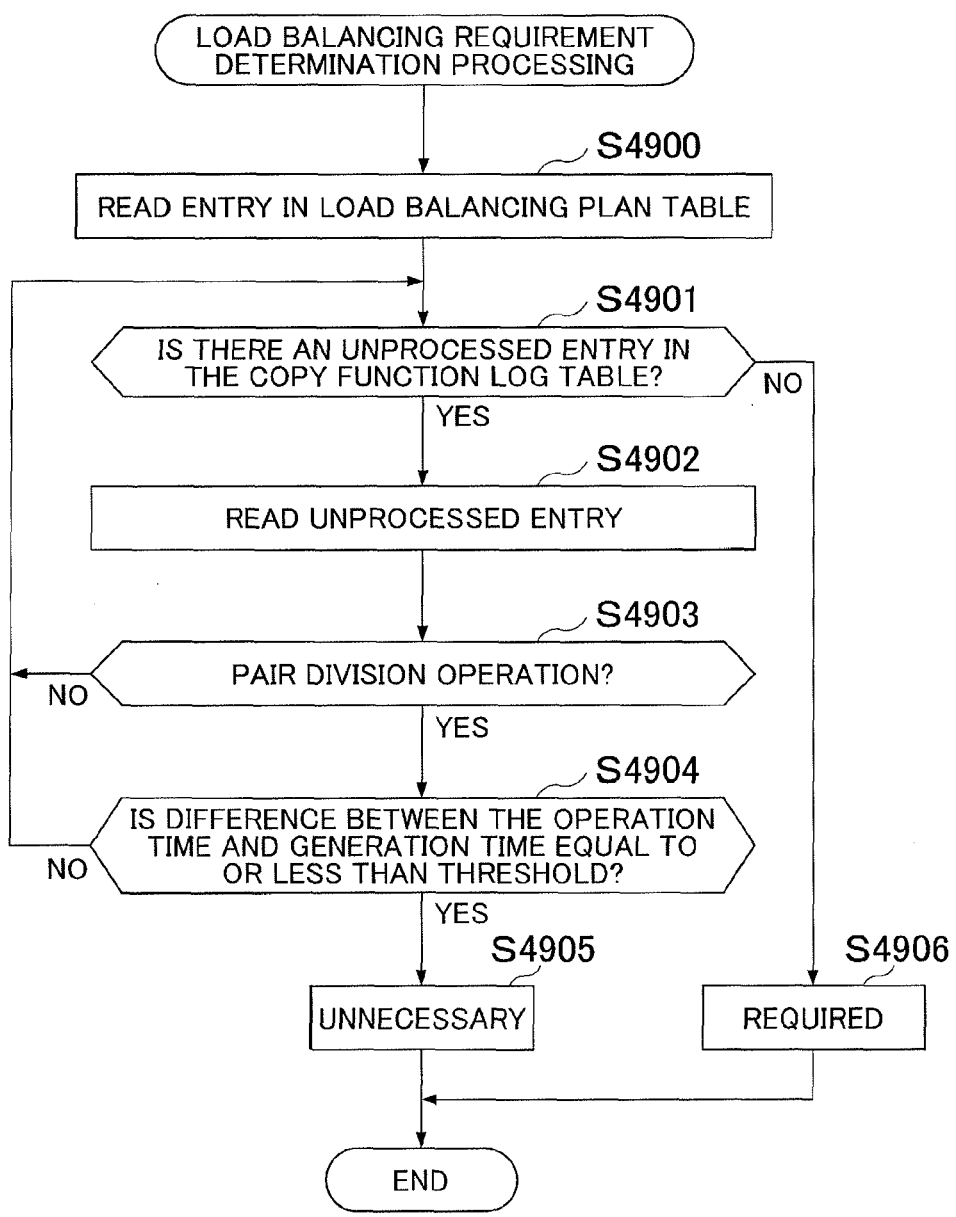
FIG. 23 is a flowchart showing processing content of a load balancing non-requirement determination processing according to this embodiment.

As shown in FIG. 23, the load balancing requirement determination program 2928 first reads the entries of the load balancing plan table 2915 supplied as inputs in step S4802 above (S4900). The load balancing requirement determination program 2928 then determines whether there are unprocessed entries in the copy function log table 2917 (S4901) and, if there are no unprocessed entries, sends back notification to the load balancing scheduler program 2927 to the effect that load balancing processing is required (S4906) and terminates the processing. If, however, it is determined in step S4901 that there is an unprocessed entry, the load balancing requirement determination program 2928 reads the entries (S4902).

The load balancing requirement determination program 2928 then refers to an operation information field 29173 of entries of the copy function log table 2917 read according to step S4902 and determines whether there is a copy pair division operation instruction (S4903). More specifically, the load balancing requirement determination program 2928 determines whether a pair division character string is stored in the operation information field 29173 of the copy function log table 2917.

If it is determined in step S4903 that the instruction is an operation instruction other than a copy-pair division operation instruction, the load balancing requirement determination program 2928 returns to step S4901 and repeats the processing of step S4901 and subsequent steps. If, however, it is determined in step S4903 that the instruction is a copy-pair division operation instruction, the load balancing requirement determination program 2928 determines whether the difference between the operation time stored in the operation time field 29171 of the copy function log table 2917 and the time stored in the generation time field 29152 of the load balancing plan table 2915 read in step S4900 is less than a predetermined threshold (S4904).

If it is determined in step S4904 that the time difference is less than the threshold, the load balancing requirement determination program 2928 responds to the load balancing scheduler program 2927 to the effect that the load balancing processing is not required (S4905) and terminates the processing. If, on the other hand, it is determined in step S4904 that the time difference is not less than the threshold, the load balancing requirement determination program 2928 returns to step S4901 and repeats the processing of step S4901 and subsequent steps.

The foregoing copy function is typically used for regular backups in daily units or weekly units or the like. Normally, when the time of the regular backup is reached, the system administrator or the like resynchronizes the copy pair and performs a division operation and acquires a replica image of the backup target volume 250. Subsequently, a backup server or the like reads the acquired replica image and writes the image to tape media or the like. It is therefore possible to determine that the access to the operation target volume immediately after the copy pair division operation of the copy function is performed in the storage apparatus 200 is backup processing.

By distinguishing the access load caused by the host I/O of the original task from the access load due to the host I/O of the backup processing, it is possible to exclude the access load due to the host I/O of the backup processing from the load balancing processing target which is to be eliminated. As a result, unnecessary load balancing processing can be prevented and the functions of the whole storage apparatus can be improved.

Furthermore, although the load balancing requirement determination was performed hereinabove based on the fact that the difference between the time of the copy pair division operation and the time a load variation is generated lies within a threshold, the present invention is not limited to this example. For example, the load balancing determination may also be made depending on whether the volume group identified by the numbers stored in the migration volume field 29155 of the entry in the load balancing plan table 2915 includes a target volume field 29172 of the entry of the copy function log table 2917.

In addition, the storage apparatus 200 may also employ the following method in order to perform the aforementioned determination of whether or not load balancing is required. For example, because an increase in the load immediately after changing the apparatus configuration or directly after the introduction of the storage apparatus 200 is thought to represent a temporary high load state until a stable state is achieved, the load balancing processing may also be determined as unnecessary if there is a variation in the load between the MPPK. In addition, if the same load increase is generated for long periods or a plurality of times, the load balancing may be determined to be required but otherwise the load balancing may be determined to be unnecessary.

The load balancing time determination program 2929 which is started up in the foregoing step S4805 will be described next. The load balancing time determination program 2929 is a program with which the storage apparatus 200 automatically determines the load balancing execution time and is a program which determines time zones when the load of the migration-destination MPPK with ownership is low as the load balancing execution time. The load balancing time determination program 2929 which is started up by the load balancing scheduler program 2927 calls the MPPK number of the migration-destination MPPK as the input parameter.

Figure 24:
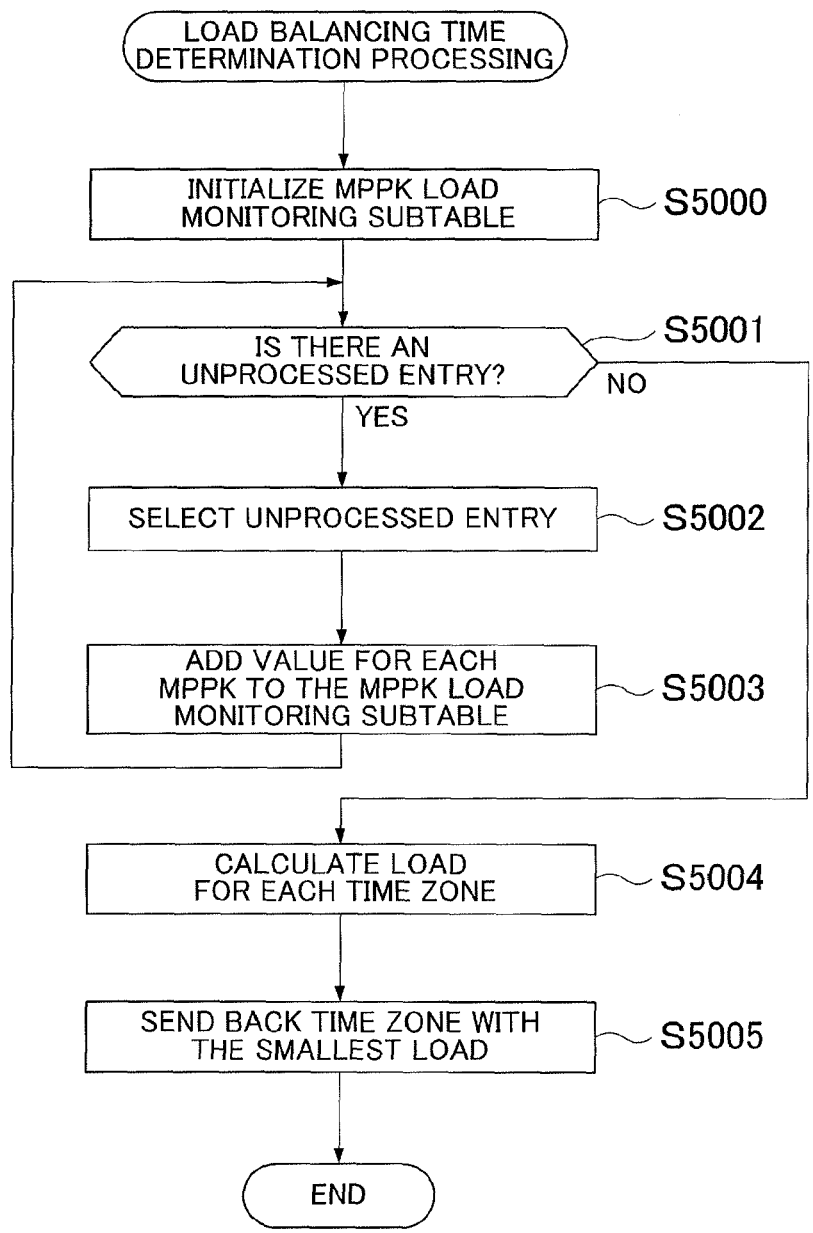
FIG. 24 is a flowchart showing processing content of a load balancing time determination processing according to this embodiment.

As shown in FIG. 24, the load balancing time determination program 2929 first initializes the MPPK load monitoring subtable 2918 (S5000). The load balancing time determination program 2929 then determines whether there are unprocessed entries in the MPPK load monitoring subtable 2918 (S5001) and advances to step S5400 if there are no unprocessed entries. If, however, it is determined in step S5001 that there is an unprocessed entry, the load balancing time determination program 2929 selects the unprocessed entry in the MPPK load monitoring table 2918 (S5002).

Furthermore, the load balancing time determination program 2929 calculates the total of the loads per MPPK in the MPPK load monitoring subtable 2918. More specifically, the load balancing time determination program 2929 reads the times stored in the time field 29141 of the MPPK load monitoring table 2914 and adds the value of the MPPK utilization field 29142 of the MPPK load monitoring table 2914 to the load total field 29182 corresponding to the time zones stored in the time zone field 29181 in the MPPK load monitoring subtable 29182 for this time and increments (by one) the value of the additional count field 29183 (S5003).

By repeating the processing of steps S5001 to S5003, the total load and additional count for each time zone are stored in each entry of the MPPK load monitoring subtable 2918. Furthermore, the load balancing time determination program 2929 divides the value stored in the load total field 29182 of the MPPK load monitoring subtable 2918 by the value stored in the additional count counter field 29183 and calculates the average load per time zone (S5004). Thereafter, the load balancing time determination program 2929 selects the time zone with the smallest total load among the entries in the MPPK load monitoring subtable 2918, sends back the start time for this time zone to the load balancing scheduler program 2927 (S5005) and then terminates the processing.

Furthermore, if a plurality of volumes 250 are associated by the storage function, ownership may also be migrated in advance to volumes 250 (or access target areas within the volumes) which are not the targets of write requests from the host apparatus 100 or copy processing in the storage apparatus 200. Ownership is migrated to the volumes 250 (or to locations other than the access target areas in the volumes) which are the targets of write requests from the host apparatus, after the execution of access processing on these volumes 250 has ended. It is accordingly possible to migrate ownership to the same MPPK 210 for a plurality of associated volumes without interfering with the storage function of the I/O processing or copy processing from the host apparatus 100.

(2-3) Effect of this Embodiment

According to the embodiment above, with the load balancing time determination processing, the storage apparatus 200 is able to automatically select a load balancing plan and determine the timing for executing the selected load balancing plan. It is accordingly possible to execute load balancing processing while minimizing the effect on the task and without troubling the user.

(3) Third Embodiment (3-1) Overview of the Embodiment

Although the load balancing processing was automatically executed by the storage apparatus 200 itself in the second embodiment, in this embodiment, load balancing processing is automatically executed as a result of co-operation between the storage apparatus 200 and a program running on the host apparatus 100. More specifically, the storage apparatus 200 acquires information pertaining to volumes 250 with a high load and time zones when the load is high from the program running on the host apparatus 100 and executes load balancing processing before the load increases.

(3-2) Configuration of Computer System

The hardware configuration of a computer system 3 according to this embodiment is the same as the hardware configuration of the computer system 1 according to the first embodiment and the computer system 2 according to the second embodiment and hence a detailed description thereof is not included.

Figure 25:
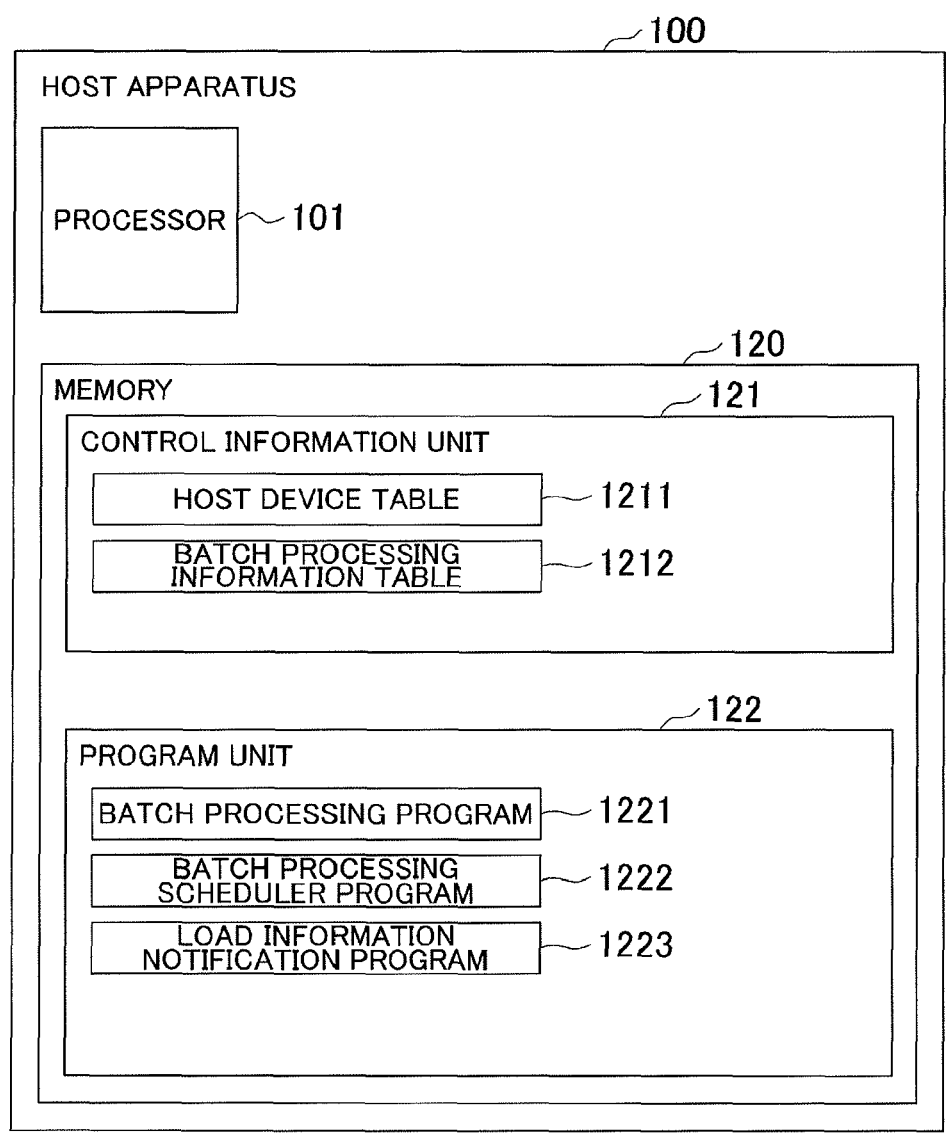
FIG. 25 is a block diagram showing the configuration of the host apparatus according to a third embodiment of the present invention.

The configuration of the host apparatus 100 according to this embodiment will be described first. As shown in FIG. 25, the host apparatus 100 is configured from a processor 101 and a memory 120. The processor 101 is an information processing resource which comprises the foregoing CPU and the like. Furthermore, the memory 120 is configured from a control information unit 121 and a program unit 122. The control information unit 121 stores a host device table 1211 and a batch processing information table 1212. In addition, the program unit 122 stores a batch processing program 1221, a batch processing scheduler program 1222 and a load information notification program 1223 and the like.

Furthermore, the software configuration of the storage apparatus 200 is the same as the first embodiment except for the information stored in the program unit 292 of the memory package 290, and hence a detailed description is not included here and differences in configuration will be described in detail.

Figure 26:
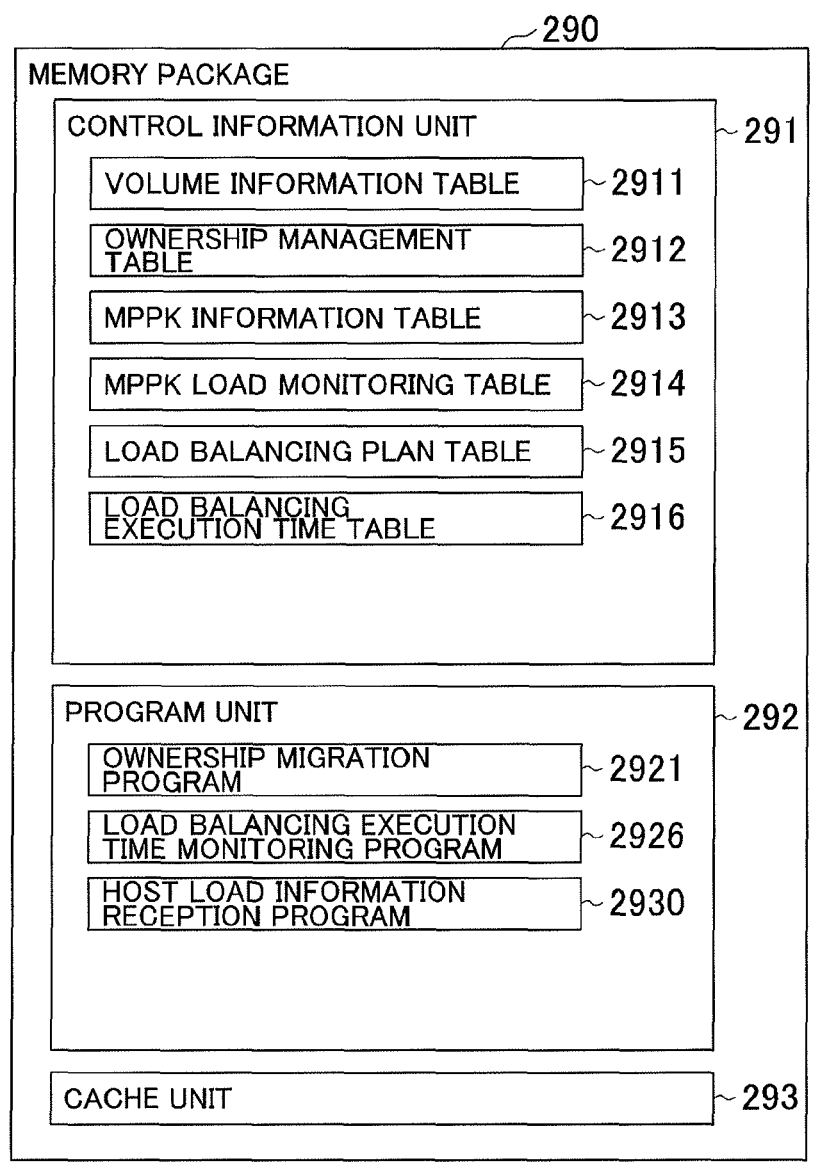
FIG. 26 is a block diagram showing control information of the storage apparatus according to this embodiment.

As shown in FIG. 26, the control information unit 291 of the memory package 290 stores, as per the first embodiment, the volume information table 2911, the ownership management table 2912, the MPPK information table 2913, the MPPK load monitoring table 2914, the load balancing plan table 2915 and the load balancing execution time table 2916. In addition, the program unit 292 stores the ownership migration program 2921, the load balancing execution time monitoring program 2926, and the host load information reception program 2930.

The table stored in the control information unit 121 of the host apparatus 100 will be described next. The host device table 1211 is a table which manages the device names identified by the host apparatus 100 and the volumes in the storage apparatus 200 in association with one another and, as shown in FIG. 27, is configured from a device name field 12111, a port number field 12112 and a volume number field 12113. The device name field 12111 stores the device names for identifying applications in the host apparatus 100. The port number field 12112 and the volume number field 12113 store information for identifying the port numbers and volumes 250 respectively in the storage apparatus 200 which correspond to the device names. Information for identifying the volumes 250 is SCSI-based LUN and the like, for example.

Furthermore, the batch processing information table 1212 is a table for managing batch processing for which execution is instructed by the host apparatus 100 and, as shown in FIG. 28, is configured from a batch processing name field 12121, an execution time field 12122 and a used device field 12123. The batch processing name field 12121 stores the names for identifying the batch processing which is executed. The execution time field 12122 stores times when batch processing is executed. The used device field 12123 stores names of one or more device which are accessed when the batch processing is executed.

Figure 29:
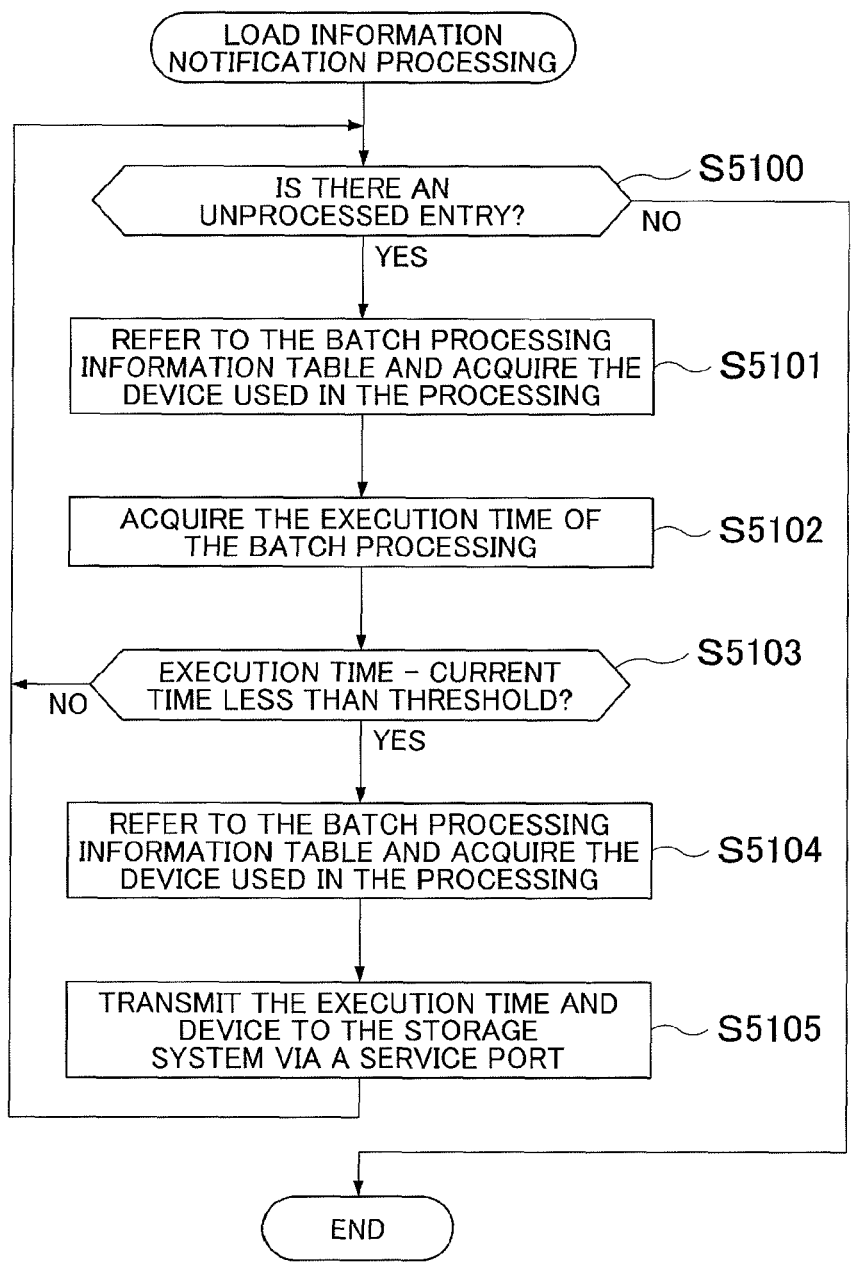
FIG. 29 is a flowchart showing processing content of load information report processing according to this embodiment.

The main operation of the host apparatus 100 and the storage apparatus 200 will be described next. First, the load information notification processing by the load information notification program 1223 of the host apparatus 100 will first be described. As shown in FIG. 29, the load information notification program 1223 is a program for notifying the storage apparatus 200 of the load information. The load information notification program 1223 first determines whether there are unprocessed entries in the batch processing table 1212 (S5101) and terminates the processing if there are no unprocessed entries. If, however, it is determined in step S5101 that there are unprocessed entries, the load information notification program 1223 acquires the batch processing execution time (S5102).

Furthermore, the load information notification program 1223 determines whether the difference between the batch processing execution time acquired in step S5102 and the current time is less than a certain threshold (S5103), and if the difference is not less than the threshold, the load information notification program 1223 returns to step S5101 and repeats the processing of step S5101 and subsequent steps. If, however, it is determined in step S5103 that the difference between the batch processing execution time and the current time is less than a certain threshold, the load information notification program 1223 refers to the batch processing information table 1212 and acquires the device group used in the processing (S5104). Furthermore, the load information notification program 1223 issues a notification with the batch processing execution time and device group identification information (the port number and volume number and the like) to the storage apparatus 200 via the service port (S5105).

Figure 30:
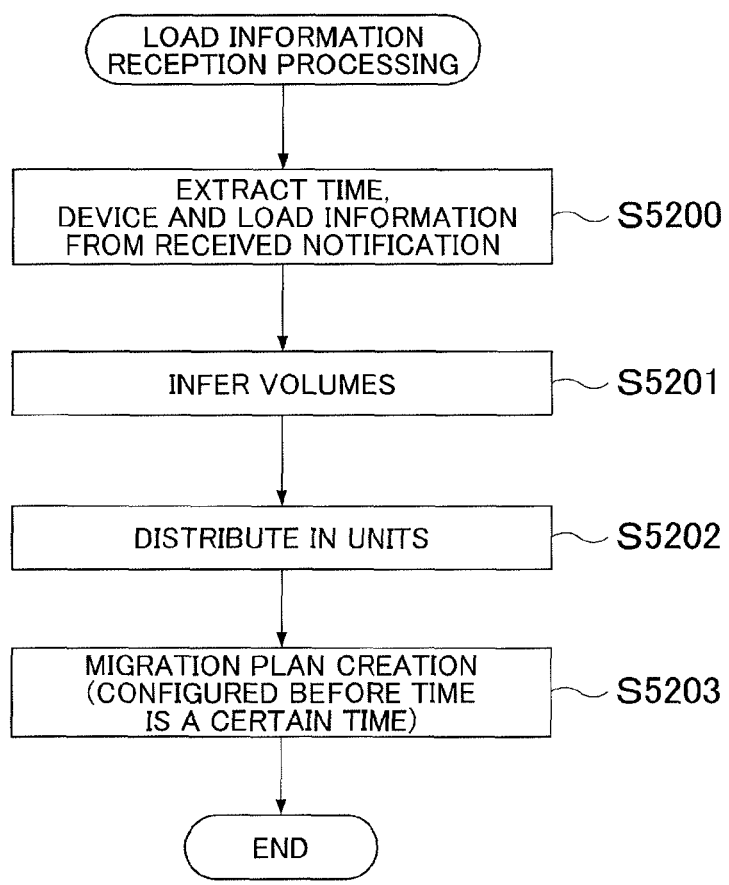
FIG. 30 is a flowchart showing processing content of a load information reception processing according to this embodiment.

Load information reception processing by the host load information reception program 2930 of the storage apparatus 200 will be described next. As shown in FIG. 30, the host load information reception program 2930 extracts the time the batch processing was executed and the device identification information from the information reported by the host apparatus 100 (S5200). The host load information reception program 2930 then infers the volume group which is used in the batch processing from the port number and volume number (S5201).

Further, the host load information reception program 2930 distributes and assigns the ownership of the volume group inferred in step S5201 to a plurality of MPPK 210 (S5202). More specifically, the host load information reception program 2930 is configured such that a uniform number of each of the ownership to the MPPK are provided to the volume groups on which the batch processing is executed. Furthermore, instead of assigning ownership unifounly to the plurality of MPPK based on the number of volumes, the batch processing may also divide and assign the ownership based on load information such as the I/O counts and I/O patterns which are issued to the storage apparatus 200 per unit time. Load information such as the I/O counts and I/O patterns may also be contained in information which is reported by the host apparatus 100. As long as there cases where the load information is predetermined based on the design of the job executed in the batch processing, the load information may sometimes also be determined depending on resources such as the processing power of the processor 101 of the host apparatus 100. In cases where the load information is determined depending on resources such as the processing power of the processor 101, a determination method which involves measurement in a pretest or the like may be considered.

Although the application running on the host apparatus 100 is described in this embodiment as a batch scheduler, the present invention is not limited to this example, rather, another application may be used. For example, an increase in the load relating to devices used by the virtual machine may also be reported prior to deployment of a virtual machine.

(3-3) Effect of the Embodiment

According to the above embodiment, the storage apparatus 200 is able to know in advance about times when the I/O load is high and volumes with a high I/O load. As a result, ownership for load balancing can be migrated before the I/O load increases and it is possible to avoid the I/O performance being affected by the ownership migration.

(4) Fourth Embodiment (4-1) Overview of the Embodiment

In this embodiment, information on the disposition of ownership is stored in the storage apparatus 200 and the method for restoring this information will be described. The ownership disposition information is information indicating whether any of the MPPK has ownership to a particular volume 250. For example, the foregoing load balancing processing may not function smoothly in a state where there is an extreme variation in ownership disposition prior to executing load balancing processing. With regard to a load that is suitably distributed at a certain point in time, after there is a change in the relationship between the volume 250 and the MPPK 210 responsible for the volume 250 due to another task, there may be a problem with the load not being well distributed even when load balancing processing is performed. There is therefore a need to execute load balancing processing after temporarily returning to a certain point in time such as a state before the I/O of another task is performed. Furthermore, the results of load balancing when the storage apparatus 200 is operating suitably are saved, and there is a need to restore the ownership disposition by using the load balancing results which are saved in cases where a task with a similar I/O trend is performed such as when a task using the same device is executed.

(4-2) Configuration of Computer System

The hardware configuration of a computer system 4 according to this embodiment is the same as the computer system according to the first embodiment and hence a detailed description is not included. Furthermore, the software configuration of the computer system 4 will be described in particular detail hereinbelow with respect to the differences in configuration from the first embodiment because the information stored in the memory package 290 of the storage apparatus 200 differs from the first embodiment.

Figure 31:
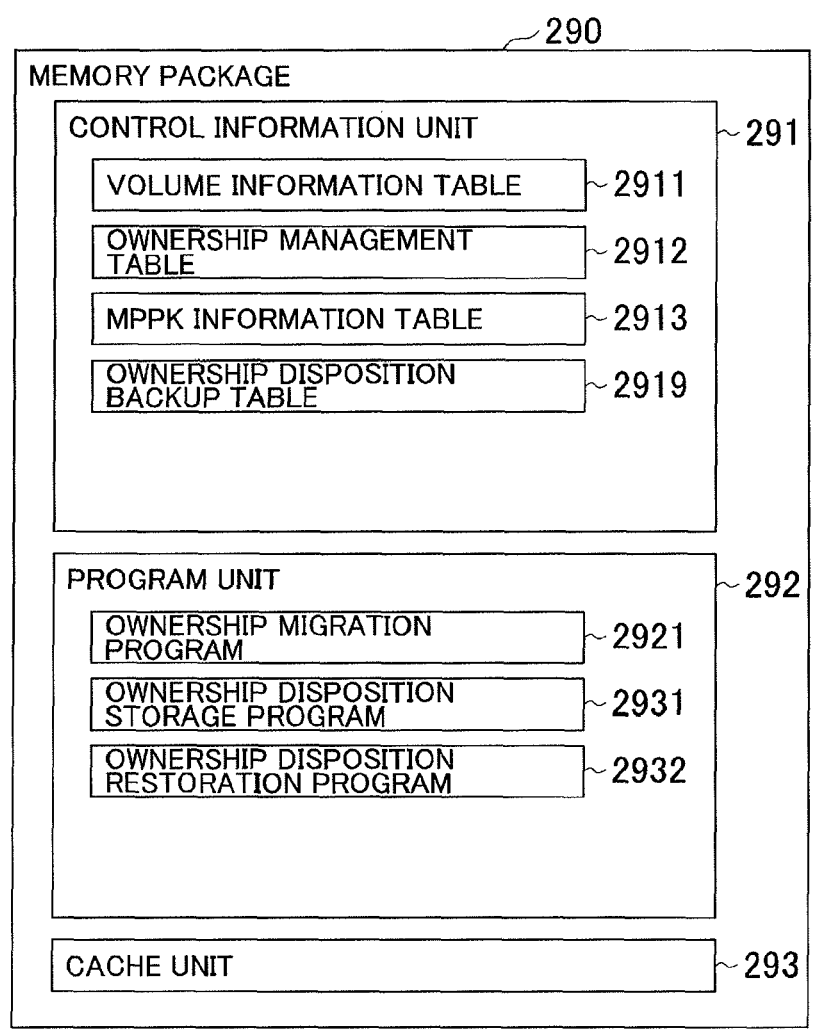
FIG. 31 is a block diagram showing control information of a storage apparatus according to a fourth embodiment of the present invention.

As shown in FIG. 31, the control information unit 291 of the memory package 290 stores the volume information table 2911, the ownership management table 2912, the MPPK information table 2913, and an ownership disposition backup table 2919. Furthermore, the program 292 stores the ownership migration program 2921, an ownership disposition storage program 2931, and an ownership disposition restoration program 2932. Of these programs, the volume information table 2911, the ownership management table 2912, the MPPK information table and the ownership migration program 2921 are the same as in the first embodiment and hence a detailed description is not included.

The ownership disposition backup table 2219 will be described first. The ownership disposition backup table 2219 is a table for managing backed up ownership disposition information and, as shown in FIG. 32, is configured from an ownership disposition backup name field 29191, a storage time field 29192, and an owner MPPK field 22193. The ownership disposition backup name field 29191 stores character strings which represent names for identifying ownership disposition data. The names for identifying the ownership disposition data may also be a number identifying the data. The storage time field 29192 stores times when the ownership disposition data backups are acquired. The owner MPPK field 22193 stores the MPPK numbers of the MPPK with ownership for each volume.

Figure 33:
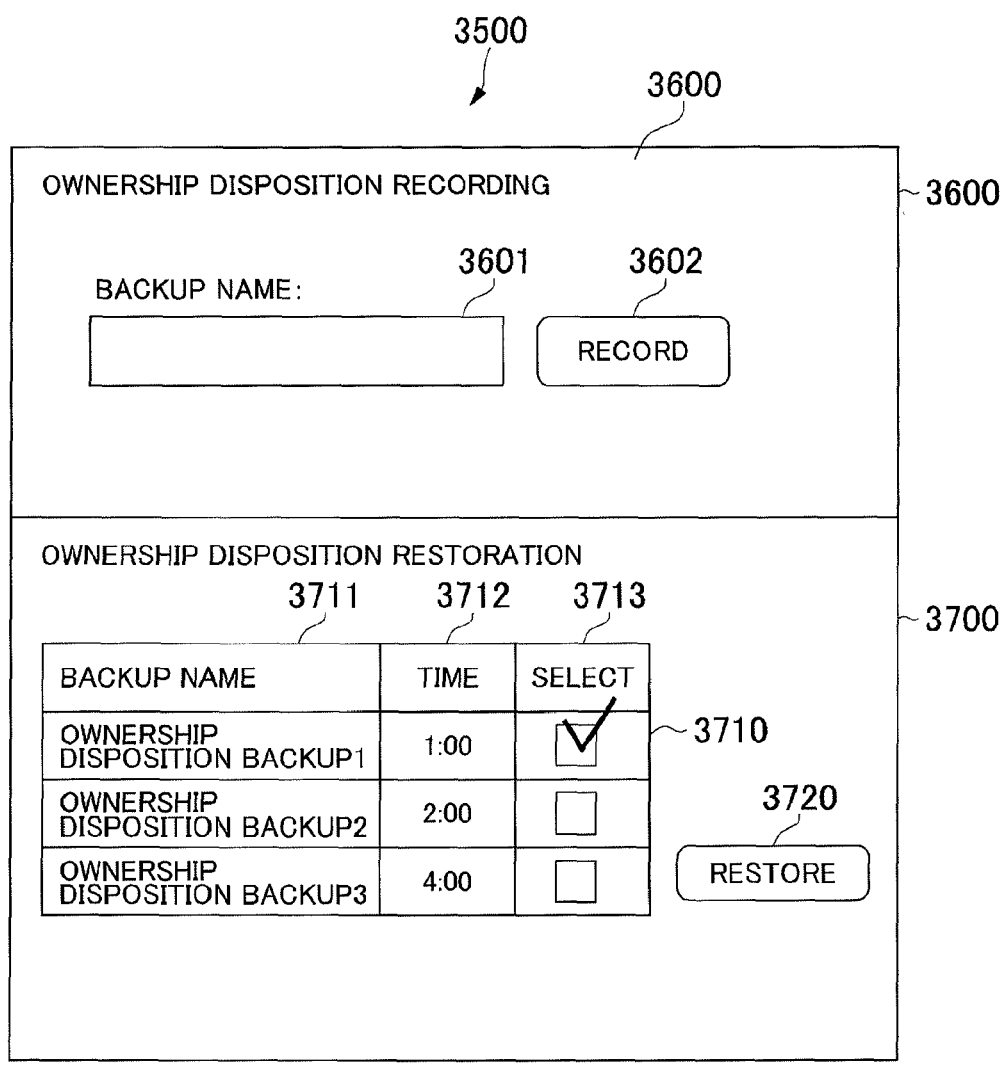
FIG. 33 is a conceptual view showing an ownership disposition recording restoration screen according to this embodiment.

The ownership disposition recording restoration screen 3500 for restoring the ownership disposition in response to user inputs will be described next. The ownership disposition recording restoration screen 3500 is displayed on the service processor 270 in response to a user operation. As shown in FIG. 33, the ownership disposition recording restoration screen 3500 is configured from the ownership disposition recording unit 3600 and the ownership disposition restoration unit 3700. The ownership disposition recording unit 3600 includes a backup name input area 3601 for inputting backup names and a recording button 3602. In addition, the ownership disposition restoration unit 3700 includes a restoration table 3710 and a restoration button 3720. The restoration table 3710 is configured from a backup name display area 3711, a backup time display area 3712, and a selection checkbox input area 3713.

The user is able to instruct the storage apparatus 200 to perform an ownership disposition backup by using an ownership disposition recording restoration screen 3500. A backup name is input by a user input to the backup name input area 3601 of the ownership disposition recording restoration screen 3500, and the ownership disposition storage program 2931 starts up as a result of pressing the recording button 3602.

In addition, the user is able to select data for restoring ownership disposition from the data recorded in the memory package 290 of the storage apparatus 200 by using the ownership disposition recording restoration screen 3500. An optional entry in the restoration table 3710 of the ownership disposition recording restoration screen 3500 is selected in response to a user input and the checkbox displayed in the selection checkbox input area 3713 is set to ON and the ownership disposition restoration program 2932 starts up as a result of the restoration button 3720 being pressed.

Figure 34:
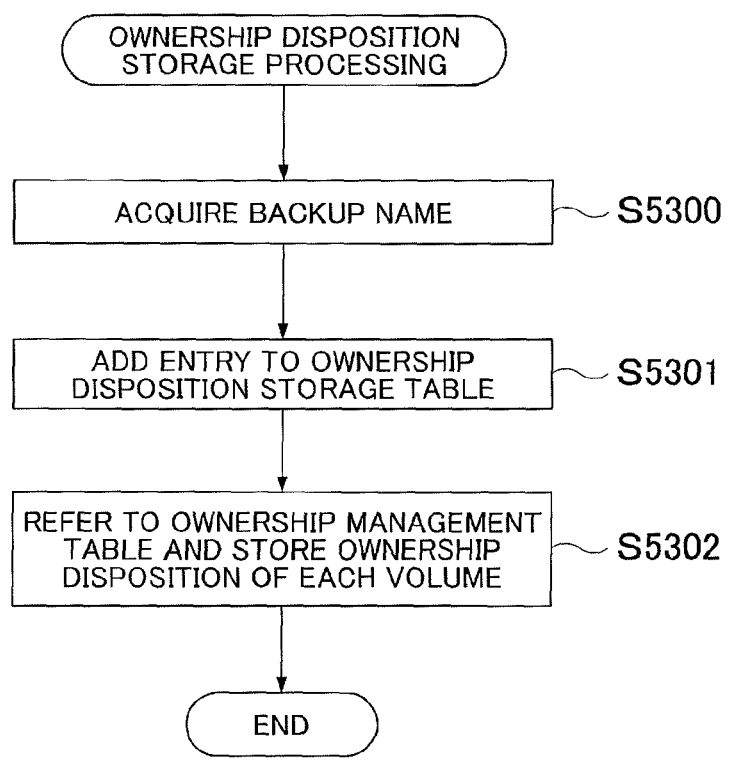
FIG. 34 is a flowchart showing processing content of ownership disposition recording processing according to this embodiment.

The ownership disposition storage program 2931 which records the ownership disposition will be described next. As shown in FIG. 34, the ownership disposition storage program 2931 first acquires the backup name which is input to the backup name input area 3601 of the ownership disposition recording restoration screen 3500 (S5300). Furthermore, the ownership disposition storage program 2931 adds a new entry to the ownership disposition backup table 2919 (S5301). Furthermore, the ownership disposition storage program 2931 stores the backup name acquired in step S5300 in the backup name field 29191 and refers to the ownership management table 2912 and stores the MPPK number which represents the owner MPPK for all volumes (S5302).

Figure 35:
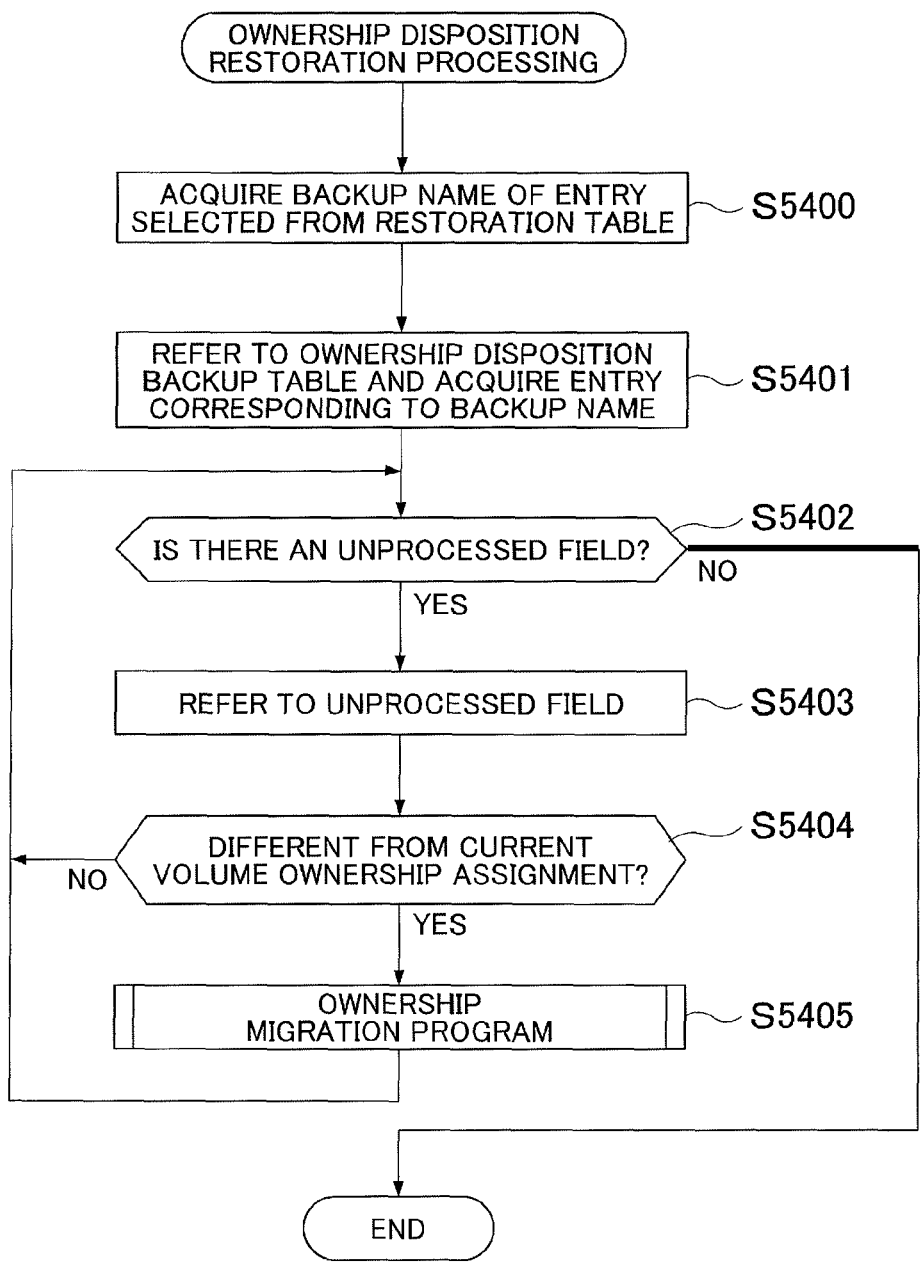
FIG. 35 is a flowchart showing processing content of ownership disposition restoration processing according to this embodiment.

The ownership disposition restoration program 2932 which restores ownership disposition will be described next. As shown in FIG. 35, the ownership disposition restoration program 2932 first reads the backup names displayed in the backup name display area 3711 in the entry for which the checkbox of the selection checkbox input area 3713 of the restoration table 3710 of the ownership disposition recording restoration screen 3500 is ON (S5400). Furthermore, the ownership disposition restoration program 2932 refers to the ownership disposition backup table 2919 and acquires entries corresponding to the backup name input to the backup name field 29191 (S5401).

Furthermore, the ownership disposition restoration program 2932 determines whether or not there is an unprocessed owner MPPK field in the ownership disposition backup table 2919 (S5402) and terminates the processing if there are no unprocessed owner MPPK fields. However, if it is determined in step S5402 that there is an unprocessed owner MPPK field, the ownership disposition restoration program 2932 reads the unprocessed owner MPPK fields of the ownership disposition backup table 2919 (S5403).

It is then determined whether the owner MPPK acquired in step S5403 and the current owner MPPK of the targeted volume are different (S5404). If it is determined in step S5404 that the acquired owner MPPK differs from the current owner MPPK, the ownership migration program 2921 is started up and the ownership is migrated. If, however, it is determined that the acquired owner MPPK and the current owner MPPK are the same, the ownership disposition restoration program 2932 returns to step S5402 and repeats the processing of step S5402 and subsequent steps.

Although the ownership disposition is recorded in the memory package 220 of the storage apparatus 200 in this embodiment, the present invention is not limited to this example, rather, ownership disposition may be stored as a file, for example, in a storage medium which is provided in the service processor 270 so that the ownership disposition may be restored from the file. In addition, the ownership disposition restoration program 2932 may also store the ownership disposition in a volume provided in the storage apparatus and restore the ownership disposition from the volume. More specifically, the ownership disposition recording restoration screen 3500 is provided with an input area for designating the backup destination file name so that the file name recording the backup data can be designated by a user input. In this case, in step S5302 of the processing by the foregoing ownership disposition storage program 2931, the ownership disposition storage program 2931 communicates with the service processor 270, and records backup data in the file on the storage medium of the service processor 270. Furthermore, in steps S5400 and S5401 of the processing by ownership disposition restoration program 2932, the ownership disposition storage program 2931 communicates with the service processor 270 in order to read the designated file on the storage medium in the service processor 270. The ownership disposition storage program 2931 can accordingly record the ownership disposition without compressing the memory capacity of the storage apparatus 200.

Furthermore, in cases where the storage function applied state changes from the time when the ownership disposition is recorded and the restoration time, when the ownership disposition is restored based on the backed up data, the owner MPPK of the plurality of volumes 250 which are associated by the storage function are different and the processing efficiency may drop. Hence, the storage function which is configured for the volume 250 at the time of restoration is checked and the restoration destination MPPK may also be changed so that the same MPPK has ownership to the plurality of volumes which are to be associated by the storage function.

(4-3) Effect of the Embodiment

With this embodiment, the user is able to restore the volume ownership disposition to the pre-recorded disposition. Accordingly, when the automatic load balancing yields results not reflecting the intention of the user, the ownership disposition is restored to the preceding state, thereby making it possible to avoid the effect of the load balancing processing on the task. Furthermore, the load balancing result when a certain task is carried out is recorded and, by restoring the ownership disposition in advance when the same task is performed again, a performance drop due to load balancing processing can be prevented.

(5) Fifth Embodiment

Figure 36:
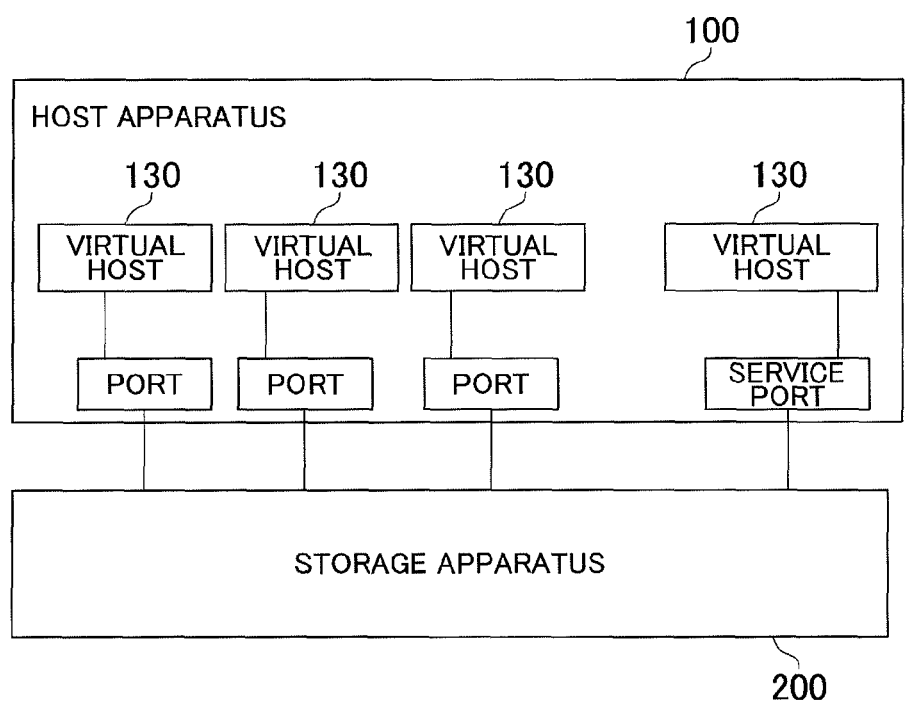
FIG. 36 is a block diagram showing the overall configuration of the computer system according to a fifth embodiment of the present invention.

The present invention can also be implemented by means of a different configuration from the foregoing hardware configuration. For example, as shown in FIG. 36, one or more host apparatuses 100 which are connected to the storage apparatus 200 may also be configured from a plurality of virtual servers 130. Similarly also for the service processor 270, the configuration may also comprise one or more virtual servers in the host apparatus 100 in place of the service processor 270.

In addition, the first to fourth embodiments above were described using the concept of volume ownership as an example of ownership but the present invention is not limited to this example. For example, instead of the ownership being for volumes, a similar concept may be considered for control information relating to hard resources such as ports and cache segments and control information relating to applications running on various storage apparatuses 200. Typically, ownership to a certain resource are defined as rights for frequent access to control information pertaining to the resource and this control information can be stored (cached) in the local memory. Hence, none of the ownership used in the foregoing embodiments, ownership migration, and load monitoring using ownership granularity and the like is limited to volume ownership, rather, these ownership may also be substituted for ownership to other resources.

(6) Sixth Embodiment (6-1) Overview of the Embodiment

In the foregoing first to fifth embodiments, MPPK load balancing was implemented by also considering the delay in the response time to the host apparatus due to ownership modification processing and the processing load in migrating management information which accompanies ownership switching processing. In the embodiments described hereinbelow, the overall performance of the storage apparatus is further improved by executing the MPPK load balancing processing by also considering the response performance to the logical volume of the ownership migration destination MPPK and the migration-destination MPPK throughput performance. Problems are described hereinbelow for cases where variations in the processing load are detected by only considering the MP utilization of the MPPK and where the migration-source MPPK and migration-destination MPPK are determined and the ownership being migrated are determined, without considering the response performance of the response to the logical volume of the ownership migration-destination MPPK or to the throughput performance of the migration-destination MPPK.

(a-1) Impaired Response Performance Due to Ownership Migration

In a storage apparatus, various processes such as read processing, write processing, copy processing, and fault handling processing are executed, but the times during which the MPPK processor is continuously occupied by each process differ. The greater the time a microprocessor is continuously occupied, the longer the wait time until the microprocessor in the MPPK is unused. Hence, even when the MP utilization of each of the MPPK is identical, differences in the response performance may arise. Therefore, if ownership is migrated only by considering the MP utilization of the MPPK, the I/O response performance to the volume may be impaired still further as a result of migrating the ownership. In addition, if MPPK which exhibit substantially identical MP utilization are migration-destination candidates, an MPPK with a poor response time may be selected and ownership may be migrated to this MPPK.

(a-2) Migration-Destination MPPK Resource Depletion Due to Ownership Migration

The resources which are provided to MPPK units in the storage apparatus are each different. For example, the resources which are provided to MPPK units may include the capacity of the local memory in the MPPK and the cache and data transfer buffer areas, as well as job multiplicity and so on. If the MPPK which is the ownership migration destination is determined without considering the usage status of these MPPK resources, resource depletion may arise in the migration-destination MPPK after ownership migration and there may be a drop in the overall performance of the storage apparatus.

(a-3) Ownership Migration for Resolving Response Performance Variation and Resource Depletion As mentioned earlier, various processing is executed in the storage apparatus and the response times required by each processing are different. There is a particular need for a high response performance to an I/O request from the host apparatus, and variations in response performance can be resolved by migrating volume ownership. Furthermore, MPPK are provided with the resources mentioned in (b) above. When there is an MPPK performance bottleneck when resources other than the microprocessor in the MPPK are depleted, there is a drop in the MP utilization of the MPPK. In this state, even when ownership is migrated from an MPPK with a high MP utilization to an MPPK for which there is no increase in MP utilization due to resource depletion, there is a drop in the migration-destination MPPK performance.

Hence, in the embodiment below, ownership is migrated by considering the usage status of resources in the storage apparatus, the response time, and the MP utilization and the like, and a specific volume and specific MPPK are configured so as to be excluded from the ownership migration object. A drop in performance due to ownership migration can accordingly be avoided and MPPK utilization efficiency can be improved by resolving resource depletion caused by the migration of ownership.

(6-2) Hardware Configuration of Computer System

The hardware configuration of the computer system 5 according to this embodiment is the same as the hardware configuration of the computer system 1 according to the first embodiment shown in FIG. 1. However, the memory package 290 of the first embodiment will be described hereinbelow in place of the memory package 220.

(6-3) Configuration of Functions of Storage Apparatus

Figure 37:
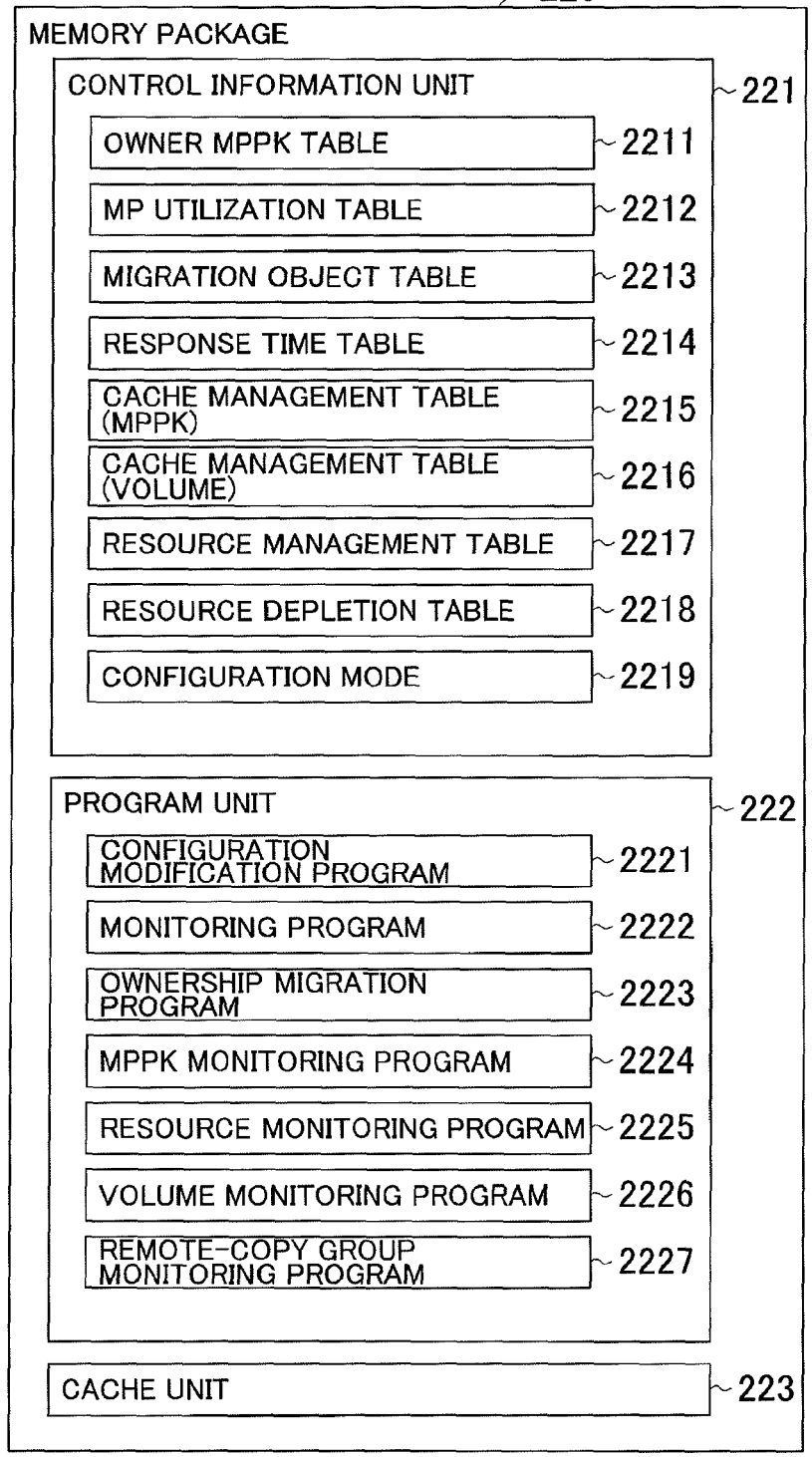
FIG. 37 is a block diagram showing control information of a storage apparatus according to a sixth embodiment of the present invention.

As shown in FIG. 37, the control information unit 221 in the memory package 220 of the storage apparatus 200 stores an owner MPPK table 2211, an MP utilization table 2212, a migration object table 2213, a response time table 2214, a cache management table (MPPK) 2215, a cache management table (volume) 2216, a resource management table 2217, a resource depletion table 2218 and a configuration mode 2219. Furthermore, the program unit 222 stores a configuration modification program 2221, a monitoring program 2222, an ownership migration program 2223, an MPPK monitoring program 2224, a resource monitoring program 2225, a volume monitoring program 2226, and a remote-copy group monitoring program 2227.

Upon receiving I/O from the host apparatus 100, the frontend package 260 distributes an I/O request to the owner MPPK 210 of the 110 destination volume 250 on the basis of information of the volumes 250. The memory 262 in the FE package 260 stores a distribution destination MPPK table 263 as information for distributing I/O requests among the owner MPPK 210. The distribution destination MPPK table 263 is the same as the distribution destination MPPK table according to the first embodiment shown in FIG. 3 and hence a detailed description is not included.

The control information which is stored in the control information unit 221 of the memory package 220 will be described next. The control information unit 221 of the memory package 220 stores the owner MPPK table 2211. The owner MPPK table 2211 is a table for managing which MPPK possesses which ownership.

Hereinabove, the ownership of the MPPK 210 were configured as control information which is associated with the volumes. However, one control information item is sometimes configured for a plurality of volumes in the storage apparatus. Examples include an intervolume copy function, a remote copy function which copies data between two storage apparatuses, and a volume virtualization function, and the like. In the case of the intervolume copy function, one control information item is configured for a pair comprising a copy source volume and a copy destination volume. Further, in the case of a remote copy function, one control information item is configured for a plurality of buffer volumes for storing transfer data which is transferred to the remote-copy destination storage apparatus. Here, a plurality of buffer volumes are pooled and described hereinbelow as a remote-copy group. Furthermore, in the case of the volume virtualization function, one control information item is configured for a plurality of pool volumes which the storage capacity pool comprises.

If one control information is configured for a plurality of volumes, a plurality of control information items can be managed collectively as one information item by configuring ownership for a copy destination volume and a remote-copy group or the like which form a pair. In this embodiment, the following description will cover not only the existence of ownership to one volume but also ownership to a remote-copy group, however, ownership to other groups and the like may also be provided.

The foregoing MPPK table 2211 manages ownership which is configured for volumes and remote-copy groups. As shown in FIG. 38, the owner MPPK table 2211 is configured from a type field 2211a, an identification number field 2211b, and an owner MPPK number field 2211c.

The type field 2211a stores information on the types of resources in the storage apparatus 200. For example, if the type is volume, this indicates that ownership to one volume are configured. Further, if the type is a remote-copy group, this indicates that ownership for one remote-copy group are configured. Furthermore, the identification number field 2211b stores information identifying resources belonging to each type. For example, if the type is volume, this field stores a number identifying a volume 250 in the storage apparatus 200 and, if the type is remote-copy group, this field stores a number identifying a remote-copy group in the storage apparatus 200. Furthermore, the owner MPPK number field 2211c stores MPPK numbers for the MPPK 210 handling the processing of resources (volumes or remote-copy groups) specified by the identification numbers.

The MP utilization table 2212 which is used when ownership is migrated according to the MP utilization of the MPPK 210 will be described next. The MP utilization table 2212 is a table for managing the MP utilization of the MPPK 210 and volumes 250. In this embodiment, the storage apparatus 200 determines the MPPL 210 which executes the processing of the volumes for each volume. Therefore, if a specific MPPK 210 is subject to a performance bottleneck due to an ownership configuration status or an I/O pattern from the host apparatus 100, the usage efficiency of the MPPK 210 for the whole apparatus may be reduced. In this case, the ownership for volumes of a suitable load can be migrated from the MPPK 210 subject to the bottleneck to an MPPK 210 with a lower load in order to be able to improve the usage efficiency of the MPPK 210. In addition, even when the MP utilization of a specific MPPK 210 is 100%, the MP utilization is desirably equal from one MPPK to the next MPPK. This is because the lower the MP utilization, the shorter the time until the processor will be free and the shorter the I/O response time. Hence, even if the MP utilization varies from one MPPK to the next MPPK, the perfoimance of the storage apparatuses can be improved by migrating the ownership.

Hence, in this embodiment, ownership is migrated by referring to the MP utilization managed by the MP utilization table 2212 in the storage apparatus 200. As shown in FIG. 39, the MP utilization table 2212 is configured from a type field 2212a, an identification number field 2212b, and an MP utilization field 2212c. The type field 2212a stores information on the resource types in the storage apparatus 200, storing, for example, MPPK and volume and other such types. Further, the identification number field 2212b stores information identifying resources belonging to each type. For example, if the type is MPPK, this field stores a number identifying the MPPK 210 in the storage apparatus 200 and if the type is volume, this field stores numbers identifying volumes 250 in the storage apparatus 200. The MP utilization field 2212c then stores the utilization of the MPPK 210 or volumes 250 specified by the identification numbers.

Here, if the type is MPPK, the MP utilization field 2212c stores a value indicating the proportion of processors in the MPPK used per unit of time. Further, if the type is volume, the MP utilization field 2212c stores a value indicating the proportion by which the processor is used for one volume. For example, when the MP utilization of a certain MPPK 210 is 50%, the total MP utilization of the volumes to which the MPPK 210 possesses ownership is 50%.

In addition, copy pair may be added to the types in the MP utilization table 2212 and the load of the copy processing on the copy pair may also be managed. For example, where the intervolume copy processing load is concerned, the load may be recognized as being divided into a copy-source volume load and a copy-destination volume load, may be recognized collectively as a copy-source volume load, or may be recognized as the load of the whole copy processing. Likewise, the load of the remote copy processing may also be recognized as a buffer volume load or recognized collectively as the load of the whole remote copy processing.

The exclusion of MPPK, volumes and remote-copy groups from the dynamic ownership migration object will be described next. As a result of excluding a specific MPPK from the ownership migration object, ownership is migrated from another MPPK to make it possible to avoid a reduction in the I/O processing performance of the volume 250 with pre-migration ownership. Note that the migration of ownership to another MPPK from the MPPK 210 configured as an ownership migration object may be allowed or may be prohibited. This is because there is no reduction in performance caused by migration since the ownership migration source has a reduced load due to migration. Note that, although the migration of ownership from the MPPK 210 configured as the ownership migration object to another MPPK is described as being prohibited, this migration may also be allowed.

Furthermore, by performing configuration to exclude a specific volume 250 from the ownership migration object so as to not migrate the ownership to the volume 250, a reduction in performance of the volume due to migration can be avoided. In addition, configuration may be performed to exclude volumes for which the costs of ownership migration processing itself are high, from the ownership migration object. Note that the costs of ownership migration processing differ for each volume. For example, migration processing costs increase for volumes which have a lot of management information cached in the local memory in the MPPK 210. This is because a lot of control information of the MPPK 210 which is the ownership migration destination must be introduced to the local memory 212 from the control information unit 221. So too for the remote-copy groups, by configuring remote-copy groups excluded from the ownership migration object for the same reasons as for a case where ownership to the volume 50 are migrated, a reduction in the performance of each volume due to migration can be avoided.

The migration object table 2213 for managing whether or not MPPKs, volumes and remote-copy groups are ownership migration objects will be described next. As shown in FIG. 40, the migration object table 2213 is configured from a type field 2213a, an identification number field 2213b and a migration flag field 2213c. The type field 2213a stores information on the types of resources in the storage apparatus 200. The identification number field 2213b stores information identifying resources belonging to each type. Furthermore, the migration flag field 2213c stores information indicating whether or not resources such as MPPK identified by the identification numbers are ownership migration objects. For example, this field stores ON if a resource is an ownership migration object and stores OFF if the resource is not an ownership migration object.

An input screen for configuring the foregoing MPPK, volumes and remote-copy groups as an ownership migration object or otherwise will be described next. The input screen is an input screen which is displayed on the display screen of the I/O unit 274 of the service processor 270. As shown in FIG. 41, the I/O unit 274 of the service processor 270 outputs an MPPK-unit migration object configuration modification screen 300 and a volume-unit migration object configuration screen 350.

The MPPK-unit configuration modification screen 300 is a screen for modifying the MPPK configuration. The check box 310 of the configuration modification screen 300 is used to select whether or not the MPPK are migration objects in MPPK units. Furthermore, the volume-unit configuration modification screen 350 is a screen for modifying volume configuration. The check box 360 on the configuration modification screen 350 is used to elect whether or not volumes are migration objects in volume units. For example, in FIG. 41, MKKPO and a volume having the volume number 35 are configured so as to be non-migration objects. When an Apply settings button 340 is pressed after checkbox 310 or checkbox 360 is configured, the configuration content is reported to the storage apparatus 200. Furthermore, the screen, used to configure whether ownership of remote-copy groups can be migrated, may be displayed on the I/O unit 274 similarly to the configuration modification screen 300 or 350 shown in FIG. 41.

Upon receiving the configuration modification instruction content which is configured in the configuration modification screen 300 or 350 from the service processor 270, the storage apparatus 200 executes the configuration content modification processing by starting the configuration modification program 2221 stored in the program unit 222 of the memory package 220.

Figure 42:
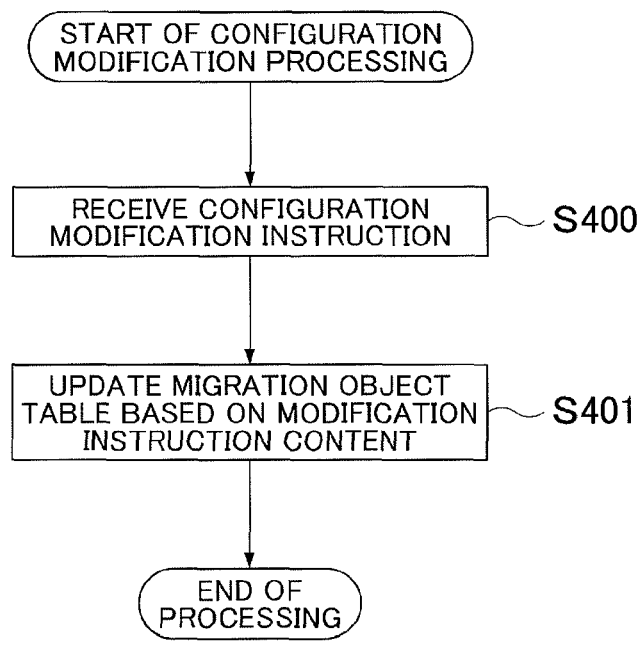
FIG. 42 is a flowchart showing processing content of processing to modify configuration content according to this embodiment.

Processing for modifying the configuration content according to the configuration modification program 2221 will be described next. As shown in FIG. 42, the configuration modification program 2221 receives the modified instruction content of the configuration modification from the service processor 270 (S400). More specifically, the configuration modification program 2221 receives information of non-migration object MPPK, volumes or remote-copy groups from the service processor 270. Furthermore, the configuration modification program 2221 updates the migration object table 2213 based on the modification instruction content received in step S400 (S401) and terminates the processing.

Ownership dynamic migration processing which considers whether or not the MPPK and so on are migration objects will be described next. As mentioned hereinabove, if the MPPK, volumes or remote-copy groups are configured as ownership non-migration objects, ownership dynamic migration processing must be executed by considering the details of the configuration. The monitoring program 2222 stored in the program unit 222 of the memory package 220 is a program which dynamically migrates ownership by checking the MP utilization of the MPPK 210 in the storage apparatus 200 at regular intervals and detecting an MPPK performance bottleneck or variations in the MP utilization, or the like.

Figure 43:
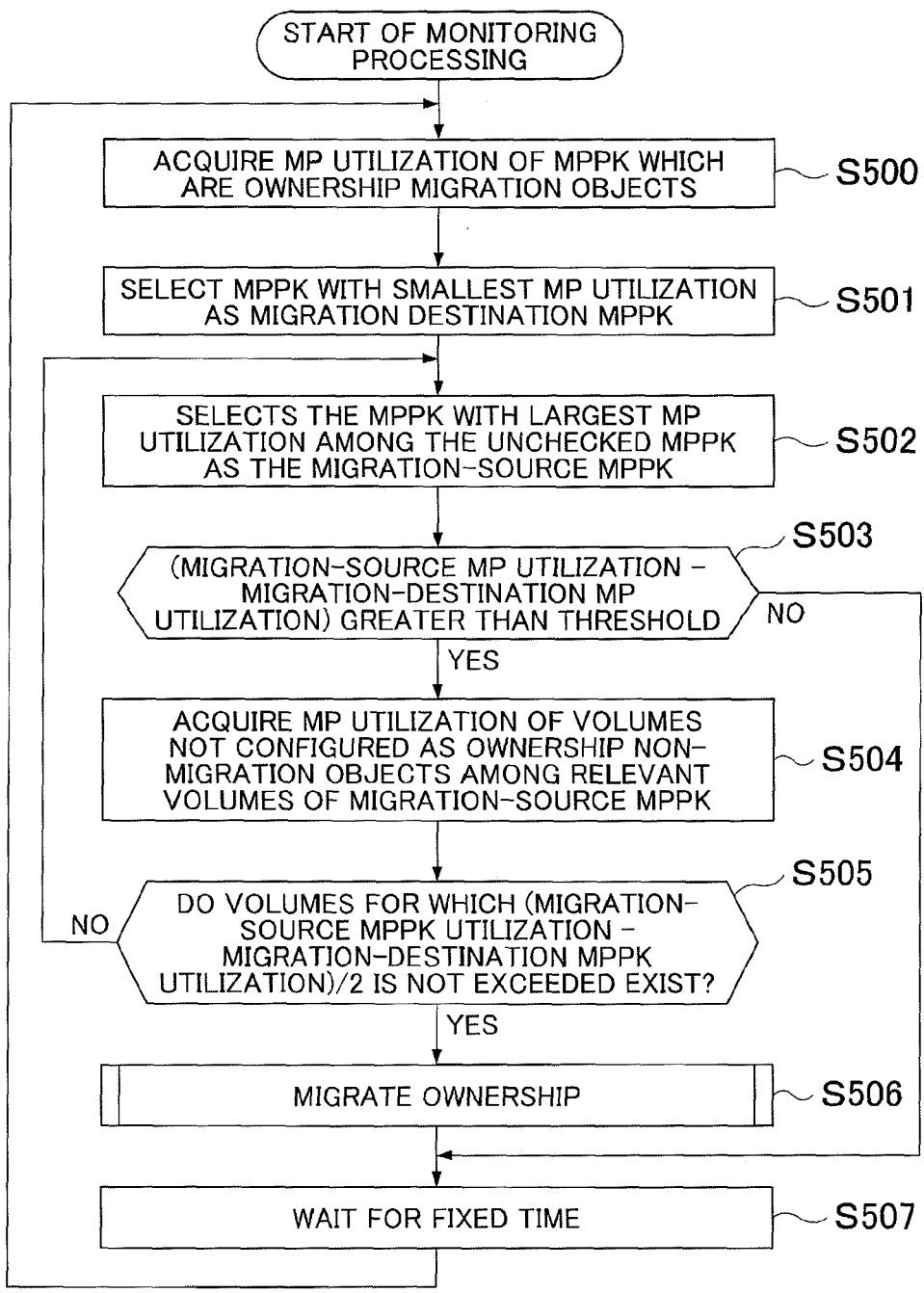
FIG. 43 is a flowchart showing processing content of ownership dynamic migration processing according to this embodiment.

As shown in FIG. 43, the monitoring program 2222 first refers to the migration object table 2213 and MP utilization table 2212 to acquire the MP utilization of all the MPPK 210 which are to serve as ownership migration objects (S500). The monitoring program 2222 selects the MPPK 210 with the smallest MP utilization among the MPPK 210 acquired in step S500, as the migration destination MPPK (S501).

The monitoring program 2222 subsequently selects the MPPK 210 with the largest MP utilization as the migration source MPPK among the MPPK 210 acquired in step S500 (S502). The MPPK 210 are migration source candidates at the selection stage in step S502. The monitoring program 2222 then determines whether or not the difference between the MP utilization of the migration source MPPK selected in step S502 and the MP utilization of the migration destination MPPK selected in step S501 (S503).

In step S503, if the difference between the migration-source MPPK and the migration-destination MPPK is not equal to or more than the threshold, the monitoring program 2222 determines that there is no load variation between the MPPK and there is no need to execute ownership migration, and, after a fixed time has elapsed, advances to step S507 to execute the processing of step S500 and subsequent steps.

If, on the other hand, it is determined in step S503 that the difference in the MP utilization between the migration-source MPPK and migration-destination MPPK is equal to or more than the threshold, the monitoring program 2222 acquires the volume-unit MP utilization of the volume for which the migration-source MPPK possesses ownership (S504). The monitoring program 2222 then determines whether or not a volume exists which has an MP utilization which does not exceed the value of Equation (1) below (S505).

$$(\text{Migration-source MPPK utilization} - \text{migration-destination MPPK utilization})/2 \qquad (1)$$

If it is determined in step S505 that a volume for which equation (1) is satisfied exists, the monitoring program 2222 executes ownership migration using the ownership migration program 2223 (S506). The ownership migration processing in step S506 will be described in detail subsequently. Note that, the reason why a search for volumes with an MP utilization not exceeding equation (1) is performed in step S505 is as follows. That is, because a volume having the MP utilization exceeding equation (1) is migrated from the migration-source MPPK to the migration-destination MPPK, the load of equation (1) can be migrated from the migration-source MPPK to the migration-destination MPPK to enable the loads of the migration-destination and migration-source MPPK to be equalized. Note that if, in step S506, there is a plurality of volumes which satisfy the conditions of equation (1), the MP utilization of the migration-source and migration-destination MPPK can be further equalized by taking the ownership of the volume with the largest MP utilization as the migration object.

If, on the other hand, it is determined in step S505 that there is no volume satisfying the equation (1), the monitoring program 2222 returns to step S502 and executes the processing of steps S502 to S506 on the MPPK with the second highest MP utilization.

Furthermore, the threshold which is used in step S503 may be pre-configured as 10%, for example. In this case, if the difference in MP utilization between the migration-source MPPK and the migration-destination MPPK is equal to or more than 10%, processing is executed to equalize the MP utilization between the MPPKs by migrating the ownership. Furthermore, there may be an arrangement whereby, if the MP utilization of the MPPK with the highest MP utilization is equal to or less than a predetermined threshold, ownership is not migrated even when the MP utilization across the MPPK exceeds the threshold. In addition, the threshold used in step S503 may also be changed depending on the value of the MP utilization. For example, there may be an arrangement whereby, if the largest MP utilization is equal to or more than 90%, ownership is migrated even when the difference in MP utilization is 5%. The threshold configuration may be determined based on the costs of processing to migrate ownership and the effect obtained by the ownership migration.

Further, the same processing as the monitoring processing shown in FIG. 43 can also be implemented when remote-copy group ownership is migrated. However, if remote-copy group ownership is migrated, the determination is made by using the load of the remote copy processing in step S505 above. For example, if the load of the remote copy processing is registered as the buffer volume load, reference is made to the MP utilization table 2212 in order to be able to acquire the load of the remote copy processing by totaling up the MP utilization of all the buffer volumes.

Figure 44:
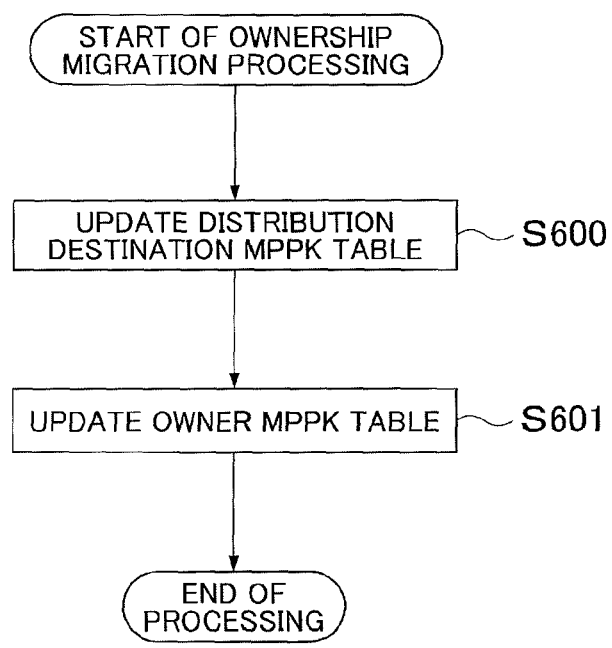
FIG. 44 is a flowchart showing processing content of ownership migration processing according to this embodiment.

The ownership migration processing in step S506 above which is executed by the monitoring program 2222 will be described next. The ownership migration processing is executed by the ownership migration program 2223. As shown in FIG. 44, the ownership migration program 2223 first updates the distribution destination MPPK table 263 (S600). The ownership migration program 2223 then updates the owner MPPK table 2211 (S601) and terminates the processing. More specifically, when updating the distribution destination MPPK table 263 and the owner MPPK table 2211, the ownership migration program 2223 modifies the MPPK numbers, in the tables which correspond to the migration object volumes, to the MPPK numbers of the migration-destination MPPK. As a result, the I/O requests which are newly transmitted from the host apparatus 100 are processed by the migration-destination MPPK. In addition, if the ownership in the remote-copy group are migrated, it is unnecessary to update the distribution destination MPPK table (step S600).

A method for excluding specific MPPK and volumes designated by the operator or the like from the ownership migration objects was described hereinabove. Hereinafter, a method will be described in which the storage apparatus 200 searches for MPPK, volumes, or remote-copy groups which are ownership non-migration objects and presents the same to the user.

First, the method in which the storage apparatus 200 searches for the MPPK and so on which are not migration-destination targets will be described. The following three methods are examples of methods for searching for non-migration destination target MPPK.

(b-1) Method for searching for non-migration object MPPK based on the I/O response.

(b-2) Method for searching for non-migration object MPPK based on information for configuring remote-copy groups.

(b-3) Method for searching for non-migration object MPPK based on resource depletion status.

Each of the methods is described in detail hereinbelow.

(b-1) Method for Searching for Non-Migration Object MPPK Based on I/O Response.

Hereinafter, the I/O average response time or average processor wait time is managed in MPPK units or volume units and this information is used to determine whether or not an MPPK is an ownership migration object.

The response time table 2214 for managing I/O average response times will be described first. As shown in FIG. 45, the response time table 2214 is configured from a type field 2214a, an identification number field 2214b, and a response time field 2214c. The type field 2214a stores information on the type of resources in the storage apparatus 200 and stores, for example, types such as MPPK and volume. The identification number field 2214b stores information identifying resources belonging each type. The response time field 2214c stores I/O average response times in volume units or MPPK units. Although the I/O response times are used for the values stored in the response time field 2214c in FIG. 45, the invention is not limited to this arrangement; for example, the processor unused wait time may be used or information affecting the I/O response time may be used, such as the average unused wait time for the resources provided in the other MPPK units.

Figure 46:
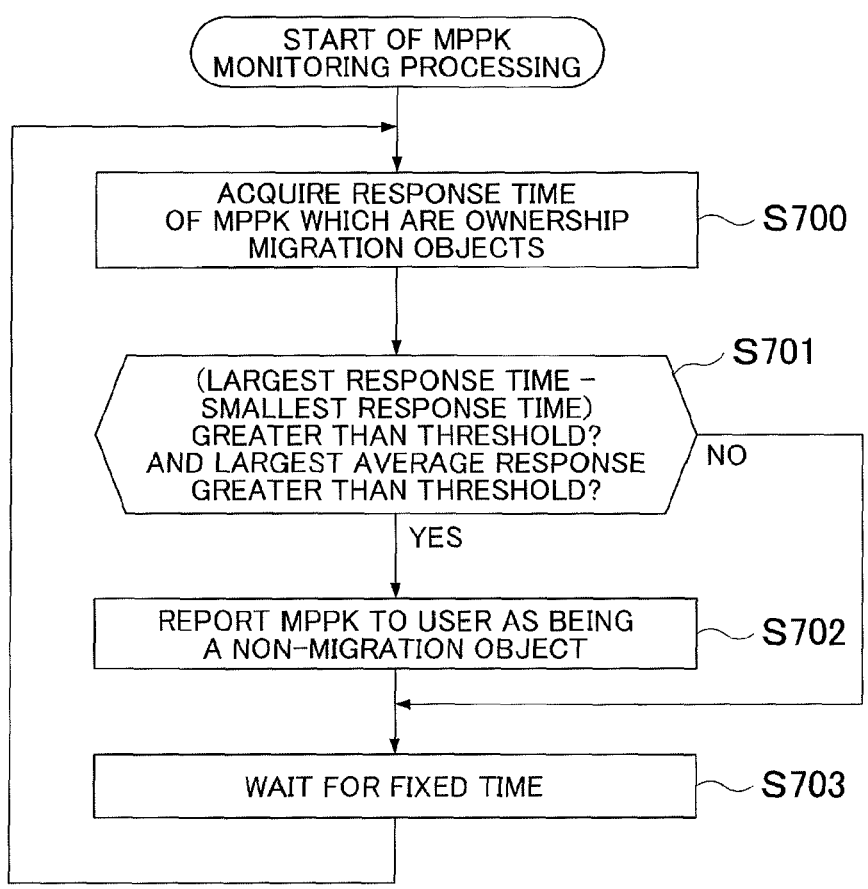
FIG. 46 is a flowchart showing processing content of MPPK monitoring processing according to this embodiment.

MPPK monitoring processing which presents non-migration object MPPK to the user based on the I/O response time will be described next. As shown in FIG. 46, the MPPK monitoring program 2224 first refers to the migration object table 2213 and the response time table 2214 and acquires a response time of all the MPPK 210 which is ownership migration objects (S700). Furthermore, the MPPK monitoring program 2224 determines whether or not an MPPK 210 which satisfies the following two conditions exists (S701).

(Condition 1) The difference between the largest and smallest values for the response time is equal to or more than the threshold (Condition 2) The largest value is equal to or more than another threshold If it is determined in step 5701 that there is an MPPK 210 which satisfies conditions 1 and 2, the MPPK 210 is reported to the user as non-migration object MPPK (S702). If, on the other hand, it is determined in step S701 that an MPPK 210 which satisfies conditions 1 and 2 does not exist, the MPPK monitoring program 2224 moves to step S703 and, after a fixed time has elapsed, repeats the processing of step S700 and subsequent steps.

Through the foregoing MPPK monitoring processing by the MPPK monitoring program 2224, an MPPK 210 with a worse response time than the other MPPK can be sought and presented to the user. Furthermore, the determination conditions in step S701 may be determined by using only condition 1. In addition, an MPPK 210 with the response time 0 may be excluded as a target for the selection of the largest and smallest values.

Method for Searching for Non-Migration Object MPPK Based on Remote-Copy Group Configuration Information Typically, for the processing times of inter-volume copy processing and remote copy processing by the storage apparatus 200, the processor occupancy time is longer than I/O processing time. The response thus readily deteriorates for I/O executed in an MPPK 210 which has remote-copy group ownership. It is therefore possible to avoid a worsening of the response caused by ownership migration by excluding owner remote-copy group MPPK from the ownership migration objects.

Figure 47:
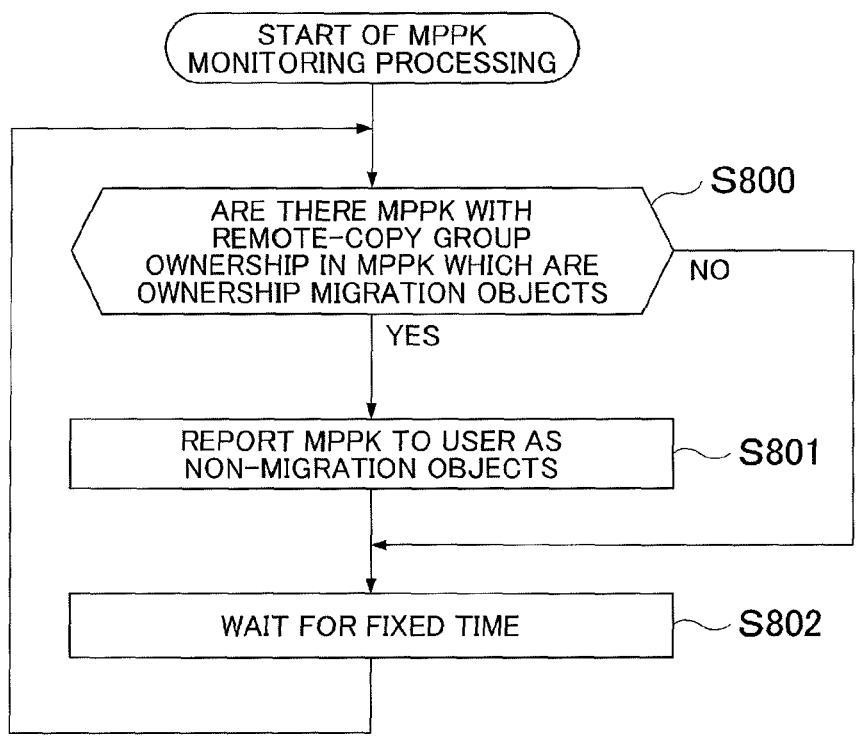
FIG. 47 is a flowchart showing processing content of MPPK monitoring processing according to this embodiment.

MPPK monitoring processing, by the MPPK monitoring program 2224, which searches for non-migration object MPPK 210 on the basis of remote-copy group configuration information will be described next. As shown in FIG. 47, the MPPK monitoring program 2224 refers to the owner MPPK table 2211 and the migration object table 2213 and determines whether there are MPPK 210 which satisfy the following condition (S800).

(Condition 3) An MPPK which is an ownership migration object possesses remote-copy group ownership.

If, in step S800, it is determined that there is an MPPK 210 which satisfies condition 3, the MPPK monitoring program 2224 reports the MPPK 210 to the user as a non-migration object MPPK (S801) and moves to step S802.

If, on the other hand, it is determined in step S800 that an MPPK 210 which satisfies the condition 3 does not exist, the MPPK monitoring program 2224 repeats the processing of step S800 and subsequent steps after a fixed time has elapsed (S802).

Accordingly, through the foregoing MPPK monitoring processing, a remote-copy group owner MPPK can be sought and presented to the user as the non-migration object MPPK 210. If the MP utilization is low even when a remote-copy group owner MPPK is configured, a condition that the MP utilization should be equal to or more than a fixed value may be added to the determination condition of step S800 because it is thought to be no problem even when ownership is migrated to the MPPK. In addition, the remote copy processing operates according to a write request from the host apparatus 100 and hence, in addition to the MP utilization, the proportion of write requests in the I/O count may also be considered.

Furthermore, there may be an arrangement such that, if all the MPPK 210 are remote-copy group owner MPPK, no MPPK 210 are presented to the user as non-migration objects. The arrangement may also be such that no MPPK are presented to the user as non-migration objects if a fixed number of MPPK or more are remote-copy group owner MPPK. Furthermore, the arrangement may be such that only in cases where one MPPK 210 has ownership to a plurality of remote-copy groups, the MPPK 210 is presented to the user as an ownership non-migration object. In addition, an ownership non-migration object MPPK 210 may also be presented to the user by combining the foregoing methods.

(b-3) Method for Searching for a Non-Migration Object MPPK Based on a Depleted Resources State Resources such as the cache in the migration-destination MPPK 210 are sometimes depleted through ownership migration, causing a lower performance than before migration. Hereinafter, a method in which MPPK with depleted resources are sought and these MPPK are presented to the user as non-migration object MPPK will be described. First, control information for managing resources provided in the MPPK units will be described and then the process flow for processing for searching for MPPK 210 with depleted resources will be described.

The MPPK cache management table 2215 for managing the cache capacity and usage rate of each MPPK will first be described. As shown in FIG. 14, the cache management table 2215 is configured from an MPPK number field 2215a, a capacity field 2215b, a cache usage rate field 2215c, a clean ratio field 2215d, and a dirty ratio field 2215e.

The MPPK number field 2215a stores numbers for uniquely identifying the MPPK 210. The capacity field 2215b stores information indicating the cache capacity of the MPPK 210 identified by the MPPK numbers. The cache usage rate field 2215c stores information indicating the usage rate of the cache assigned to each MPPK 210. The clean ratio field 2215d stores information indicating the ratio of the clean cache data to the cache capacity. Furthermore, the dirty ratio field 2215e stores information indicating the ratio of the dirty cache data to the cache capacity. Where the clean cache data is concerned, if the data stored in the hard disk drive 240 and the data in the cache are the same, the data in the cache is called clean cache data. Data in the cache which, after being written from the host apparatus 100 to the storage apparatus 200 and stored in the cache, has not yet been written to the hard disk drive 240 is called dirty cache data.

The volume cache management table 2216 for managing the cache capacity and usage rate for each volume will be described next. As shown in FIG. 49, the cache management table 2216 is configured from a volume number field 2216a, a cache usage rate field 2216b, a clean ratio field 2216c and a dirty ratio field 2216d.

The volume number field 2216a stores numbers number for uniquely identifying volumes 250. The cache usage rate field 2216b stores information indicating the usage rate of cache assigned to each volume 250. The clean ratio field 2216c stores information indicating the ratio of clean cache data to the cache capacity. Furthermore, the dirty ratio field 2216d stores information indicating the ratio of dirty cache data to the cache capacity.

The resource management table 2217 in which resources other than the cache are managed will be described next. As shown in FIG. 50, the resource management table 2217 is configured from a type field 2217a, an identification number field 2217b, a local memory field 2217c, a data transfer buffer field 2217d, an I/O multiplicity field 2217e, and a copy job multiplicity field 2217f.

The type field 2217a stores information on the types of resources in the storage apparatus 200. The identification number field 2217b stores information identifying the resources belonging to each type. The local memory field 2217c stores information indicating the usage rate of the local memory which the MPPK 210 comprises. The data transfer buffer field 2217d stores information indicating the usage rate of the data transfer buffer of the MPPK 210. The I/O multiplicity field 2217e stores information indicating the usage rate of the I/O multiplicity of the MPPK 210. The copy job multiplicity field 2217f stores information indicating the usage rate of the copy job multiplicity of the MPPK 210. Here, the I/O multiplicity and copy job multiplicity signify the multiplicity of the I/O and the multiplicity of the copy jobs which each MPPK 210 issues to the hard disk drive 240. The multiplicity of the I/O issued from the host apparatus 100 to the storage apparatus 200 is limited according to the resources of the storage apparatus 200 and restricted by the multiplicity of the jobs which can be started for the I/O processing.

Resource monitoring processing in which MPPK which are depleted based on resources managed in the foregoing MPPK cache management table 2215, the volume cache management table 2216, and the resource management table 2217 are sought and presented to the user will be described next.

Figure 51:
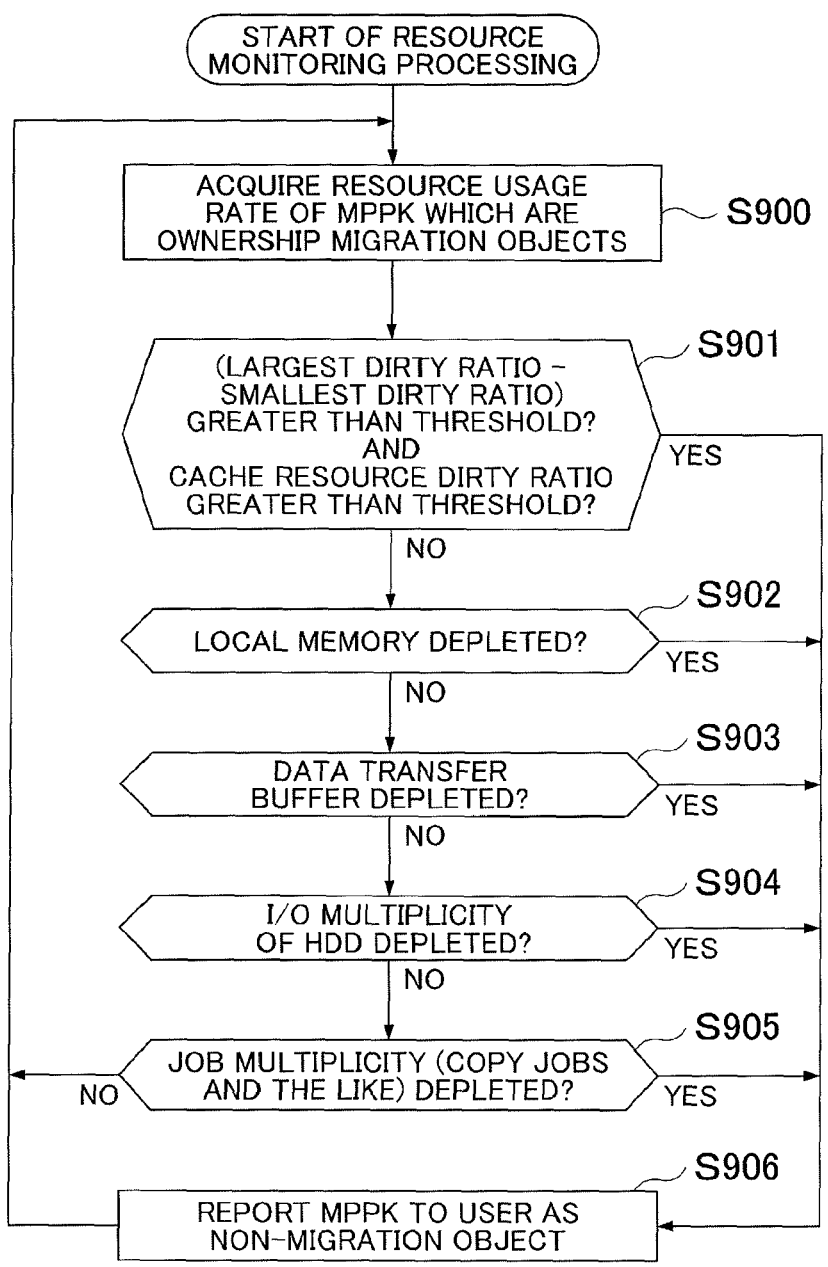
FIG. 51 is a flowchart showing processing content of resource monitoring processing according to this embodiment.

As shown in FIG. 51, the resource monitoring program 2225 first refers to the migration object table 2213, the MPPK cache management table 2215, the volume cache management table 2216 and the resource management table 2217 and acquires the resource usage rate of all the ownership migration objects MPPK (S900).

The resource monitoring program 2225 then determines whether or not an MPPK 210 which satisfies the following two conditions exists (S901).

(Condition 4) Largest dirty ratio—smallest dirty ratio greater than threshold (Condition 5) Cache resource dirty ratio greater than threshold The reason why the resource depletion status is determined from a dirty ratio in step S901 will now be described. The cache is an area for temporarily storing task data and therefore, if the cache is depleted, an unused area can be created in the cache by discarding the cache data. Here, since data need only be discarded from the cache if the cache data is clean cache data, unused area can be created at high speed. If, however, the cache data is dirty cache data, the data must be temporarily written to the hard disk drive 240 and therefore unused area cannot be created instantly. On that basis, the cache depletion state is determined from the dirty ratio in step S901. Furthermore, if it takes time to discard the clean cache data, the cache depletion status may be determined from the usage rate of the cache which also contains the clean cache data.

Furthermore, the resource depletion status may be determined not only by the resource usage rate as mentioned earlier, but also based on the number of times the reservation of resources fails. More specifically, the number of times the resource reservation fails may be managed and the determination that resources are depleted may be made if the number of times resource reservation fails is equal to or more than a predetermined threshold.

The resource depletion table 2218 for managing the number of times resource reservation fails will now be described. As shown in FIG. 52, the resource depletion table 2218 is configured from an MPPK number field 2218a, the resource type field 2218b and a reservation failure count field 2218c. The MPPK number field 2218a stores a number for uniquely identifying the MPPK 210. The resource type field 2218b stores information indicating the types of resources such as, for example, the cache, the local memory, the data transfer buffer, the I/O multiplicity, or the job multiplicity. The reservation failure count field 2218c stores information indicating the number of times resource reservation fails per unit of time. The processing for counting the number of times resource reservation fails is implemented in resource reservation processing by adding 1 to the value in the reservation failure count field of the resource depletion table 2218 if the corresponding resources cannot be reserved.

Returning now to FIG. 51, if it is determined in step S901 that there is an MPPK 210 which satisfies the foregoing conditions 4 and 5, the resource monitoring program 2225 reports the MPPK 210 with the largest dirty ratio to the user as an ownership non-migration object MPPK (S906).

If, however, it is determined in step 5901 that there is no MPPK 210 which satisfies the foregoing conditions 4 and 5, the resource monitoring program 2225 determines whether or not the local memory is depleted (S902). The resource monitoring program 2225 advances to step S906 if it is determined in step S902 that the local memory is depleted.

Meanwhile, if it is determined that the local memory is not depleted in step S902, the resource monitoring program 2225 determines whether or not the data transfer buffer is depleted (S903). If it is determined in step S903 that the data transfer buffer is depleted, the resource monitoring program 2225 advances to step S906.

Meanwhile, if it is determined in step S903 that the data transfer buffer is not depleted, the resource monitoring program 2225 determines whether or not the I/O multiplicity of the hard disk drives (HDD) is depleted (S904). If it is determined in step S904 that the I/O multiplicity of the hard disk drives is depleted, the resource monitoring program 2225 advances to step S906.

Meanwhile, if it is determined in step S904 that the I/O multiplicity in the hard disk drive is not depleted, the resource monitoring program 2225 determines whether or not the job multiplicity (copy jobs and so on) is depleted (S905). If it is determined in step S905 that the job multiplicity is depleted, the resource monitoring program 2225 advances to step S906.

Meanwhile, if it is determined in step S905 that the job multiplicity is not depleted, the resource monitoring program 2225 returns to step S900 and repeats the processing of step S900 and beyond.

A search for MPPK 210 with depleted resources can be made by executing the foregoing resource monitoring processing in this way and these MPPK can be presented to the user as non-migration object MPPK.

Typically, resource depletion can be determined based on whether the usage rate of each resource is 100%. If the higher the usage rate of the resource, the longer the time taken for resource reservation, it may be determined that the resources are depleted if a fixed threshold is exceeded. For example, the resource depletion status may also be determined based on an increase in overhead for finding unused resources and an increase in the overhead for creating unused area.

A method whereby the storage apparatus 200 searches for non-migration destination target volumes will be described next. Volumes and remote-copy groups which should be configured as non-migration objects are, for example, volumes and remote-copy groups with excessively large migration costs and volumes and remote-copy groups for which processing continuously occupying the processing for long periods is readily executed. The following two methods are examples of methods for searching for non-migration object volumes.

(c-1) Method for finding non-migration object volumes and the like based on the usage rates of volumes and remote-copy groups.

(c-2) Method for finding non-migration object volumes and the like based on the remote-copy group configuration status.

Each of these methods will be described in detail hereinbelow.

(c-1) Method for Finding Non-Migration Object Volumes Based on the Usage Rates of the Resources of Volumes and Remote-Copy Groups Volume monitoring processing in which volumes which are best excluded from the ownership migration objects are sought and presented to the user will be described first.

Figure 53:
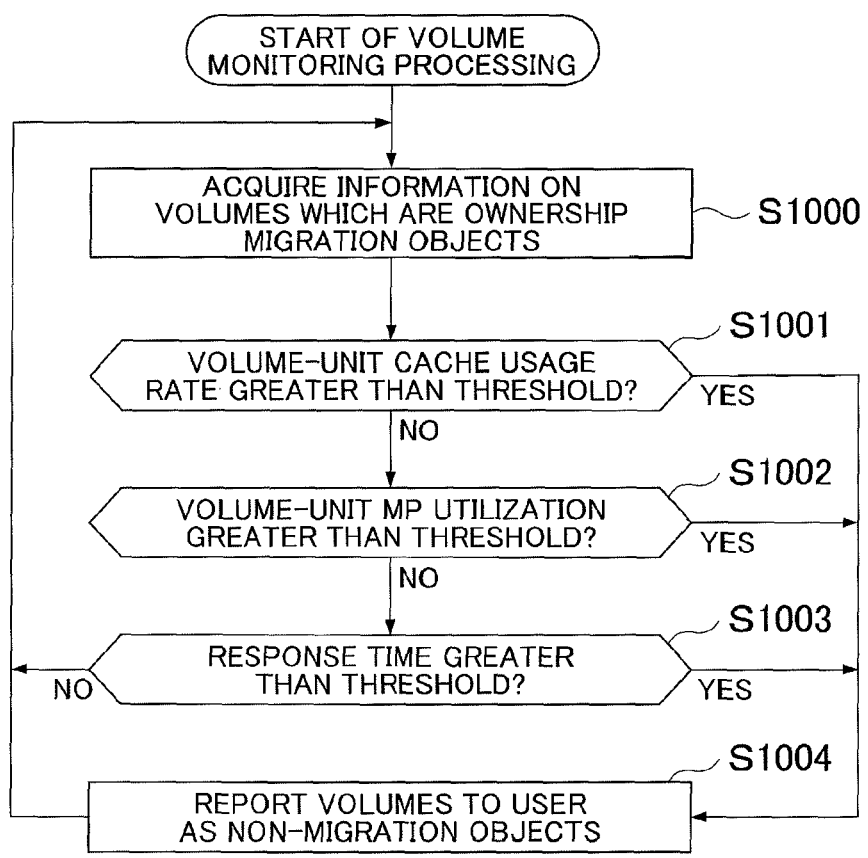
FIG. 53 is a flowchart showing processing content of volume monitoring processing according to this embodiment.

As shown in FIG. 53, the volume monitoring program 2226 acquires information on volumes which are ownership migration objects (S1000). More specifically, the volume monitoring program 2226 refers to the migration object table 2213, the cache management table (volume) 2215, the resource management table 2217, the MP utilization table 2212, and the response time table 2214 to acquire the resource usage rate, MP utilization and response time (or processor unused wait time) of all the volumes which are ownership migration objects.

The volume monitoring program 2226 determines whether the cache usage rate of the volume units acquired in step S1000 is equal to or more than a predetermined threshold (S1001). The determination in step S1001 is not limited to the volume-unit cache usage rate and may be determined based on the cache dirty ratio and clean ratio. If it is determined in step S1001 that the cache usage amount of the volume units is equal to or more than the threshold, the volume monitoring program 2226 renders the volumes ownership non-migration object volumes and presents these volumes to the user (S1004).

If, on the other hand, it is determined in step S1001 that the cache usage amount of the volume units is not equal to or more than the threshold, the volume monitoring program 2226 determines whether or not the volume MP utilization is equal to or more than the predetermined threshold (S1002). If it is determined in step S1002 that the volume MP utilization is equal to or more than a predetermined threshold, the volume monitoring program 2226 presents the volume to the user as an ownership non-migration object volume (S1004).

Meanwhile, if it is determined in step S102 that the volume MP utilization is not equal to or more than the predetermined threshold, the volume monitoring program 2226 determines whether or not the response time of the volume (or the processor wait time) is equal to or more than the threshold (S1003). If it is determined in step S103 that the volume response time is equal to or more than the threshold, the volume monitoring program 2226 presents the volume to the user as an ownership non-migration object volume (S1004).

If, however, it is determined in step S103 that the volume response time is equal to or more than the threshold, the volume monitoring program 2226 returns to step S1000 and repeats the processing of step S1000 and subsequent steps on the ownership migration object volume.

The volume unit ownership in the volume monitoring processing were described hereinabove but non-migration object volumes may also be specified by executing the same processing for remote-copy group ownership. For example, in step S1001, it may be determined whether the total of the cache usage rates of all the volumes targeted for remote-copy processing is equal to or more than a threshold. This is because, if remote-copy group ownership is migrated, the ownership of all the volumes targeted for remote-copy processing must be migrated all together.

Furthermore, it may be determined in step S1002, for example, whether the total of the MP utilization of all the volumes targeted for the remote copy processing is equal to or more than the threshold. In addition, if processing exists which is not executed on the volumes during remote-copy processing, MP utilization is managed separately and it may be determined whether this MP utilization and the total MP utilization of the volumes is equal to or more than the threshold. This determination may also be made by adding the total MP utilization of the volumes to the MP utilization of a specific buffer volume.

It may also be determined in step S1003, for example, whether the average value of the response time of all the volumes targeted by remote-copy processing is equal to or more than the threshold. Further, as for the MP utilization, for processing which is not executed on the volumes, the response time (or processor unused wait time) of this processing is managed separately and it may be determined whether the response time of the processing and the average value of the response time of the volume units is equal to or more than the threshold.

(c-2) Method for Searching for Non-Migration Object Volumes Based on the Remote-Copy Group Configuration Status.

As mentioned earlier, typically, in the storage apparatus 200, the remote-copy processing processing time occupies the processor for a longer time than the I/O processing time. For this reason, the average processor unused wait time of a remote-copy group owner MPPK is longer than for the other MPPK which do not possess remote-copy group ownership. If, therefore, remote-copy group ownership are moved, the I/O response time for the corresponding volume in the migration-destination MPPK is likely to be worse than before the migration. It is therefore considered to be better to exclude remote-copy groups on which remote-copy processing is frequency executed from the ownership migration objects. Remote-copy group monitoring processing, which involves searching for the remote-copy group which is causing the worsening of the response time and presenting the volume belonging to the remote-copy group to the user as non-migration objects will be described hereinbelow.

Figure 54:
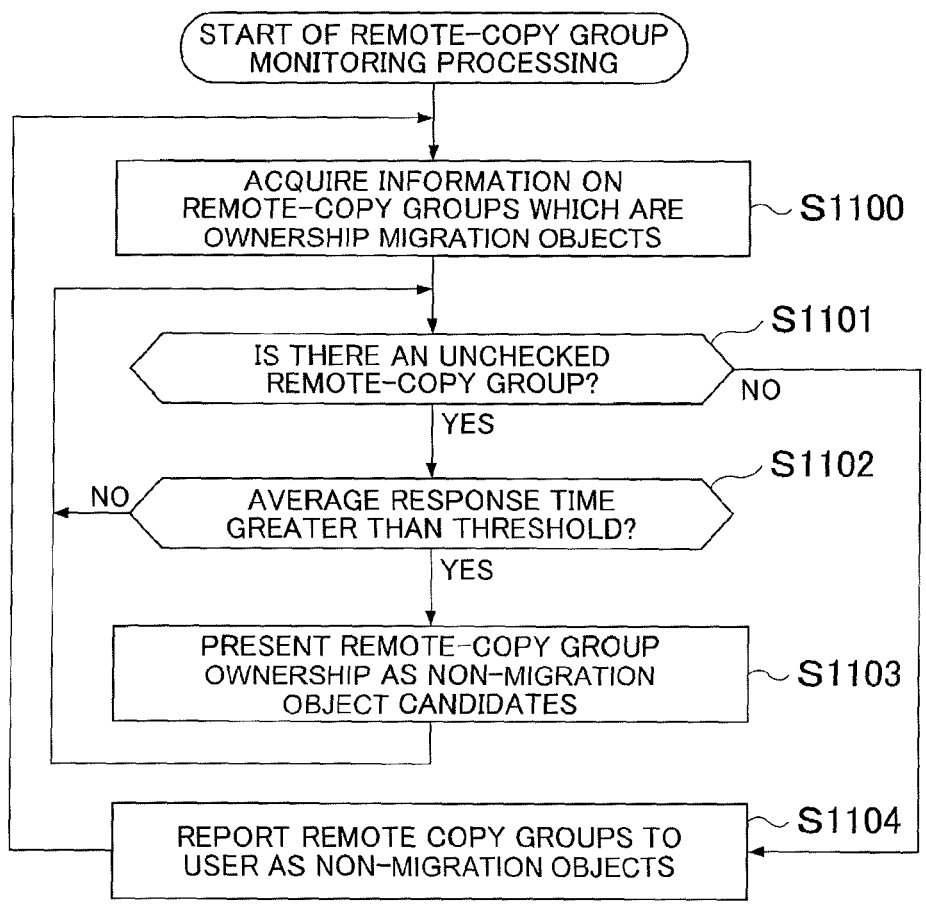
FIG. 54 is a flowchart showing processing content of remote copy group monitoring processing according to this embodiment.

First, as shown in FIG. 54, the remote-copy group monitoring program 2227 acquires information of remote-copy groups which are ownership migration objects (S1100). More specifically, the remote-copy group monitoring program 2227 refers to the migration object table 2213 and the owner MPPK table 2211 to acquire information of all the remote-copy groups which are ownership migration objects and the MPPK with ownership.

Furthermore, the remote-copy group monitoring program 2227 determines whether a check of all the remote-copy groups acquired in step S1100 is complete, that is, whether the processing of step S1102 and subsequent steps has been executed for all the remote-copy groups (S1101). Further, if it is determined in step S1101 that the check of all the remote-copy groups is complete, the remote-copy group monitoring program 2227 advances to step S1104 and, after a certain time has elapsed, moves to step S1100 and repeats the processing of step S1100 and subsequent steps.

If, however, it is determined in step S1101 that the check of all the remote-copy groups is not complete, the remote-copy group monitoring program 2227 refers to the response time table 2214 to determine whether the response time (or processor unused wait time) of the MPPK 210 with ownership in the remote-copy group is equal to or more than the threshold (S1102).

If it is determined in step S1102 that the response time of the MPPK 210 is equal to or more than the threshold, the remote-copy group monitoring program 2227 reports to the user that the remote-copy group is to be excluded from the ownership migration objects (S1103) and then returns to step S1101 to execute the processing of steps S1102 and subsequent steps for the other remote-copy groups. If, on the other hand, it is determined in step S1102 that the response time of the MPPK 210 is not equal to or more than the threshold, the remote-copy group monitoring program 2227 returns to step S1101 and executes the processing of step S1102 and subsequent steps for the other remote-copy groups.

With the remote-copy group monitoring processing above, it is possible to search for remote-copy groups which are highly likely to exhibit a worsening of response in the migration-destination MPPK 210 when ownership is migrated and to present these remote-copy groups to the user.

(Ownership Migration Mode)

The ownership migration mode will be described next. Hereinabove, a method was described which detects variations in the utilization of the MPPK 210 and whereby the storage apparatus 200 determines the migration-destination MPPK, migration-source MPPK, or the ownership and the like to be migrated. However, when ownership is migrated, there is a migration processing overhead, and hence sometimes executing the migration processing at times when the utilization is low may be desirable. A case may also be considered where the user intentionally changes the migration-destination MPPK, migration-source MPPK, or the ownership to be migrated, which are determined by the storage apparatus. For example, in cases where the user is aware beforehand of the timing with which fluctuations in the processing load occur, there may be a desire to execute migration processing by avoiding such timing.

In order to meet user needs of this kind, in this embodiment, when ownership is migrated, three modes, namely, an automatic migration mode, a migration candidate presentation mode, and a bottleneck notification mode are provided. Automatic migration mode is a mode in which a migration object is determined by the storage apparatus 200 and migration processing is executed automatically. Migration candidate presentation mode is a mode in which a migration object is determined by the storage apparatus 200, information of MPPK and the like which are migration candidates is presented to the user, and the migration processing is executed in response to user inputs. Bottleneck notification mode is a mode in which load variations in the storage apparatus 200 are notified and the migration objects and timing for migration processing are determined in response to user inputs.

Figure 55:
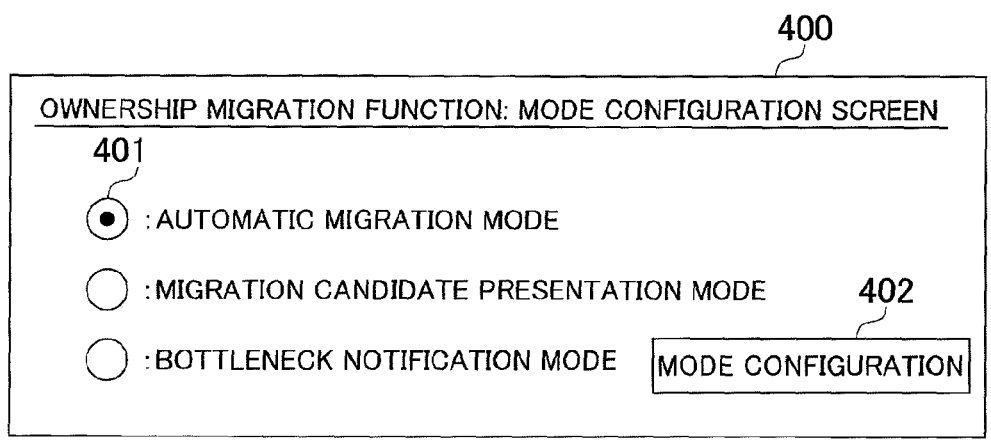
FIG. 55 is a conceptual view of a mode configuration screen according to this embodiment.

A mode configuration screen for configuring the foregoing three modes will first be explained. The mode configuration screen is an input screen which is displayed on a display screen of the I/O unit 274 of the service processor 270. As shown in FIG. 55, the mode configuration screen 400 includes radio buttons 401 enabling the selection of one of three modes, namely, the automatic migration mode, the migration candidate presentation mode, and the load variation notification mode, and a mode configuration button 402. The user first uses the radio buttons 401 to select one mode from the foregoing three modes and presses button 402. As a result of the user pushing button 402, the content of the mode configured by the user is reported to the storage apparatus 200.

Figure 56:
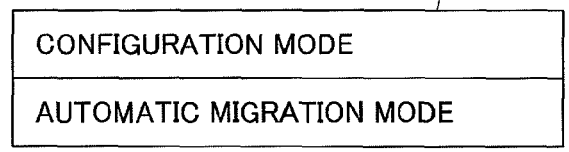
FIG. 56 is a diagram showing the content of configuration mode according to this embodiment.

The configuration modification program 2221 of the storage apparatus 200 updates the configuration mode 2219 stored in the control information unit 221 according to the mode configured by the user via the service processor 270. The configuration mode 2219 stored in the control information unit 221 stores all three of the foregoing modes. FIG. 56 shows a case where information indicating automatic migration mode is stored in the configuration mode 221.

Figure 57:
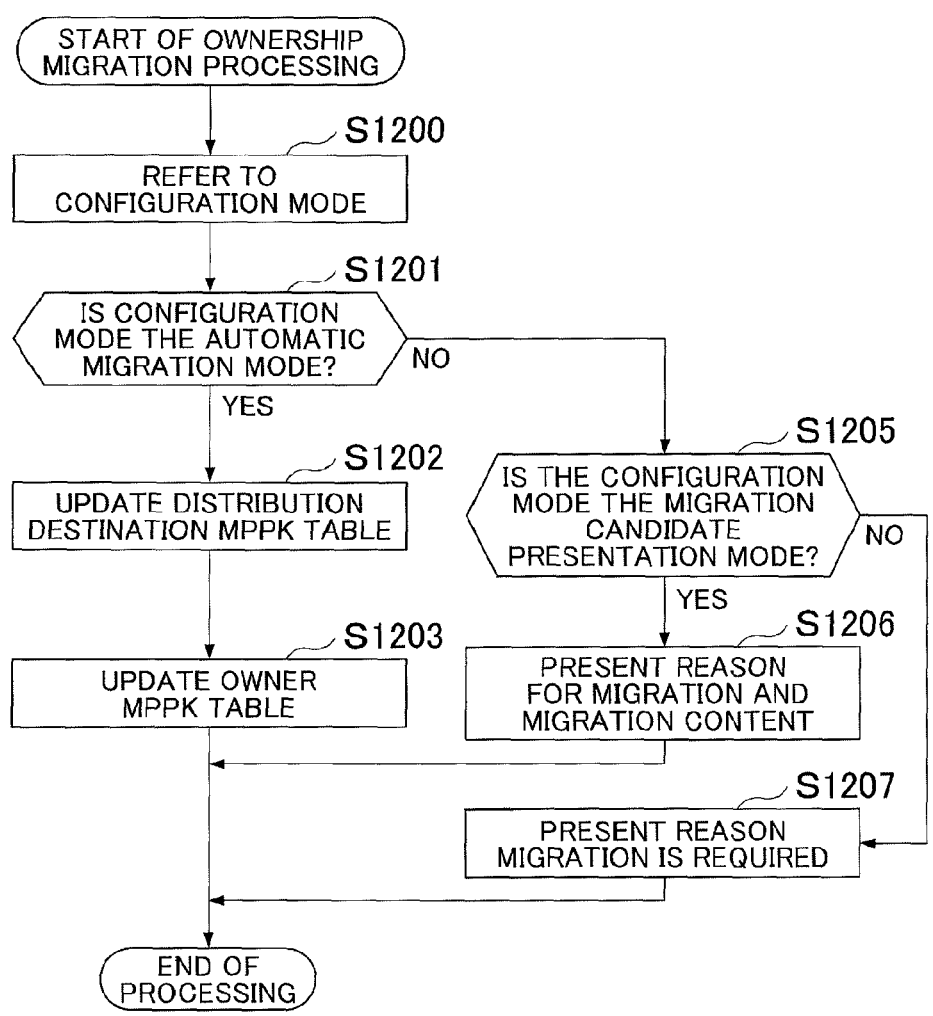
FIG. 57 is a flowchart showing processing content of an ownership migration processing according to this embodiment.

Ownership migration processing for a case where the three modes are considered will be described next. As shown in FIG. 57, the ownership migration program 2223 refers to the configuration mode 2219 to acquire information on the configuration mode currently configured (S1200). The ownership migration program 2223 then determines whether the configuration mode acquired in step S 1200 is automatic migration mode. (S1201).

If it is determined in step S1201 that the configuration mode is not automatic migration mode, the ownership migration program 2223 determines whether the configuration mode is migration candidate presentation mode (S1205). Meanwhile, if it is determined in step S1201 that the configuration mode is automatic migration mode, the ownership migration program 2223 executes the processing of step S1202 and subsequent steps.

If it is determined in step S1205 that the configuration mode is migration candidate presentation mode, the ownership migration program 2223 presents the reason for migration and migration details to the user (S1206), and terminates the processing. Here, the reason for migration is the reason for migrating ownership, examples of which include the occurrence of an MP bottleneck or utilization variations between the MPPK. Furthermore, the migration content is information indicating what kind of ownership is migrated from a particular MPPK to a particular MPPK.

If, however, it is determined in step S1205 that the configuration mode is not the migration candidate presentation mode, the ownership migration program 2223 presents the reason the ownership migration is required to the user (S1207) and terminates the processing. Here, examples of reasons why ownership migration is required include an MP bottleneck or a utilization variation between MPPK.

Further, if it is determined in step S1201 that the configuration mode is automatic migration mode, the ownership migration program 2223 updates the distribution destination MPPK table 263 (S1202) and updates the owner MPPK table 2211 (S1203) and terminates the processing.

(1-4) Effect of This Embodiment

As described hereinabove, in the storage system 1 according to this embodiment, variations in the MP utilization (processing load variations) between the plurality of MPPK 210 provided in the storage apparatus 200 are detected and the migration-source MPPK from which the ownership is migrated and the ownership migration-destination MPPK are selected on the basis of the variations in the MP utilization. Further, it is determined whether to migrate the ownership of the MPPK based on the usage status of the resources of the volume to which the migration-source MPPK possesses ownership, and the like, and it is determined whether ownership is migrated to the MPPK on the basis of information on the state of the I/O processing of the migration-destination MPPK and so on. Accordingly, reduced performance caused by ownership migration can be avoided and resource depletion caused by ownership migration can be eliminated, thus improving the usage efficiency of the MPPK.

(7) Seventh Embodiment (7-1) Configuration of Computer System

The hardware configuration of the computer system 7 according to this embodiment is the same as the hardware configuration of the computer system 6 according to the sixth embodiment and hence a detailed description thereof is not included. Furthermore, where the software configuration of the computer system 7 is concerned, the programs stored in the program unit 222 of the memory package 220 differ from those of the sixth embodiment and therefore details of the configuration differences from the sixth embodiment in particular will be described hereinbelow.

A method of avoiding reduced performance due to ownership migration as a result of limiting the migration object ownership, ownership migration source MPPK 210 or ownership migration destination MPPK 210 was described in the sixth embodiment. In this embodiment, the performance of the storage apparatus 200 is improved by migrating ownership by means of the following method.

(c-1) Method of selecting the optimum MPPK as the ownership migration object by considering the response time and resource usage rate and so on excluding MP utilization.

Figure 58:
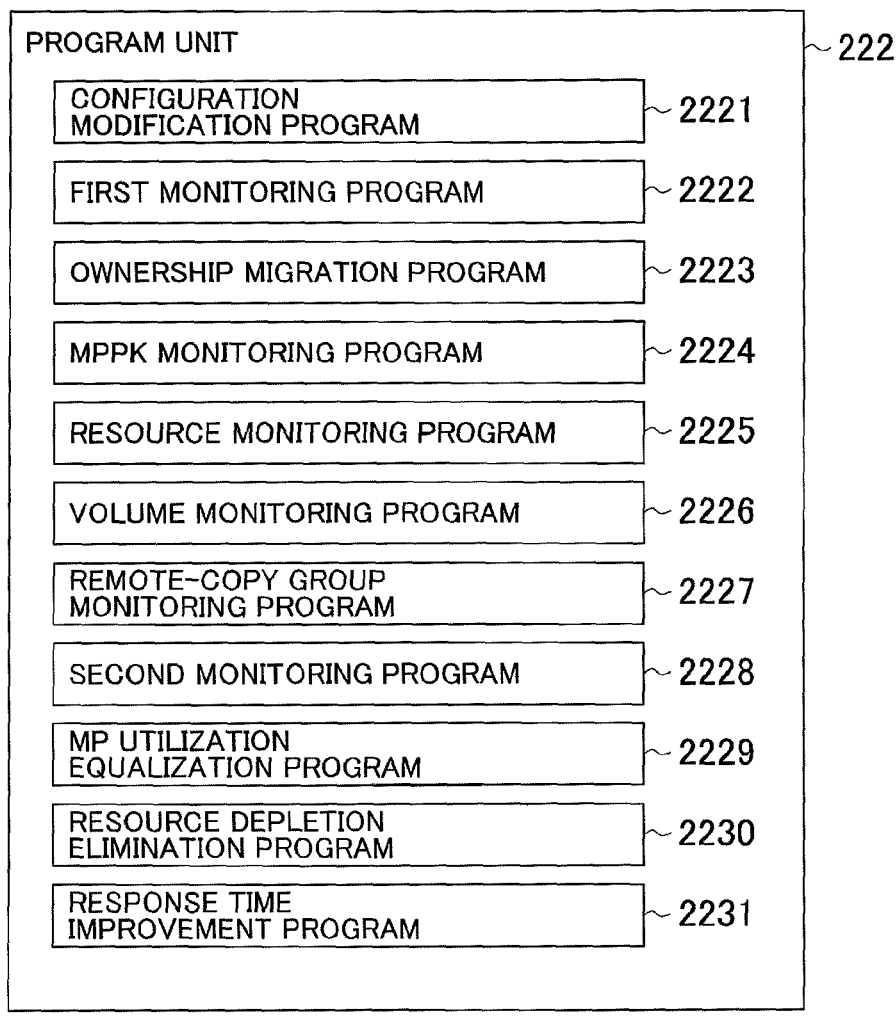
FIG. 58 is a block diagram showing control information of a storage apparatus according to a seventh embodiment of the present invention.

(c-2) Method of migrating ownership for eliminating resource depletion (c-3) Method of migrating ownership for enhancing response time variations This embodiment differs from the first embodiment in that a new program for implementing the foregoing three methods is added to the program unit 222. More specifically, as shown in FIG. 58, in this embodiment, the program unit 222 stores a second monitoring program 2228, an MP utilization equalization program 2229, a resource depletion elimination program 2230, and a response time improvement program 2231 in addition to the configuration modification program 2221, monitoring program 2222, ownership migration program 2223, first MPPK monitoring program 2224 (similar to the MPPK monitoring program 2224 of the first embodiment), the resource monitoring program 2225, the volume monitoring program 2226, and the remote-copy group monitoring program 2227.

(7-2) Functional Configuration of Storage Apparatus

The processing routine for implementing the foregoing methods (c-1), (c-2), and (c-3) will be described hereinbelow. The monitoring processing by the second monitoring program 2228 will be described first.

Figure 59:
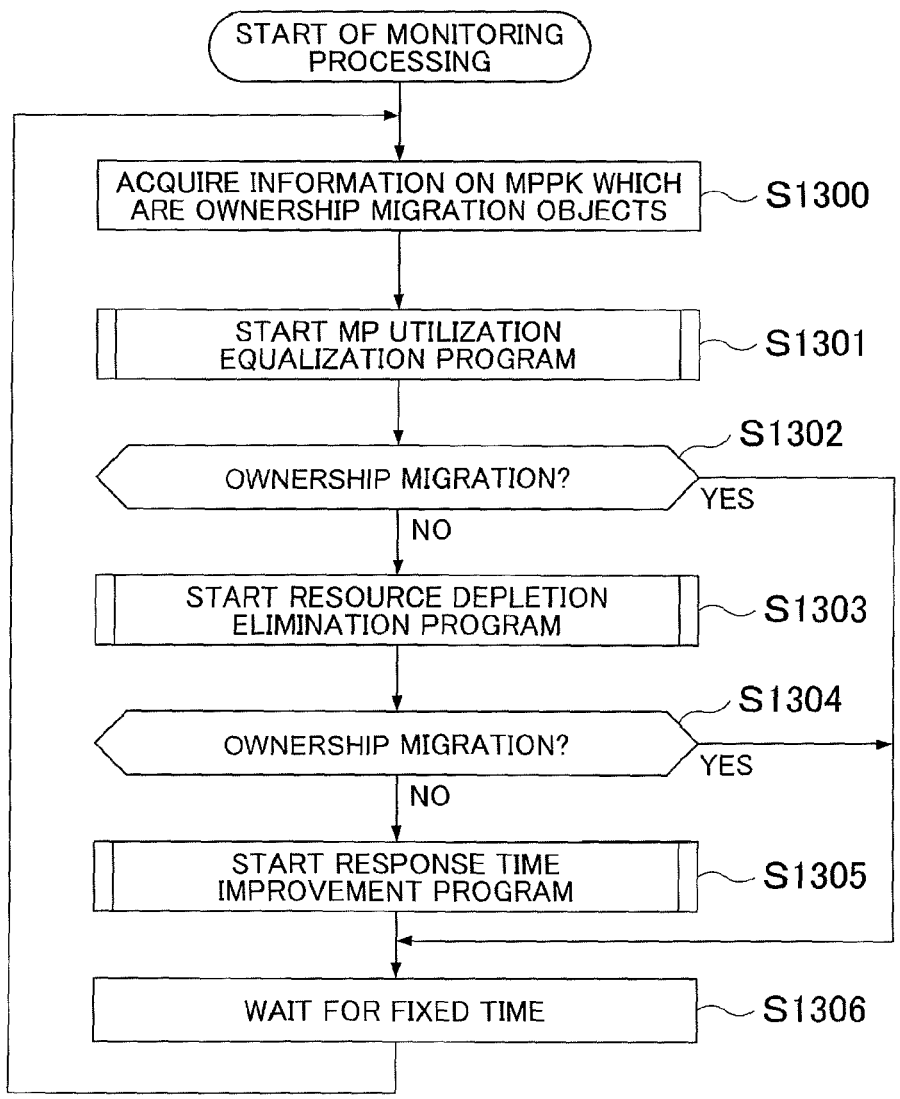
FIG. 59 is a flowchart showing processing content of monitoring processing according to this embodiment.

As shown in FIG. 59, the second monitoring program 2228 acquires information on the MPPK 210 which are the ownership migration objects (S1300). More specifically, the second monitoring program 2228 refers to the migration object table 2213, the MP utilization table 2212, the response time table 2214, the cache management table (MPPK) 2215, the resource management table 2217, and the resource depletion table 2218 to acquire the MP utilization, response time, resource usage rate and resource reservation failure count of the MPPK 210 which are the ownership migration objects.

In order to eliminate variations in the MP utilization, the monitoring program 2228 starts up the MP utilization equalization program 2229 (S1301). The MP utilization equalization processing by the MP utilization equalization program 2229 will be described in detail subsequently.

If ownership migration is executed as a result of executing the MP utilization equalization program 2229 in step S1301, the second monitoring program 2228 advances to step S1306 and, after a fixed time has elapsed, returns to step S1300 and repeats the processing of step S1300 and subsequent steps. If, however, ownership migration is not executed (S1302) due to the fact that there is no MP bottleneck or utilization variation between the MPPK in step S1301, the second monitoring program 2228 starts up the resource depletion elimination program 2230 (S1303). The resource depletion elimination processing by the resource depletion elimination program 2230 will be described in detail subsequently.

If ownership migration is executed as a result of executing the resource depletion elimination program 2230 in step S1303, the second monitoring program 2228 advances to step S1306 and, after a fixed period has elapsed, returns to step S1300 and repeats the processing of step S1300 and subsequent steps. However, if ownership migration is not executed since resource depletion has not occurred in S1303 (S1304), the second monitoring program 2228 starts up the response time improvement program 2231 (S1305).

After executing the response time improvement program 2231 in step S1305, the second monitoring program 2228 returns to step S1300 and repeats the processing of step S1300 and subsequent steps after a fixed time has elapsed (S1306).

Figure 60:
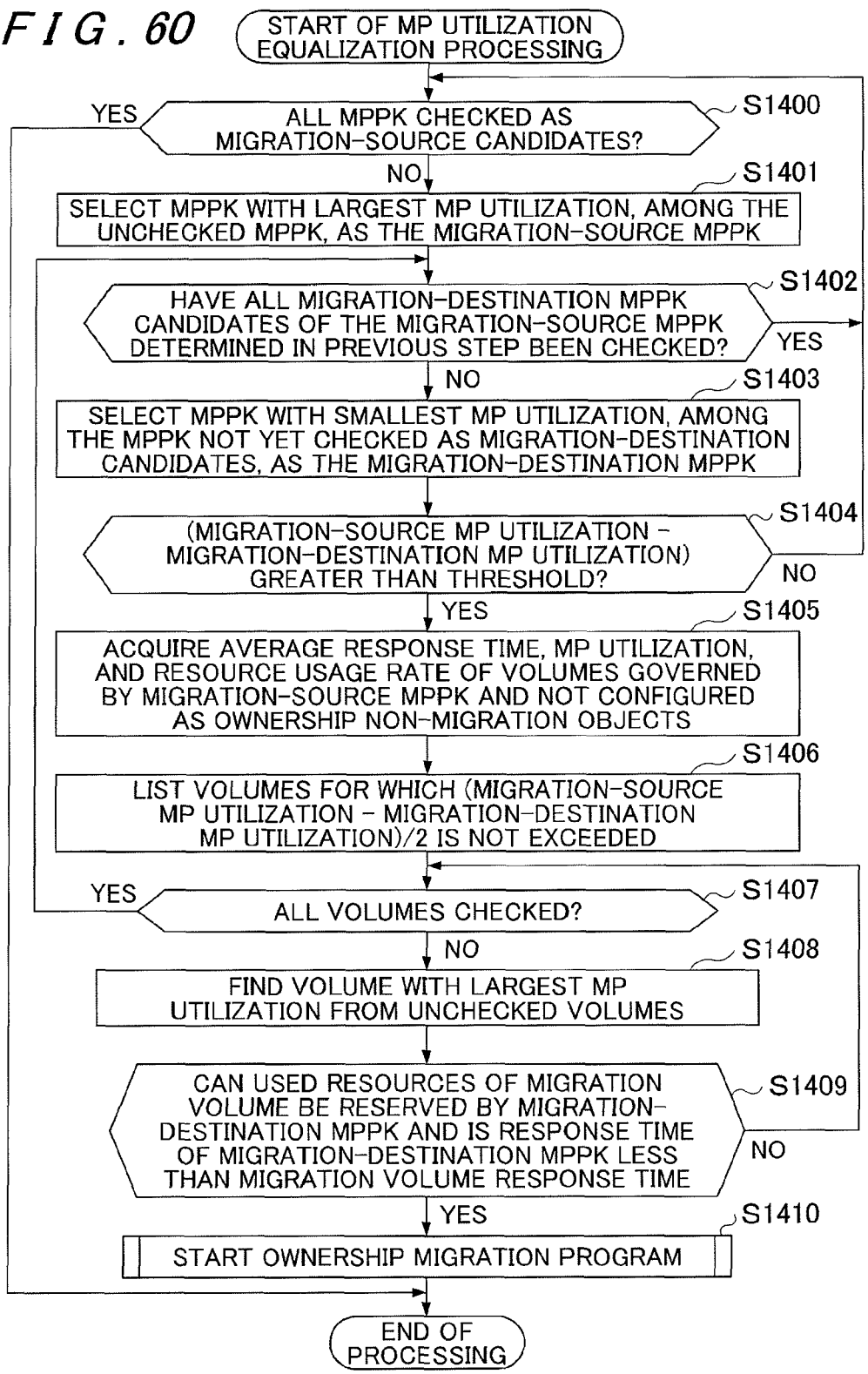
FIG. 60 is a flowchart showing processing content of MP utilization equalization processing according to this embodiment.

(c-1) Method for Selecting the Optimum MPPK as Ownership Migration Object by Considering the Response Time and Resource Usage Rate Excluding the MP Utilization The MP utilization equalization processing which is executed in step S1301 above will be described next. The MP utilization equalization processing is processing for determining the ownership migration destination by considering the response time and resource usage rate. As shown in FIG. 60, the MP utilization equalization program 2229 first determines whether all the MPPK which are ownership migration objects have been checked as migration source candidates (S1400). If it is determined in step S1400 that not all the migration-source candidate MPPK have been checked, the MP utilization equalization program 2229 renders the MPPK with the largest MP utilization, among the unchecked MPPK, the migration-source MPPK (S1401). Meanwhile, if it is determined in step S1400 that all the MPPK which are migration source candidates have been checked, the MP utilization equalization program 2229 terminates the processing.

The MP utilization equalization program 2229 then determines whether all the migration-destination MPPK candidates of the MPPK rendered migration-source candidates in step S1401 have been checked (S1402) and if all have been checked, returns to the processing of step S1400. If, however, it is determined in step S1402 that not all the migration-destination MPPK candidates have been checked, the MP utilization equalization program 2229 renders the MPPK with the smallest MP utilization, among the unchecked MPPK of the migration-destination candidate MPPK, the migration-destination MPPK (S1403).

The MP utilization equalization program 2229 then determines whether the MP utilization of the MPPK rendered the migration-source MPPK in step S1401 and the MP utilization of the migration-destination MPPK rendered the migration-destination MPPK in step S1403 satisfy the following equation (S1404). Migration-source MP utilization-migration-destination MP utilization greater than threshold . . . (2)

Furthermore, if equation (2) is not satisfied in step S1404, there is no need to migrate the ownership and hence the MP utilization equalization program 2229 returns to step S1400 and repeats the processing of step S1400 and subsequent steps. If, however, it is determined in step S1404 that equation (2) is satisfied, the utilization can be equalized by migrating ownership from the migration-source MPPK to the migration-destination MPPK and the MP utilization equalization program 2229 therefore executes the processing of step S1405 and subsequent steps.

In step S1405, the MP utilization equalization program 2229 acquires the average response time, the MP utilization, and the resource usage rate of volumes governed by the migration-source MPPK and not configured as ownership non-migration objects (S1405). More specifically, the MP utilization equalization program 2229 refers to the migration object table 2213, the owner MPPK table 2211, the MP utilization table 2212, the response time table 2214, the cache management table (volume) 2216, and the resource management table 2217 to acquire information of volumes to which the migration-source MPPK possesses ownership and which are ownership migration objects.

The MP utilization equalization program 2229 subsequently makes up a list of volumes for which the MP utilization is equal to or less than (the MP utilization of the migration-source MPPK−the MP utilization of the migration-destination MPPK)/2 (S1406).

The MP utilization equalization program 2229 then determines whether the volumes listed in step S1406 have been checked (S1407). Subsequently, if it is determined in step S1407 that not all the volumes have been checked, the MP utilization equalization program 2229 searches for volumes with the largest resource usage rate from the unchecked volumes (S1408).

The MP utilization equalization program 2229 then checks whether the resources used by the volumes sought in step S1408 can be reserved by the migration-destination MPPK (S1409). More specifically, the MP utilization equalization program 2229 determines whether the resources used by the migration volumes can be reserved by the migration-destination MPPK and whether the response time of the migration volume is greater than the response time of the migration-destination MPPK. It is possible to determine whether resource depletion has occurred in the migration-destination MPPK by referring to the resource management table 2217 and cache management table (volume) 2216 to confirm the resource usage rate of the migration volume and the resource usage rate of the migration-destination MPPK. It is also possible to determine whether the response time of the migrated volume in the migration-destination MPPK has worsened by referring to the response time table 2214 to confirm the response time of the migration volume and the response time of the migration-destination MPPK. Here, the response time is considered to have not worsened if the response time of the migration-destination MPPK is smaller than the response time of the volume being migrated. Although this determination is made hereinabove by using the response time of the migration-destination MPPK prior to executing the ownership migration, the determination may also be made by using the response time of the migration-destination MPPK after executing the ownership migration. This can be computed by calculating the MP utilization of the migration-destination MPPK after the ownership is migrated from the MP utilization of the volume being migrated and using the queuing model. The processing in step S1409 makes it possible to determine whether or not resource depletion has occurred in the migration destination MPPK after the volume is migrated.

Furthermore, if it is determined in step S1409 that resources used by the migration volume in the migration-destination MPPK can be reserved, the MP utilization equalization program 2229 starts the ownership migration program 2223 (S1410) and terminates the processing.

If, however, it is determined in step S1409 that the resources used by the migration volume in the migration-destination MPPK cannot be reserved, the MP utilization equalization program 2229 returns to the processing of step S1407 and repeats the processing of step S1407 and subsequent steps by targeting the volume with the next largest MP utilization. If none of the volumes satisfy the conditions of step S1409, the MP utilization equalization program 2229 returns to step S1402 and repeats the processing of step S1402 and subsequent steps by taking the MPPK with the next lowest MP utilization as the migration-destination MPPK.

As a result of the foregoing MP utilization equalization processing, ownership migration to an MPPK whose response time has worsened and ownership migration to MPPK with depleted resources can be avoided.

(c-2) Ownership Migration Method for Eliminating Resource Depletion.

Figure 61:
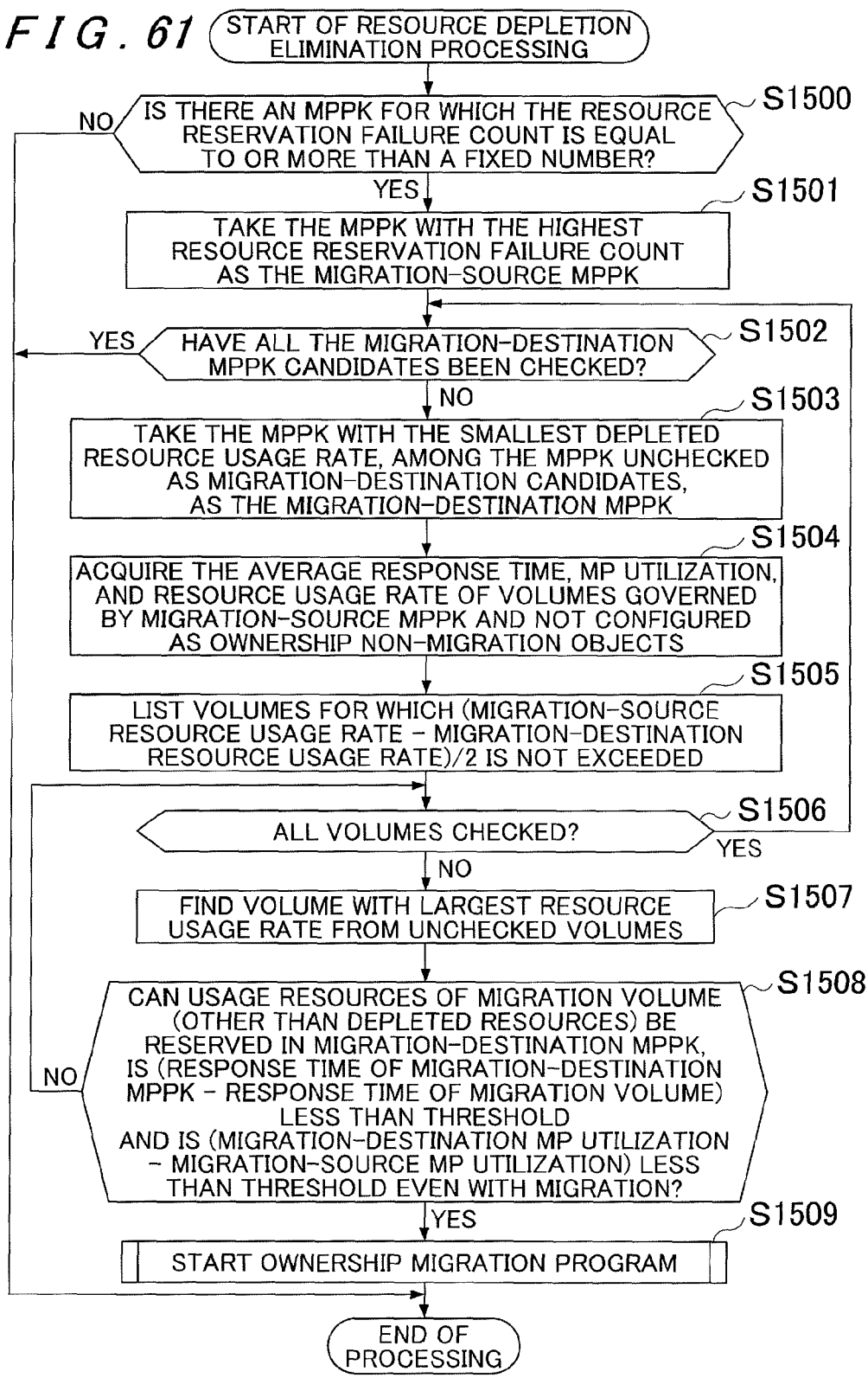
FIG. 61 is a flowchart showing processing content of resource depletion elimination processing according to this embodiment.

Resource depletion elimination processing which is executed in foregoing step S1303 will be described next. The resource depletion elimination processing is processing for eliminating resource depletion by migrating ownership from the MPPK in which resource depletion occurs. As shown in FIG. 61, the resource depletion elimination program 2230 first determines whether there is an MPPK for which the resource reservation failure count is equal to or more than a fixed number or more (S1500). The MPPK with the greatest resource reservation failure count is taken as the migration-source MPPK (S1501). If the resource reservation failure count is equal to or less than a fixed number in step S1500, the resource depletion elimination program 2230 terminates the processing.

The resource depletion elimination program 2230 subsequently determines whether all the MPPK which are ownership migration objects have been checked (S1502) and, if all have been checked, returns to the processing of step S1500. If, however, it is determined in step S1502 that not all the MPPK which are ownership migration objects have been checked, the resource depletion elimination program 2230 specifies the MPPK with the smallest depleted resource usage rate, among the MPPK which have not been checked as migration-destination candidates, and takes this MPPK as the migration-destination MPPK (S1503).

The resource depletion elimination program 2230 then acquires the average response time, MP utilization, and resource usage rate of volumes which are governed by the migration-source MPPK configured in step S1501 and not configured as ownership non-migration objects (S1504).

The resource depletion elimination program 2230 subsequently makes up a list of volumes for which the resource usage rate is equal to or less than (the resource usage rate of the migration-source MPPK—the resource usage rate of the migration-destination MPPK) by targeting resources which are depleted in the migration-source MPPK (S1505).

The resource depletion elimination program 2230 then determines whether the volumes listed in step S1505 have been checked (S1506). Subsequently, if it is determined in step S1506 that not all the volumes have been checked, the resource depletion elimination program 2230 searches for the volume with the largest resource usage rate from the unchecked volumes (S1507).

The resource depletion elimination program 2230 then checks whether the resources used by the volume sought in step S1507 (resources other than resources depleted in the migration-source MPPK) can be reserved by the migration-destination MPPK, whether the response time of this volume does not worsen in the migration-destination MPPK, and whether a value, obtained by subtracting the MP utilization of the migration-source MPPK from the MP utilization of the migration-destination MPPK, is less than a predetermined threshold also after the volume is migrated to the migration-destination MPPK (S1508).

This checking of the resources and response in step S1508 is not described in detail here since the processing is the same as that in the foregoing step S1409. Furthermore, the checking of the MP utilization in step S1508 can also be confirmed based on the MP utilization of the migration-source MPPK, the MP utilization of the migration-destination MPPK, and the MP utilization of the migrated volume by referring to the MP utilization table 2212. Note that the conditions for comparing the MP utilization in step S1508 may be modified so that, after ownership migration, the MP utilization of the migration-destination MPPK is equal to or less than the MP utilization of the migration-source MPPK. In this case, inversion of the relationship between the MP utilization of the migration-source MPPK and the MP utilization of the migration-destination MPPK can be prevented by the ownership migration. It is accordingly possible to reliably prevent a condition where ownership migration between two MPPK is repeated.

By executing the processing of the foregoing steps S1506 to S1508, it is possible to search for volumes, among the volumes listed in step S1505, for which the response time has worsened despite migration to the migration-destination MPPK, for which resources excluding the resources depleted at the migration source are depleted, and for which the MP utilization of the migration-destination MPPK has not greatly worsened.

If the conditions are fulfilled in step S1508, the resource depletion elimination program 2230 starts the ownership migration program 2223 (S1509) and terminates the processing. If, however, the conditions are not fulfilled in step S1508, the resource depletion elimination program 2230 returns to step S1506 and repeats the processing of step S1506 and subsequent steps by targeting the volume with the next largest usage rate of depleted resources.

Further, if the conditions of step S1508 are not fulfilled for any of the volumes, the resource depletion elimination program 2230 returns to step S1502 and repeats the processing of step S1502 and subsequent steps by taking the MPPK with the next smallest depleted resource usage rate as the migration-destination MPPK.

As a result of the foregoing resource depletion elimination processing, ownership can be migrated from an MPPK in which resource depletion occurs to another MPPK to eliminate resource depletion and improve performance. Furthermore, resource depletion in the ownership migration destination MPPK and an extreme worsening of the MP utilization of the migration-destination MPPK can also be prevented.

(c-3) Ownership Migration Method for Improving Response Time Variations.

Figure 62:
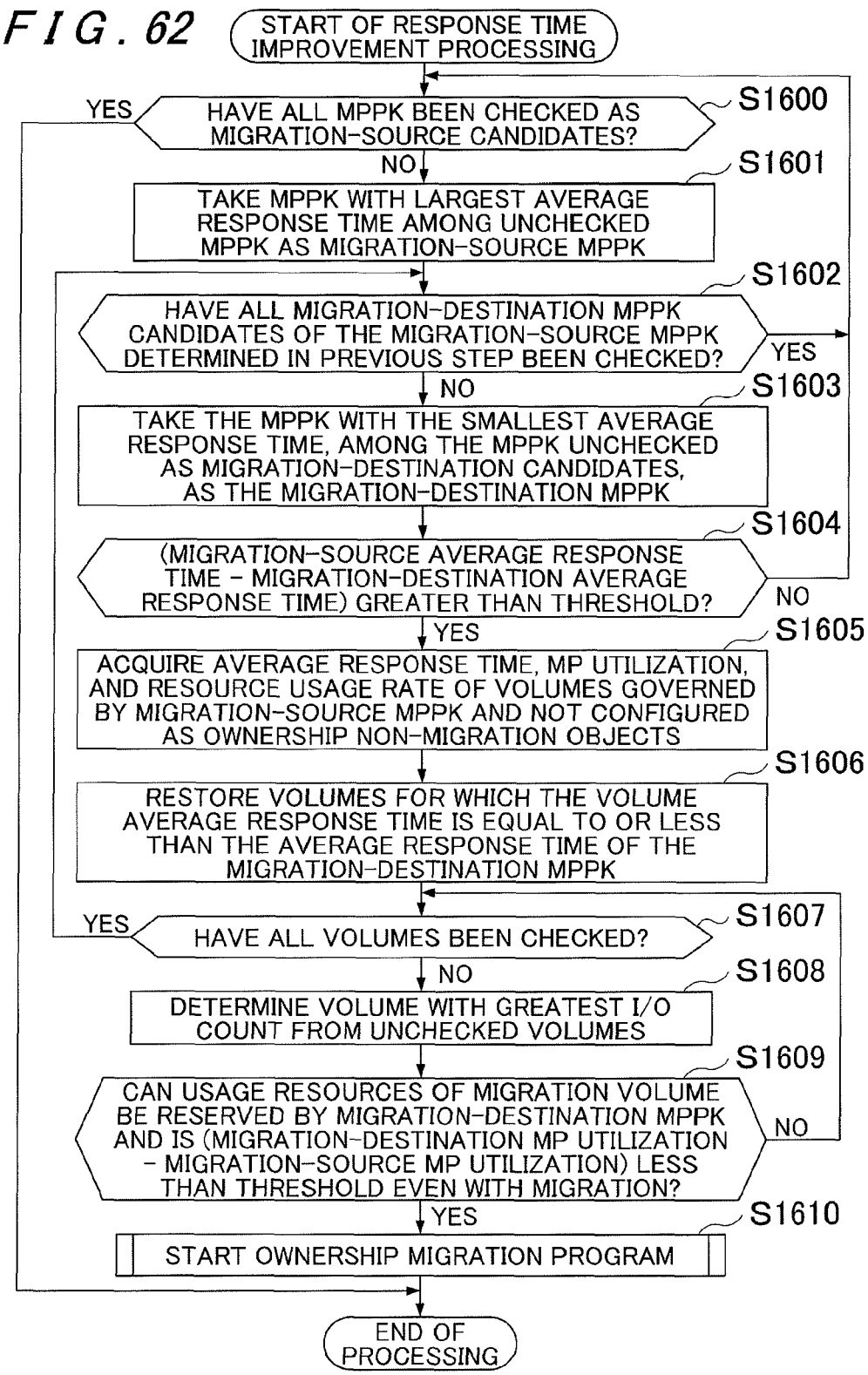
FIG. 62 is a flowchart showing processing content of response time improvement processing according to this embodiment.

Response time improvement processing which is executed in the foregoing step S1305 will be described next. The response time improvement processing is processing which eliminates response variations arising between MPPK through the migration of ownership. As shown in FIG. 62, the response time improvement program 2231 first determines whether all the MPPK which are ownership migration objects have been checked as migration source candidates (S1600). If it is determined in step S1600 that not all the MPPK which are migration source candidates have been checked, the response time improvement program 2231 takes the MPPK with the largest average response time, among the MPPK not yet checked, as the migration-source MPPK (S1601). If, however, it is determined in step S1600, that all the MPPK which are migration-source candidates have been checked, the response time improvement program 2231 terminates the processing.

The response time improvement program 2231 subsequently determines whether all the migration-destination MPPK candidates for the migration-source MPPK determined in step S1601 have been checked and takes the MPPK with the smallest average response time, among the migration-destination MPPK candidates which have not yet been checked, as the migration-destination MPPK (S1602).

The response time improvement program 2231 subsequently determines whether the average response time of the migration-destination MPPK which is determined in step S1603 and the average response time of the migration-source MPPK determined in step S1601 fulfill the following equation (S1604).

$$\text{Migration-source average response time–migration-destination average response time greater than threshold} \quad (3)$$

Further, if equation (3) is not satisfied in step S1604, there is no need to migrate the ownership and hence the response time improvement program 2231 returns to step S1600 and repeats the processing of step S1600 and subsequent steps. If, however, it is determined in step S1604 that equation (3) is fulfilled, the response time can be improved by migrating ownership from the migration-source MPPK to the migration-destination MPPK, and hence the response time improvement program 2231 executes the processing of step S1605 and subsequent steps.

In step S1605, the response time improvement program 2231 acquires information on volumes which are governed by the migration-source MPPK and which are ownership migration objects (S1405). More specifically, the response time improvement program 2231 refers to the migration object table 2213, the owner MPPK table 2211, the MP utilization table 2212, the owner MPPK table 2212, the response time table 2214, the cache management table (volume) 2216, and the volume management table 2217 and acquires information on volumes to which the migration-source MPPK possesses ownership and which are ownership migration objects.

The response time improvement program 2231 then restores volumes for which the volume response time is equal to or less than the average response time of the migration-destination MPPK (S1606). The objective in step S1606 is to select a volume for which the average response time of the migration-destination MPPK does not worsen even when the ownership is migrated. Stricter computation is therefore also possible. For example, the average value for the time the processor is continuously occupied by processing of the volumes may be newly managed and the average response time of the migration-destination MPPK after volume ownership migration may be computed by means of the queuing model by using the processor occupancy time and MP utilization.

The response time improvement program 2231 subsequently determines whether the volumes listed in step S1606 have been checked (S1607). Further, if it is determined in step S1607 that not all the volumes have been checked, the response time improvement program 2231 searches for the volume with the largest I/O count from the unchecked volumes (S1608). Here, the I/O counts of the volumes used in step S1608 are managed by the I/O count table 2220. The I/O count table 2220 will be described in detail subsequently.

The response time improvement program 2231 subsequently checks whether the resources used by the volume sought in step S1608 can be reserved by the migration-destination MPPK and whether a value, obtained by subtracting the MP utilization of the migration-source MPPK from the MP utilization of the migration-destination MPPK, is less than a predetermined threshold also after the volume is migrated to the migration-destination MPPK (S1609). The checking processing in step S1609 is the same as that of the foregoing step S1409 or step S1508 and hence a detailed description thereof is not included.

If the conditions are fulfilled in step S1609, the response time improvement program 2231 starts the ownership migration program 2223 (S1610) and terminates the processing. If, however, the conditions are not fulfilled in step S1609, the response time improvement program 2231 returns to step S1607 and repeats the processing of step S1607 and subsequent steps by targeting the volume with the next largest I/O count.

Further, if the conditions of step S1609 are not fulfilled for any of the volumes, the response time improvement program 2231 returns to step S1602 and repeats the processing of step S1602 and subsequent steps by taking the MPPK with the next smallest average response as the migration-destination MPPK.

As a result of the foregoing response improvement processing, ownership can be migrated from an MPPK whose response time has worsened to another MPPK to make it possible to eliminate response time variations and improve performance.

The I/O count table which is used in the foregoing step S1608 will be described next. As shown in FIG. 63, the I/O count table 2240 is configured from a volume number field 2240a and an I/O count field 2240b. The volume number field 2240a stores numbers for uniquely identifying the volumes 250 in the storage apparatus 200. Furthermore, the I/O count field 2240b stores the numbers of I/O per unit of time which are issued to each of the volumes 250. In FIG. 63, read requests and write requests are counted indiscriminately but read and write requests may also be counted separately.

(7-3) Effect of the Embodiment

As described hereinabove, in the computer system 2 according to this embodiment, the optimum MPPK is selected as the ownership migration object by considering information on the response time and resource usage rate excluding the MP utilization, the resource depletion status, and the response time variations. As a result, the ownership can be migrated to improve the performance of the storage apparatus 200 migrating the ownership.

(8) Eighth Embodiment (8-1) Configuration of Computer System

The hardware configuration of the computer system 8 according to this embodiment is the same as the hardware configuration of the computer system 6 according to the sixth embodiment and hence a detailed description thereof is not included. Furthermore, where the software configuration of the computer system 8 is concerned, the programs and tables stored in the memory package 220 differ from those of the sixth embodiment and therefore details of the configuration differences from the sixth embodiment in particular will be described hereinbelow.

In this embodiment, ownership migration between specific MPPK is enabled. For example, a case has been described where four MPPK 210 are contained in the storage apparatus. The four MPPK 210 are MPPK0, MPPK1, MPPK2, and MPPK3. Here, ownership migration is permitted between the MPPK0 and MPPK1 and ownership migration is allowed between MPPK2 and MPPK3, but ownership migration between the MPPK beyond these combinations is prevented. By means of such configuration, whereby ownership migration is allowed between specific MPPK, for example in a configuration in which the MPPK0 and MPPK1 are used in certain task processing and MPPK2 and MPPK3 are used for other task processing, it is possible to meet a demand to execute load balancing by migrating ownership, or similar, but avoid migration which would lead to adverse effects from other task processing.

The range in which ownership migration is allowed will be described hereinbelow as partition 1. Furthermore, hereinafter it is assumed that MPPK0 and MPPK1 belong to partition 1, while MPPK2 and MPPK3 belong to partition 2. In addition, a function for realizing ownership migration in a specific range will be described hereinbelow as the partition function.

(8-2) Functional Configuration of Storage Apparatus

In order to realize the partition function according to this embodiment, a partition table 2220 is added to the control information unit 221 of the memory package 220 and a third monitoring program 2232 is newly added to the program unit 222.

A partition table 2241 will be described first. The partition table 2241 is a table for managing which partition an MPPK 210 belongs to. As shown in FIG. 64, the partition table 2241 is configured from an MPPK number field 2241a and a partition number field 2241b. The MPPK number field 2241a stores numbers for uniquely identifying MPPK in the storage apparatus 200. The partition number field 2241b stores the partition numbers to which the MPPK 210 identified by the MPPK number belong. For example, FIG. 64 shows that MPPK 0 and MPPK 1 belong to partition 0 and MPPK 2 and MPPK 3 belong to partition 1.

Figure 65:
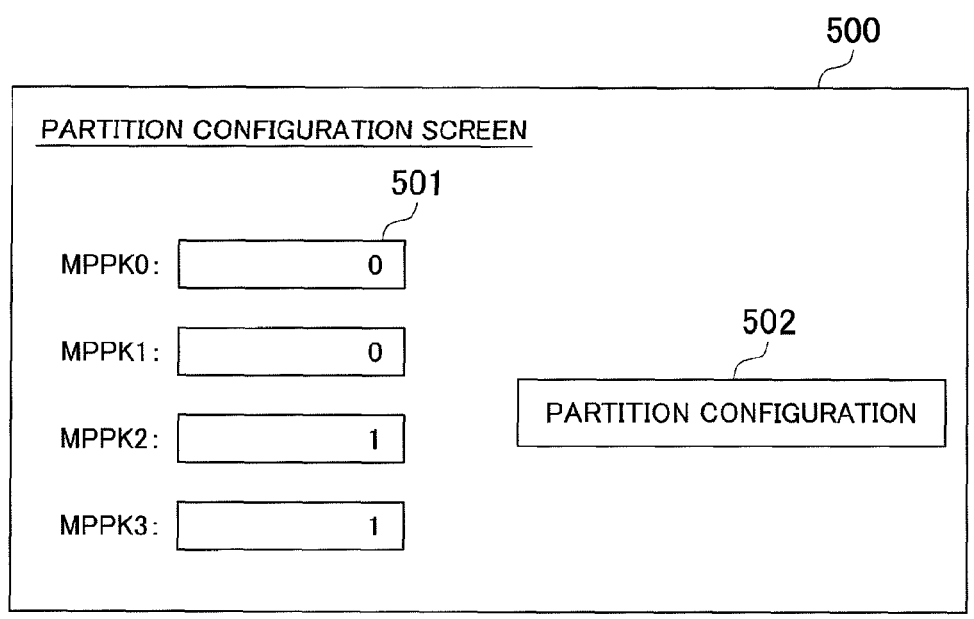
FIG. 65 is a conceptual view of a partition configuration screen according to the embodiment.

An input screen for configuring the partitions to which the MPPK belong will be described next. The input screen is an input screen which is displayed on the display screen of the I/O unit 274 of the service processor 270. As shown in FIG. 65, a partition configuration screen 500 is output to the 110 unit 274 of the service processor 270.

The partition configuration screen 500 is a screen for configuring the partitions to which the MPPK 210 belong. A partition number is input to a text box 501 which is disposed in each MPPK in response to a user input. When the partition configuration button 502 is pressed after the partition number is input, the configuration content is notified to the storage apparatus 200.

Upon receiving the partition configuration content input via the partition configuration screen from the service processor 270, the storage apparatus 200 starts up the configuration modification program unit 2221 stored in the program 222 in the memory package 220 and updates the foregoing partition table 500.

Processing to select the migration-source MPPK and the migration-destination MPPK in consideration of the partition configuration status when ownership is migrated will be described next. The third monitoring program 2232 is a monitoring program which corresponds to the partition function. The monitoring program 2222 of the first embodiment differs in that it is determined whether or not the partitions to the migration-source MPPK and migration-destination MPPK belong are the same.

Figure 66:
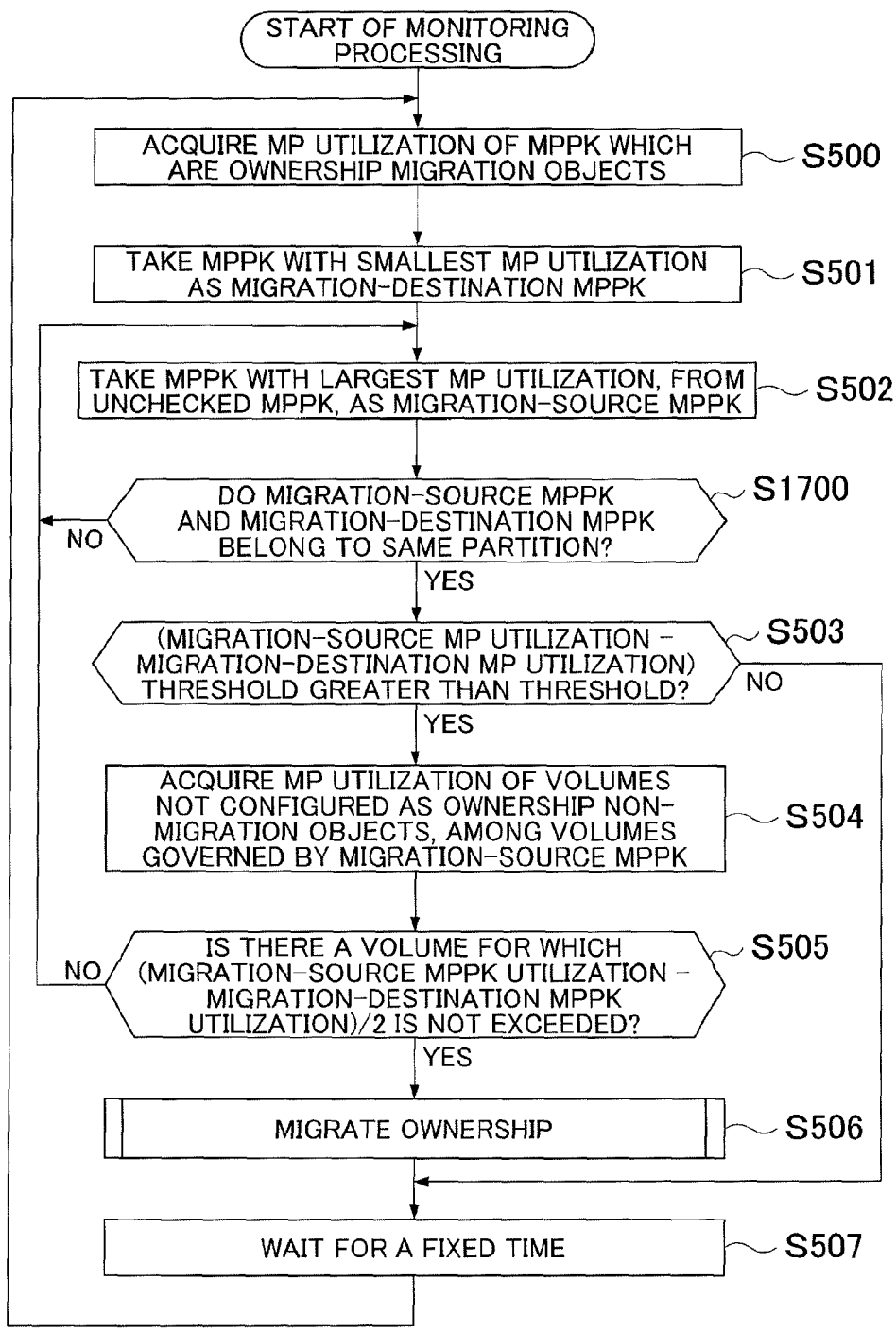
FIG. 66 is a flowchart showing processing content of monitoring processing according to this embodiment.

As shown in FIG. 66, the third monitoring program 2232 executes the processing of steps S500 to S502 to determine the ownership migration-source MPPK and migration-destination MPPK and then ascertain whether both MPPK belong to the same partition (S1700). More specifically, the third monitoring program 2232 refers to the partition table 2220 to compare the partition numbers to which the MPPK belong and determine whether both MPPK belong to the same partition.

If it is determined in step S1700 that both MPPK belong to the same partition, the third monitoring program 2232 executes the processing of step S503 and subsequent steps. If, however, it is determined in step S1700 that both MPPK do not belong to the same partition, the third monitoring program 2232 returns to step S502 and executes the processing of step S1700 and subsequent steps by taking another MPPK as a migration-source MPPK candidate.

Furthermore, the partition function can be realized by adding processing to compare the partitions to which the migration-source MPPK and migration-destination MPPK belong to the MP utilization equalization processing, resource depletion elimination processing, and response improvement processing according to the seventh embodiment.

For example, in the MP utilization equalization processing shown in FIG. 60, processing to compare the partitions to which the migration-source MPPK and migration-destination MPPK belong is added between the processing of step S1403 and processing of step S1404. If both MPPK do not belong to the same partition, [the third monitoring program 2232] returns to step S1402.

Further, in the resource depletion elimination processing shown in FIG. 61, processing to compare partitions to which the migration-source MPPK and the migration-destination MPPK belong is added between the processing of step S1503 and the processing of step S1504. If both MPPK do not belong to the same partition, [the third monitoring program 2232] returns to step S1502.

In addition, in the response time improvement processing shown in FIG. 62, processing to compare partitions to which the migration-source MPPK and migration-destination MPPK belong is added between the processing of step S1603 and the processing of step S1604. Further, if both MPPK do not belong to the same partition, the third monitoring program 2232 then returns to step S1602.

(8-3) Effect of the Embodiment

By selecting the migration-source MPPK and migration-destination MPPK by comparing the partitions to which the migration-source MPPK and migration-destination MPPK belong as described hereinabove, the range for migrating ownership can be limited to extending between specific MPPK.

(9) Further Embodiments

Processing in which utilization variations and the like between MPPK are detected and ownership is migrated was described hereinabove. However, a case where, upon migration of ownership, MPPK 210 are added to the storage apparatus 200 may also be considered. If the storage apparatus 200 is provided with additional MPPK 210, the MP utilization of the added MPPK 210 is 0%. Hence, even if ownership to the MPPK with the largest MP utilization are migrated from an existing MPPK 210, in most cases the MP utilization of the added MPPK will be smaller than the MP utilization of the other MPPK. In this case, in order to equalize the MP utilization of the existing MPPK and the added MPPK, the MP utilization equalization processing shown in FIG. 60 must also be executed many times and takes time.

If, therefore, variations arise in the MP utilization due to the additional MPPK, the utilizations of the existing MPPK and added MPPK can be rapidly equalized by collectively migrating a plurality of ownership to the added MPPK.

Service processing which, in cases where MPPK are added, determines which ownership is migrated to which MPPK will be described hereinbelow. The service program 2232 for executing the service processing is stored in the program unit 222 of the memory package 220.

As shown in FIG. 67, the service program 2232 first calculates the MP utilization X of each MPPK after equalizing the MPPK utilization (S1800). More specifically, the service program 2232 calculates the MP utilization X by means of the following equation (4).

$$X = \text{total MP utilization/number of actual MPPK} \quad (4)$$

Note that the number of actual MPPK is a number which includes the added MPPK.

The service program 2232 subsequently determines whether there are existing MPPK for which the migrated ownership have not been determined (S1801) and, if there are MPPK for which migrated ownership have not been determined, a search is conducted for combinations of volumes for which the total MP utilization of the volumes is (current MP utilization−X) (S1802). As a result of the processing of steps S1801 and S1802, ownership which is migrated from the MPPK to the added MPPK can be determined for each MPPK. In addition, by determining whether there are existing MPPK for which the processing of step S1802 has not been executed in step S1801, the processing of step S1802 can be executed for all the existing MPPK. Furthermore, after executing the processing of step S1802 on the existing MPPK, the service program 2232 executes the processing of step S1803 and subsequent steps.

The service program 2232 divides the plurality of volumes determined in step S1802 into groups corresponding to the number of added MPPK so that the total MP utilization of the volumes is MP utilization X, which is calculated using equation (4) above (S1803). More specifically, if two MPPK are added, the service program 2232 makes a list, from the existing MPPK, of the volumes for which the total of the volume utilization is MP utilization X*2. These volumes are then divided into sets of two volumes for which the MP utilization of the volumes is MP utilization X.

The service program 2232 subsequently associates the MPPK provided in each of the groups divided in step S1803 (S1804). The service program 2232 then migrates ownership for the volumes in the groups to the corresponding added MPPK (S1805) and terminates the processing.

Furthermore, although cases were described in the foregoing embodiments in which a microprocessor is applied as a control unit for controlling the whole of the processing relating to the various functions of the embodiments, the present invention is not limited to such cases, rather, hardware and software for executing the processing of this control unit may also be provided separately from the microprocessor. The same effects as for the foregoing embodiments can also be obtained in this way.

INDUSTRIAL APPLICABILITY

The present invention can be applied to a storage apparatus and a load balancing method for performing data I/O processing by means of a plurality of microprocessors.

REFERENCE SIGNS LIST

1 to 8 Computer system
100 Host apparatus
110 Network
200 Storage apparatus
211 Processor
212 Local memory
213 Service port
220, 290 Memory package
221 Control information unit
222 Program unit
223 Cache unit
230 Backend package
240 Hard disk drive
250 Volume
260 Frontend package
270 Service processor

The invention claimed is:

1. A storage apparatus which is connected via a network to a host apparatus which requests data I/Os,
    the storage apparatus comprising:
    a plurality of microprocessors;
    a plurality of storage areas formed in a drive group configured from a plurality of physical drives; and
    a management unit which manages, as the microprocessors which possess ownership to the storage areas, the microprocessors which handle data I/Os to/from one or more storage areas among the plurality of storage areas,
    wherein the management unit
    detects variations in processing loads of the plurality of microprocessors, generates, on the basis of variations in a processing load, load balancing target information which includes information on the storage areas to which the ownership is migrated, information on a migration-source microprocessor serving as the migration source of the ownership, and information on a migration-destination microprocessor serving as the migration destination of the ownership, and
    migrates the ownership to the storage areas with timing such that there is no drop in the processing load of the migration-destination microprocessor contained in the load balancing target information.

2. The storage apparatus according to claim 1,
    wherein the ownership to the storage areas are migrated with the designated timing in response to a user operation.

3. The storage apparatus according to claim 2,
    wherein the management unit
    displays, on a display screen, load information indicating the detected variations in the processing load of the plurality of processors and the load balancing target information, and
    specifies the storage areas to which the ownership is migrated and the timing for migrating the ownership from the load balancing target information displayed on the display screen in response to a user operation.

4. The storage apparatus according to claim 1,
    wherein the management unit migrates the ownership to the storage areas in time zones when the load of the migration-destination microprocessor is low.

5. The storage apparatus according to claim 1,
    wherein the management unit manages copy function information for the storage areas, and
    does not migrate the ownership to the storage areas if the storage areas contained in the load balancing target information are targets of a copy pair division operation contained in the copy function information.

6. The storage apparatus according to claim 1,
    wherein the management unit acquires execution state information for a program running on the host apparatus from the host apparatus, and migrates the ownership to the storage areas with timing such that there is no drop in the processing load of the migration-destination microprocessor on the basis of the execution state information.

7. The storage apparatus according to claim 6,
wherein the execution state information acquired by the management unit from the host apparatus includes information on the programs running on the host apparatus, the storage areas accessed by the programs, and the times when the programs are executed.

8. The storage apparatus according to claim 1,
wherein the management unit stores disposition information for the ownership to the storage areas before the ownership is migrated, and
restores the ownership to the storage areas on the basis of the stored ownership disposition information in response to a user operation after the ownership to the storage areas are migrated.

9. The storage apparatus according to claim 1,
wherein the management unit
determines the storage areas to which the ownership is migrated on the basis of information on the usage state of resources for each of the storage areas to which the migration-source microprocessor possesses ownership.

10. The storage apparatus according to claim 9,
wherein the management unit uses, as the information on the usage state of resources for each of the storage areas, information on the processing load of each of the storage areas of the microprocessor which has the ownership to the storage areas, information on the cache usage rate of each of the storage areas, or information on the response time for each of the storage areas.

11. The storage apparatus according to claim 9,
wherein the management unit uses, as information on the usage status of the resources of each of the storage areas, information on the average response time of the storage areas belonging to remote-copy groups.

12. The storage apparatus according to claim 1,
wherein the management unit determines whether to migrate the ownership on the basis of information on the state of the migration-destination microprocessor.

13. The storage apparatus according to claim 12,
wherein the management unit uses, as information on the state of the migration-destination microprocessor, information on the response time of I/O processing of the migration-destination microprocessor.

14. The storage apparatus according to claim 12,
wherein the management unit uses, as information on the state of the migration-destination microprocessor, information on the configuration of the ownership to the remote-copy group of the migration-destination microprocessor.

15. A method of managing a storage apparatus which is connected via a network to a host apparatus which requests data I/Os,
the storage apparatus comprising:
a plurality of microprocessors;
a plurality of storage areas formed in a drive group configured from a plurality of physical drives; and
a management unit which manages, as the microprocessors which possess ownership to the storage areas, the microprocessors which handle data I/Os to/from one or more storage areas among the plurality of storage areas, the management method comprising:
a first step in which the management unit detects variations in processing loads of the plurality of microprocessors;
a second step in which the management unit generates, on the basis of variations in a processing load, load balancing target information which includes information on the storage areas to which the ownership is migrated, information on a migration-source microprocessor serving as the migration source of the ownership, and information on a migration-destination microprocessor serving as the migration destination of the ownership, and
a third step in which the management unit migrates the ownership to the storage areas with timing such that there is no drop in the processing load of the migration-destination microprocessor contained in the load balancing target information.

* * * * *